United States Patent [19]
Hashimura et al.

[11] Patent Number: 5,424,870
[45] Date of Patent: Jun. 13, 1995

[54] COMPACT ZOOM LENS SYSTEM

[75] Inventors: Junji Hashimura, Sakai; Takashi Okada, Osaka; Tetsuo Kohno, Toyonaka, all of Japan

[73] Assignee: Minolta Camera Kabushiki Kaisha, Osaka, Japan

[21] Appl. No.: 979,468

[22] Filed: Nov. 20, 1992

Related U.S. Application Data

[63] Continuation of Ser. No. 731,414, Jul. 17, 1991, abandoned.

[30] Foreign Application Priority Data

| Jul. 20, 1990 | [JP] | Japan | 2-193284 |
| Jul. 20, 1990 | [JP] | Japan | 2-193285 |
| Jul. 20, 1990 | [JP] | Japan | 2-193286 |
| Jul. 20, 1990 | [JP] | Japan | 2-193287 |
| Jul. 20, 1990 | [JP] | Japan | 2-193288 |
| Nov. 16, 1990 | [JP] | Japan | 2-311932 |

[51] Int. Cl.6 .............................................. G02B 15/14
[52] U.S. Cl. .................................. 359/689; 359/676; 359/716
[58] Field of Search ............... 359/689, 676, 716, 708

[56] References Cited

U.S. PATENT DOCUMENTS

| 4,726,668 | 2/1988 | Nakayama et al. | 354/689 |
| 4,773,744 | 9/1988 | Yamanashi | 359/689 |
| 4,840,467 | 6/1989 | Takada et al. | 359/689 |
| 4,952,038 | 8/1990 | Ito | 359/689 |
| 5,004,329 | 4/1991 | Tsuchida | |
| 5,069,536 | 12/1991 | Ogata | 359/689 |

FOREIGN PATENT DOCUMENTS

| 58-137813 | 8/1983 | Japan . |
| 58-184916 | 10/1983 | Japan . |
| 58-224322 | 12/1983 | Japan . |
| 61-52620 | 3/1986 | Japan . |
| 61-259216 | 11/1986 | Japan . |
| 62-39812 | 2/1987 | Japan . |
| 62-78522 | 4/1987 | Japan . |
| 63-25613 | 2/1988 | Japan . |
| 63-148223 | 6/1988 | Japan . |
| 1-230013 | 9/1989 | Japan . |
| 2-50117 | 2/1990 | Japan . |

*Primary Examiner*—Paul M. Dzierzynski
*Assistant Examiner*—Richard Hanig
*Attorney, Agent, or Firm*—Price, Gess & Ubell

[57] ABSTRACT

A compact zoom lens system comprises, from the object side, a first lens component of a positive refractive power, a second lens component of a positive refractive power, and a third lens component of a negative refractive power. The first lens component has at least one aspherical surface. There are variable air spaces between the first and second lens components and between the second and third lens components.

20 Claims, 21 Drawing Sheets

COMPACT ZOOM LENS SYSTEM

This is a continuation of application Ser. No. 07/731,414, filed on Jul. 17, 1991, now abandoned.

BACKGROUND OF THE INVENTION

1. Field of the Invention

The present invention relates to a compact zoom lens system employed for a lens shutter camera (hereinafter referred to as LS camera), etc.

2. Description of the Prior Art

In order to realize a compactness and low cost for an LS camera incorporating a zoom lens system, a compact, low-cost taking lens system is desired. In order to reduce the size of a zoom lens system amount of lens movement in a zooming operation, the refractive power of each lens component is required to be increased. However, the number of lens elements has to be increased to increase the refractive power while maintaining a required performance. On the contrary, to reduce the cost, it is effective to decrease the number of lens elements. As described above, the realization of compactness and that of a low cost lens system conflict with each other. In recent years, technologies such as plastic forming, the glass molding, etc. have made remarkable progress, which has enabled a low-cost production of aspherical surfaces.

SUMMARY OF THE INVENTION

An object of the present invention is to arrange a compact zoom lens system for LS cameras with fewer lens elements to reduce the cost by effectively employing aspherical surfaces.

BRIEF DESCRIPTION OF THE DRAWINGS

This and other objects and features of this invention will become clear from the following description taken in conjunction with the preferred embodiments with reference to the accompanied drawings in which:

FIGS. 14A, 14B and 14C to 26A, 26B and 26C show the aberrations of the first to thirteenth embodiments according to the present invention, respectively.

DETAILED DESCRIPTION OF THE PREFERRED EMBODIMENTS

Figure 1:
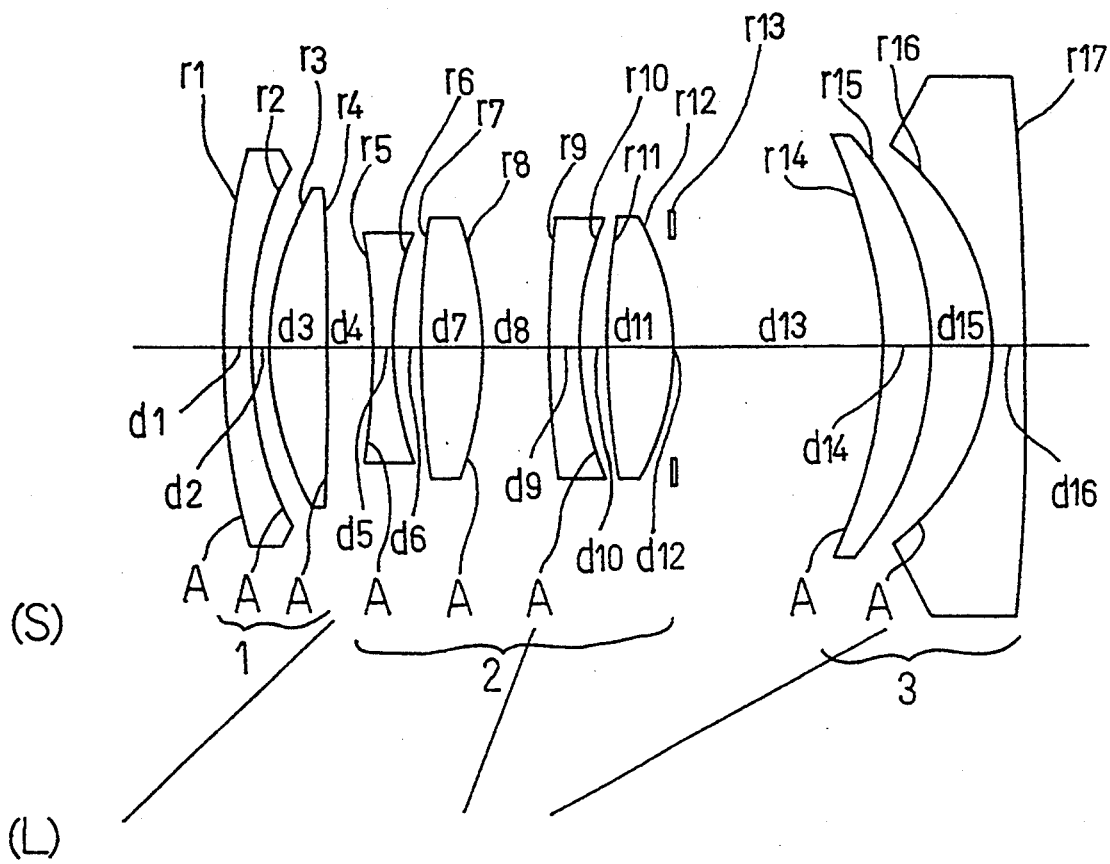
FIGS. 1 to 13 are cross-sectional views of the optical systems of a first to thirteenth embodiments according to the present invention, respectively.
Figure 2:
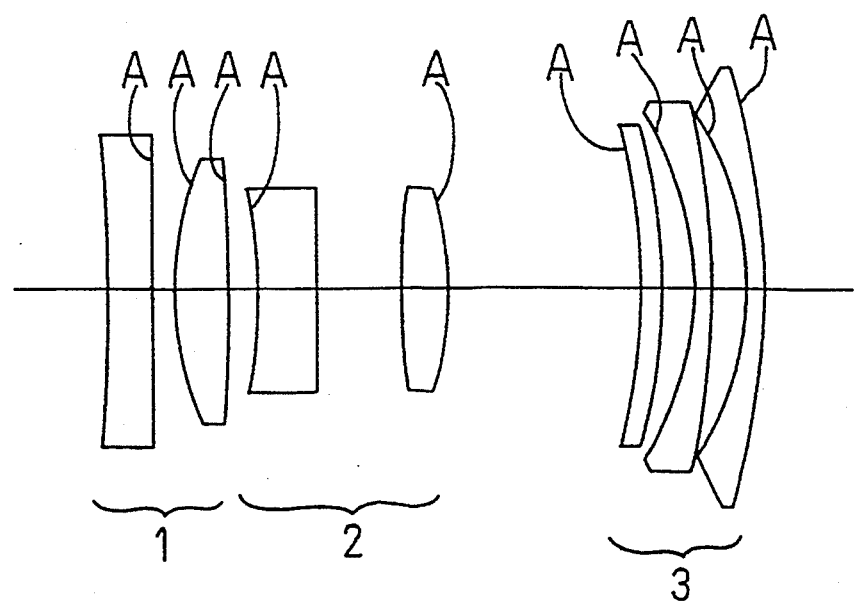
Figure 3:
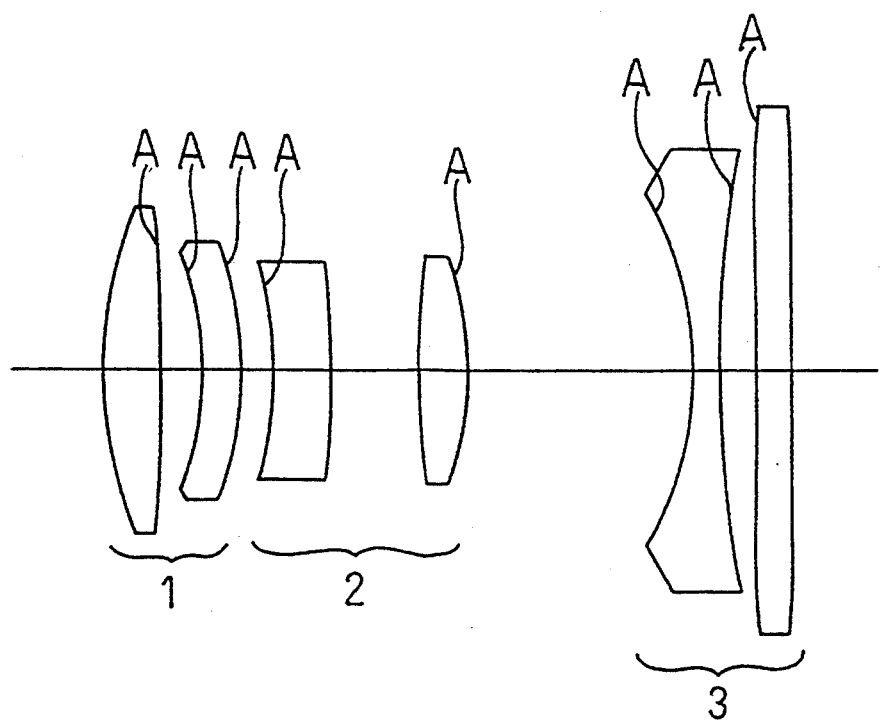
Figure 4:
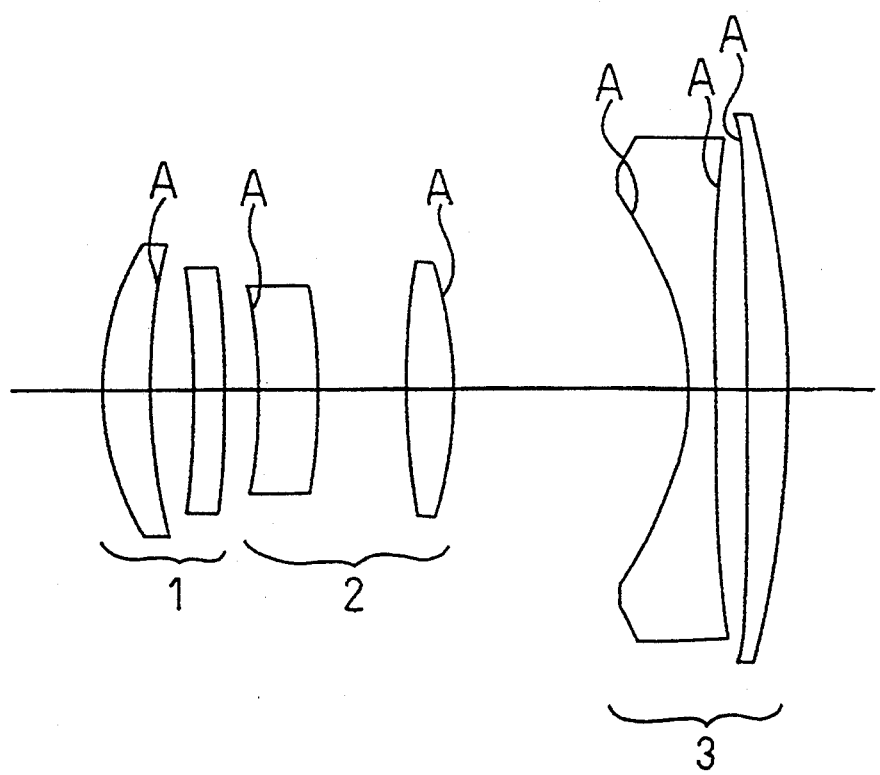
Figure 5:
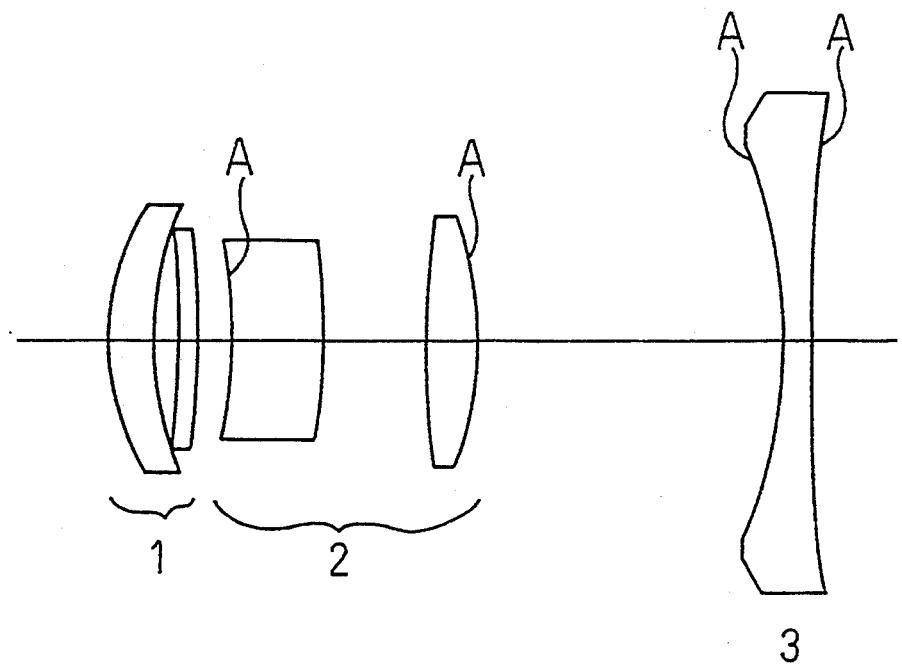
Figure 6:
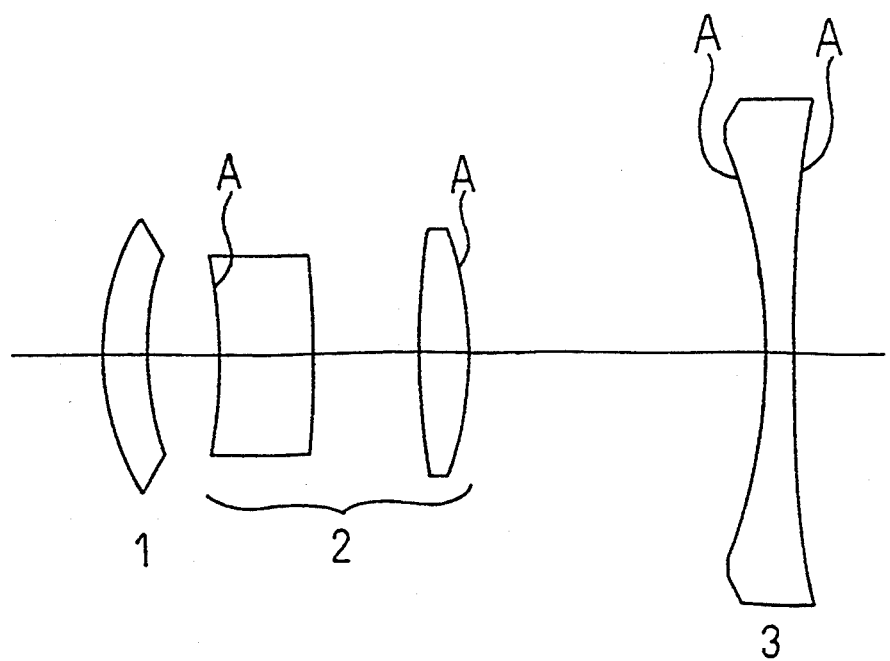
Figure 7:
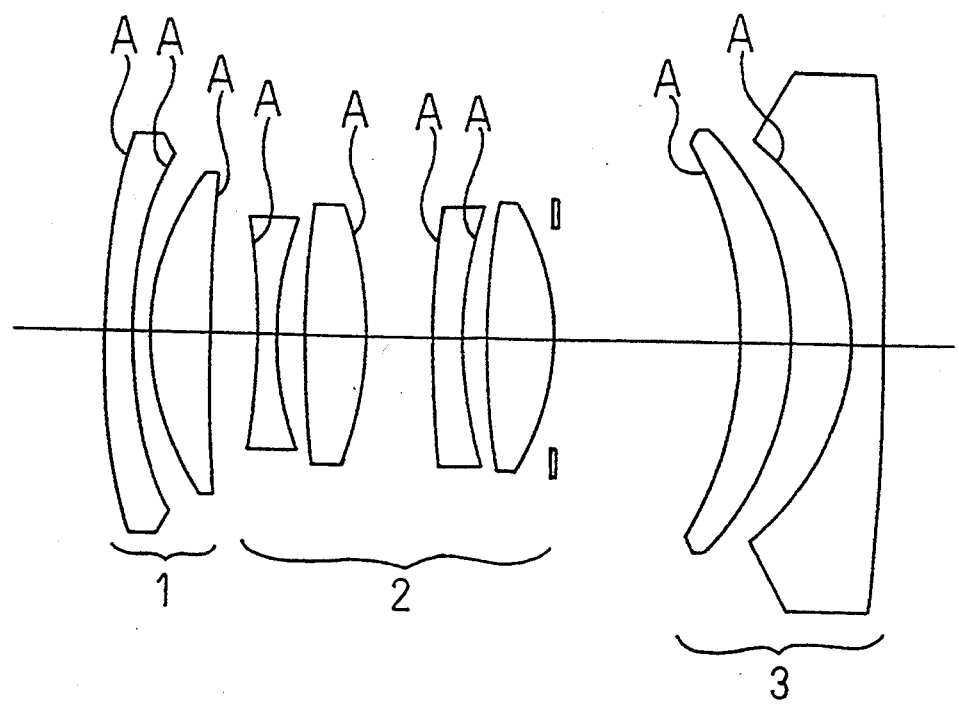
Figure 8:
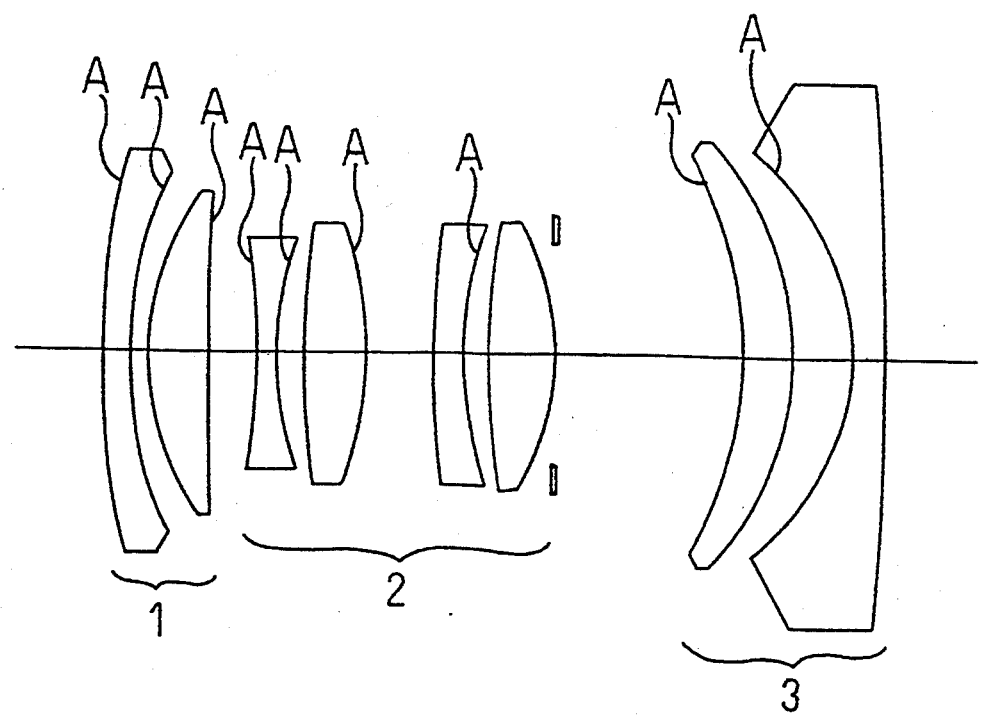
Figure 9:
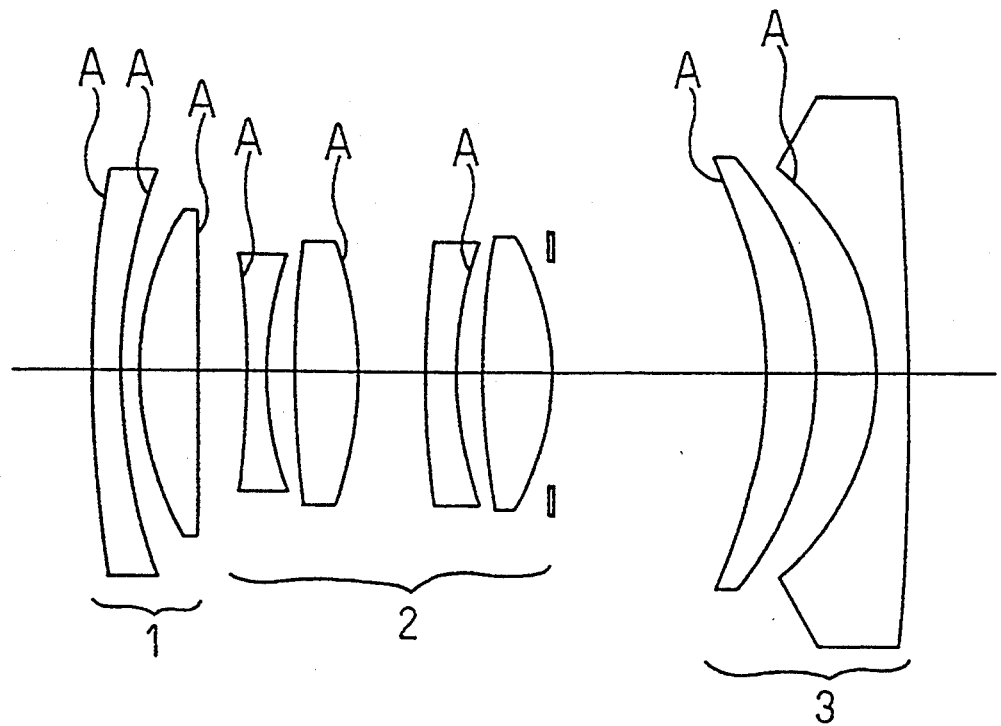
Figure 10:
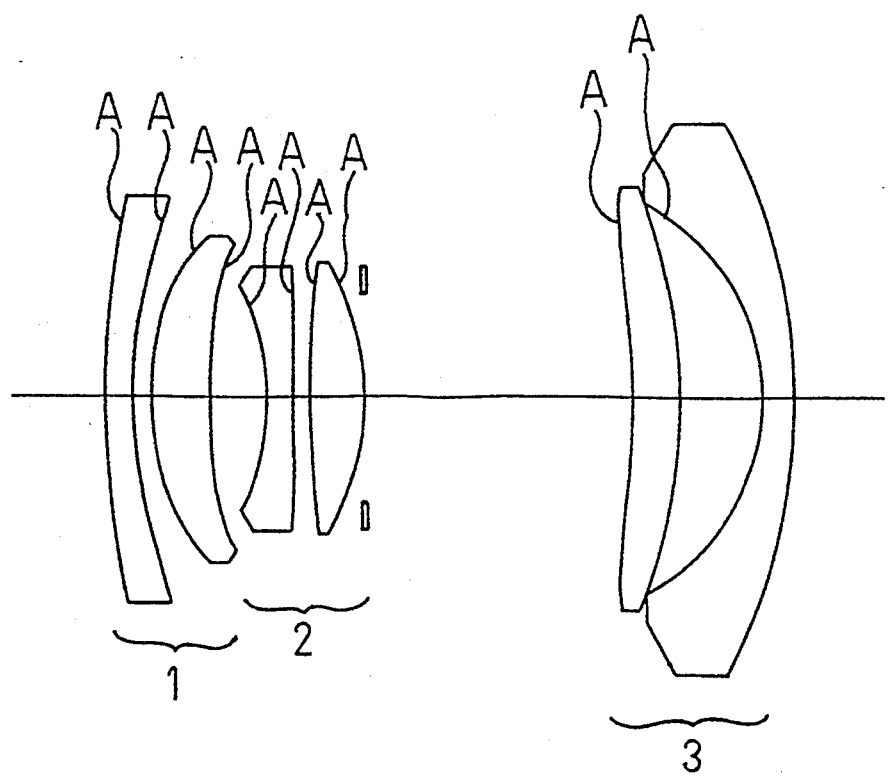
Figure 11:
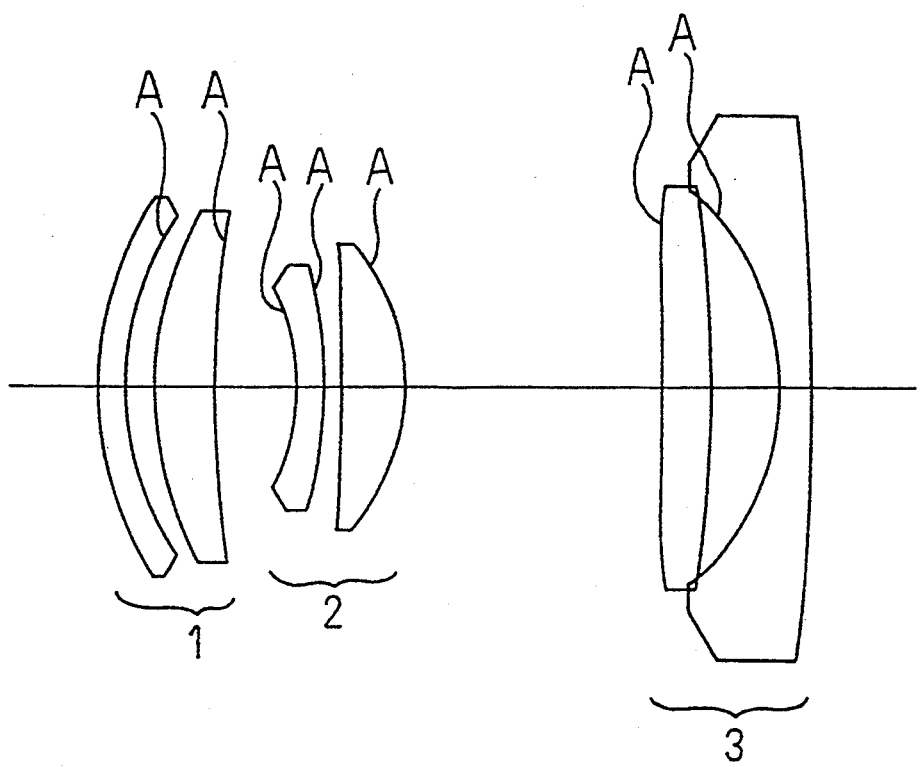
Figure 12:
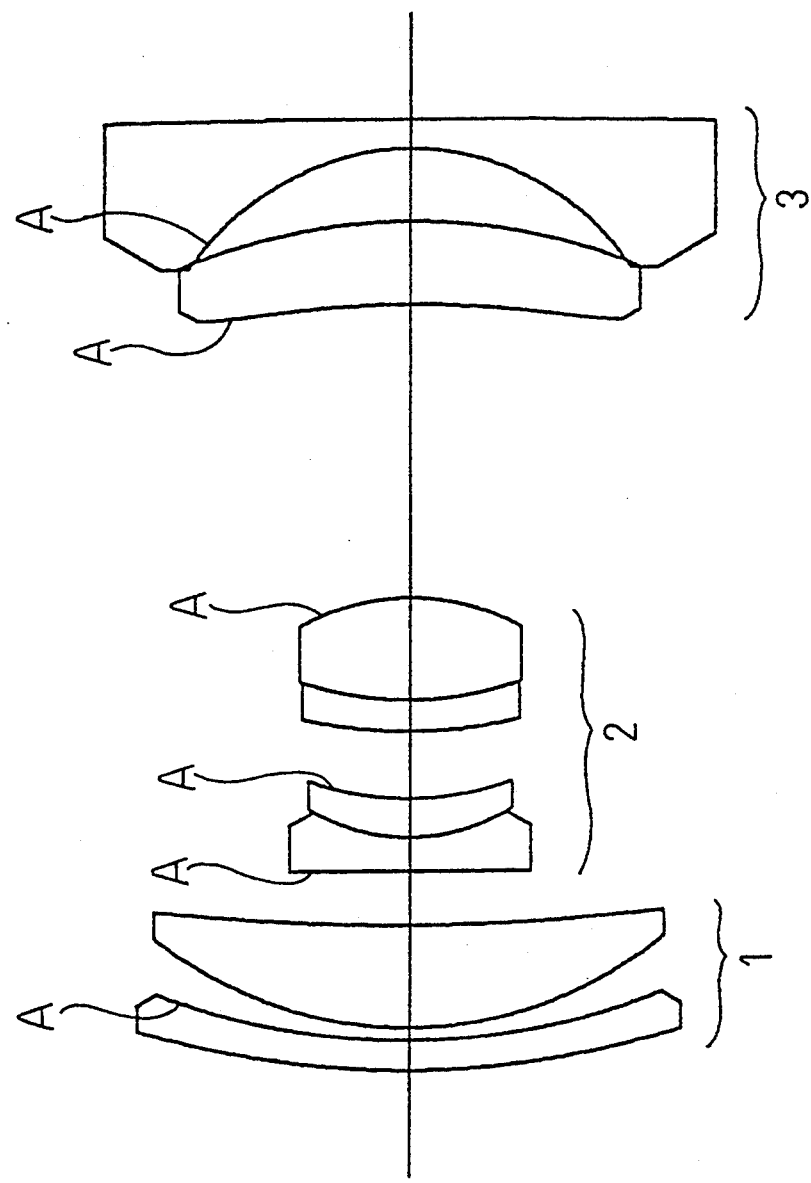
Figure 13:
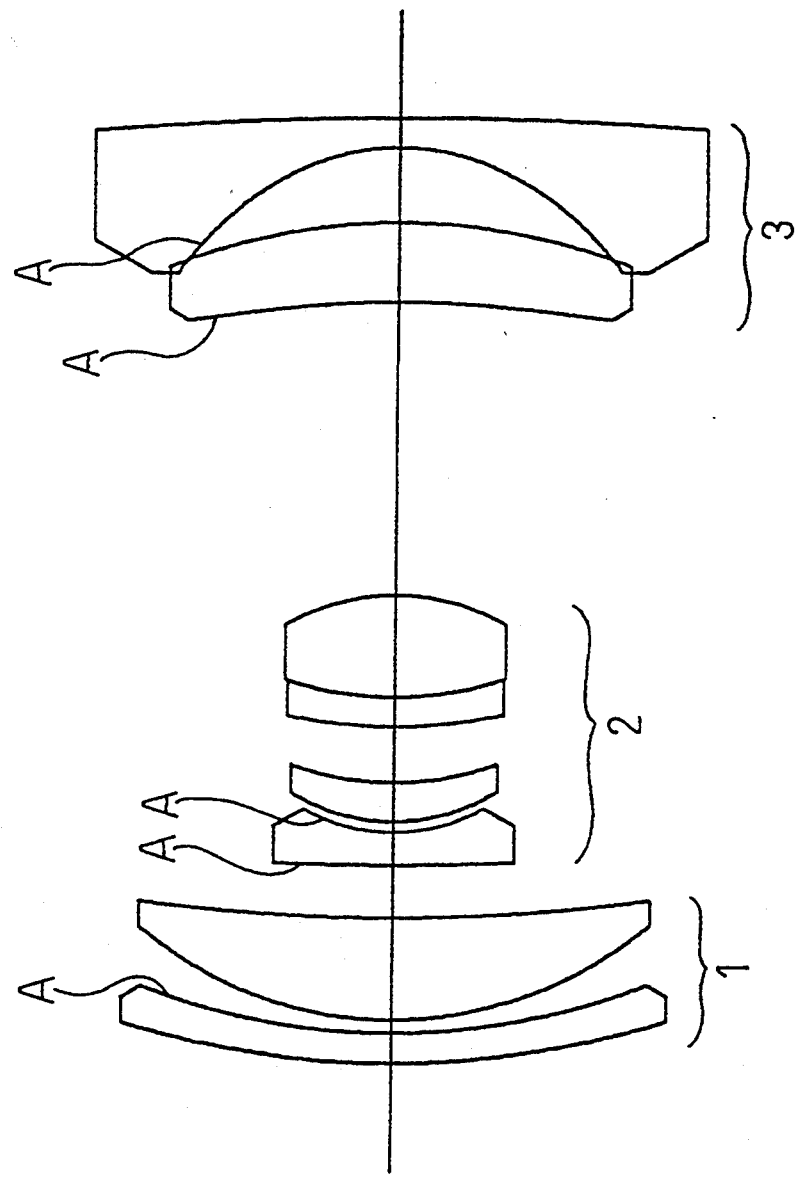
Figure 14A:
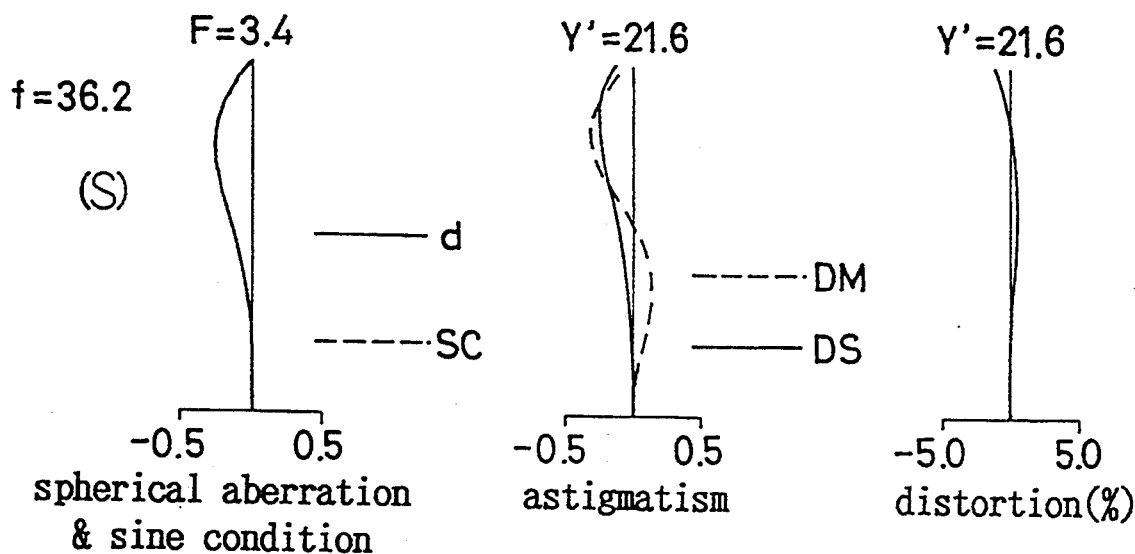
Figure 14B:
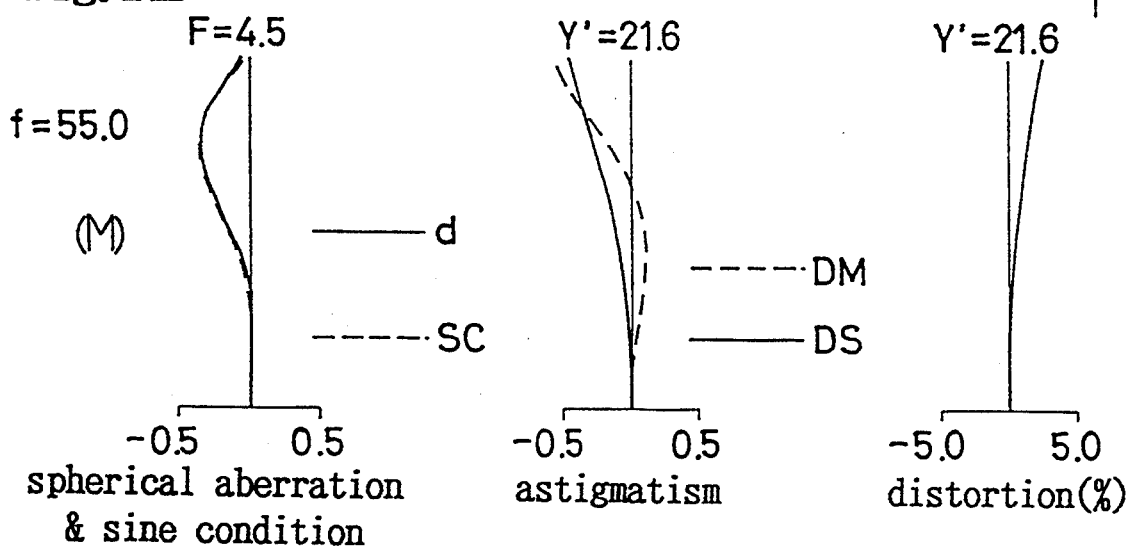
Figure 14C:
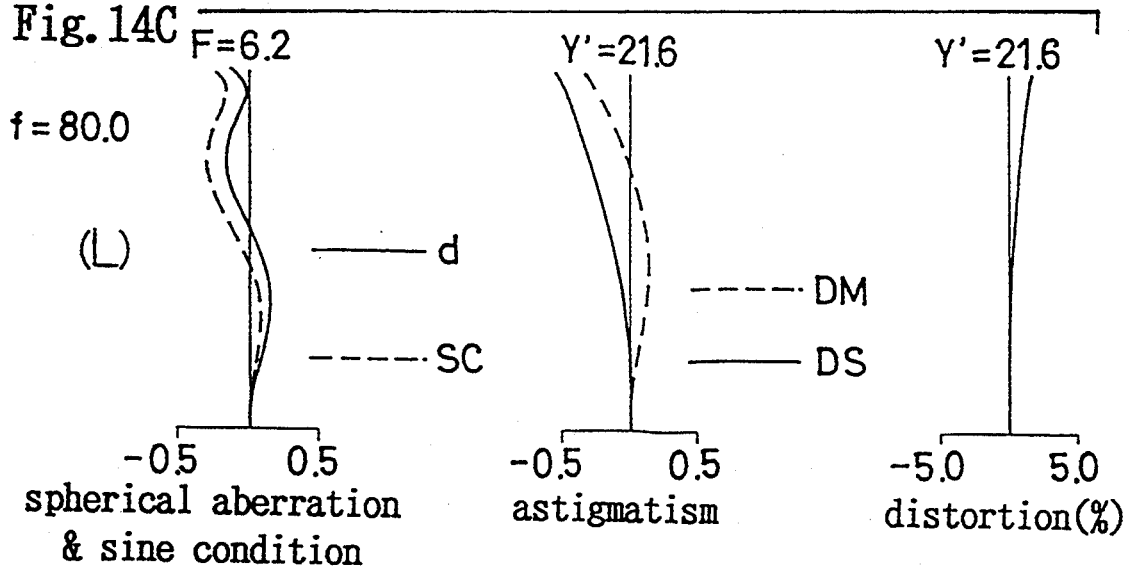
Figure 15A:
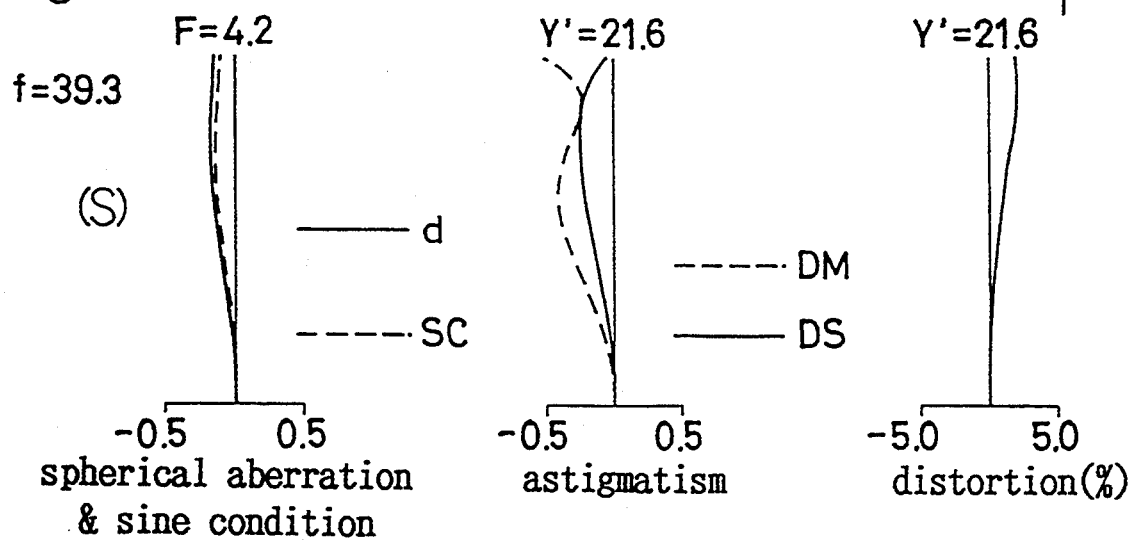
Figure 15B:
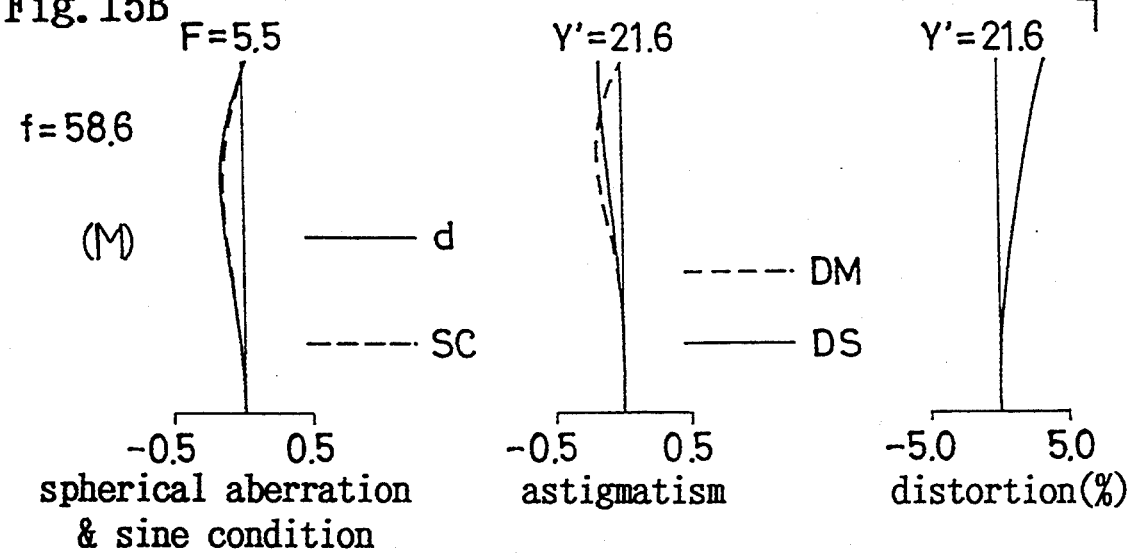
Figure 15C:
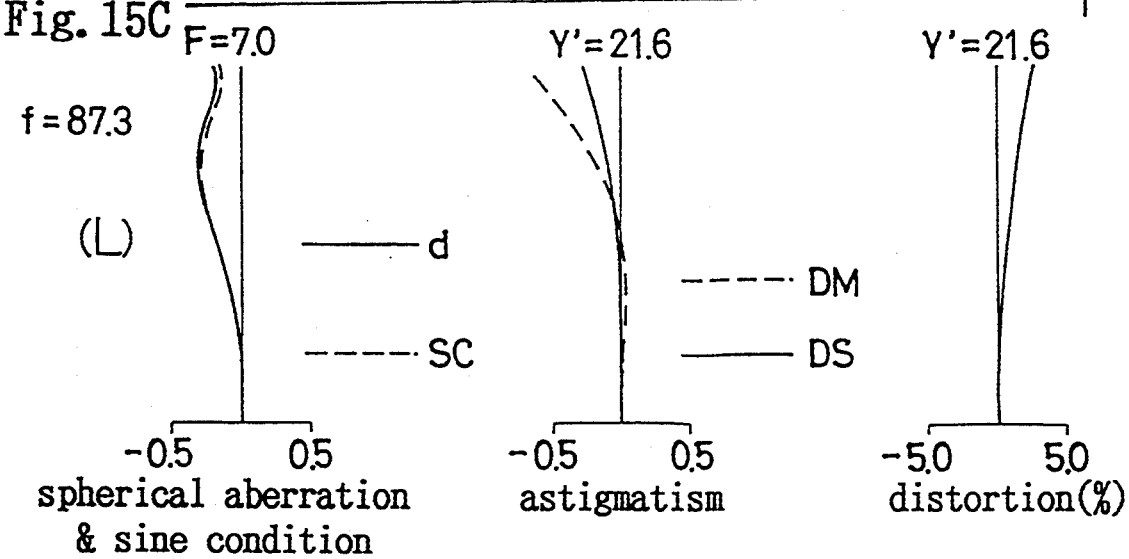
Figure 16A:
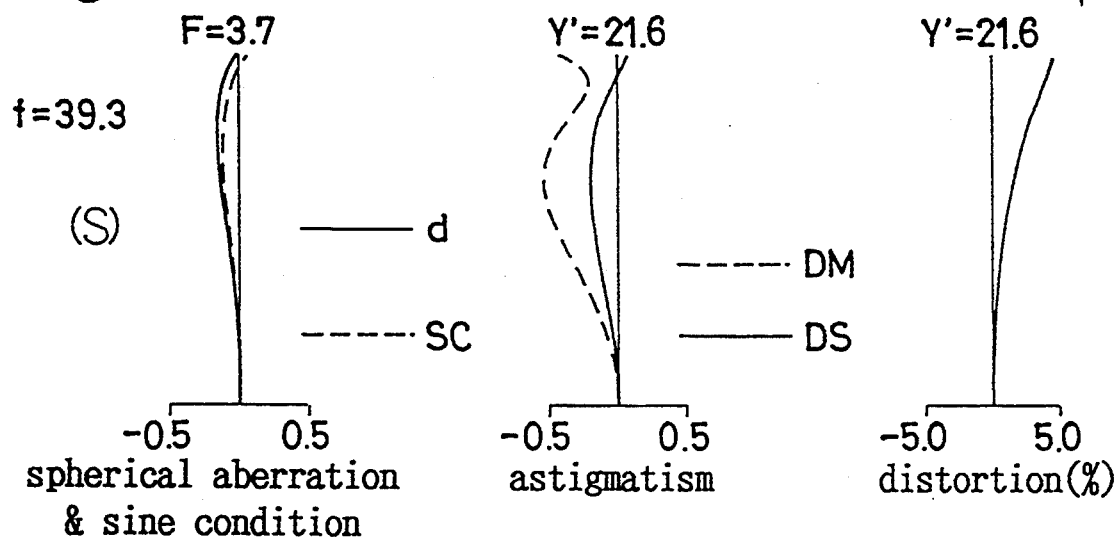
Figure 16B:
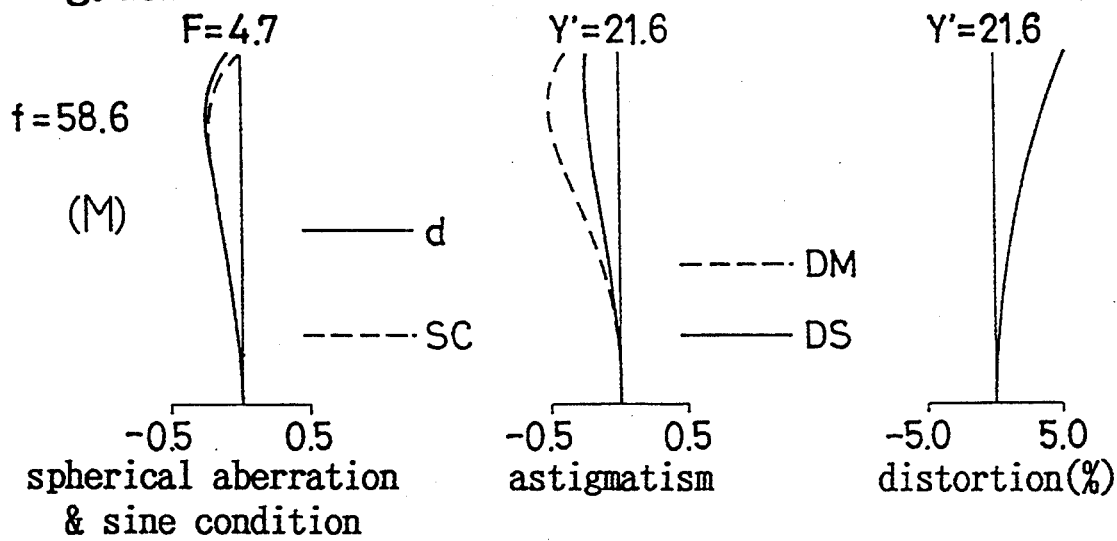
Figure 16C:
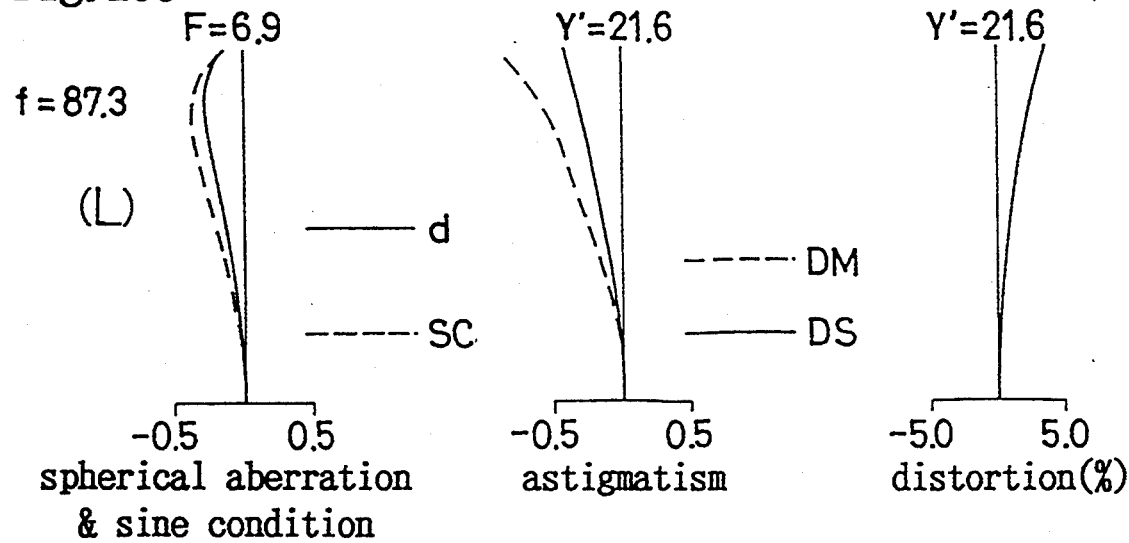
Figure 17A:
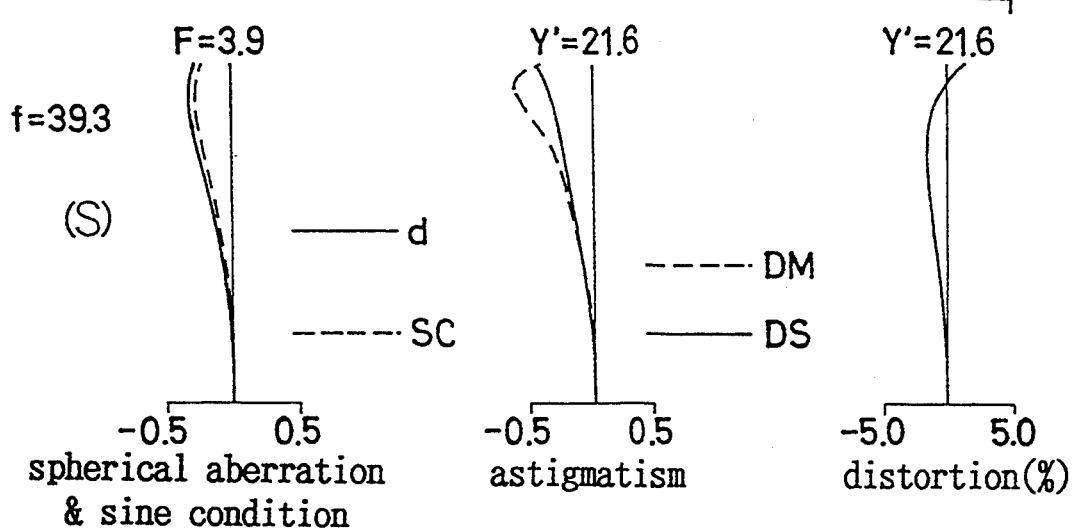
Figure 17B:
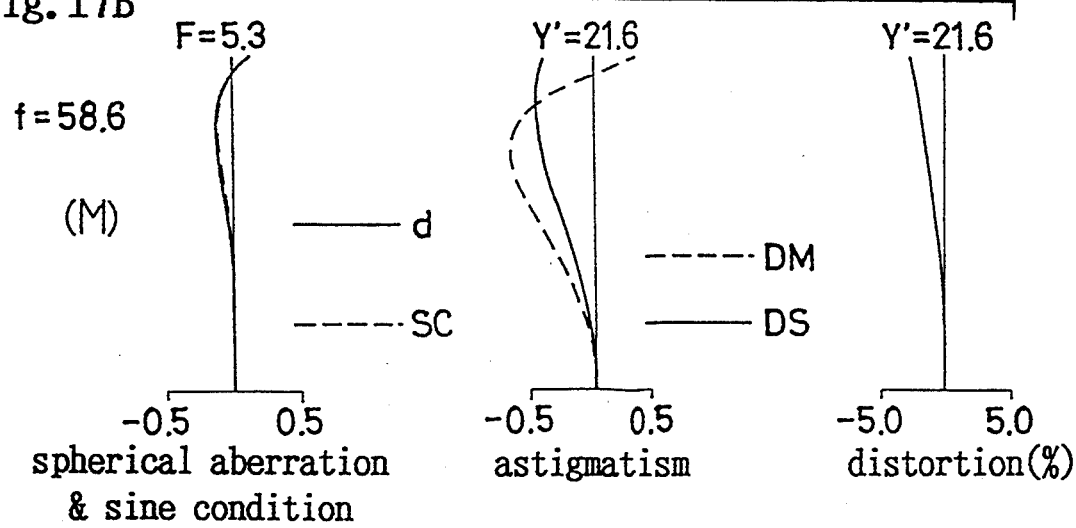
Figure 17C:
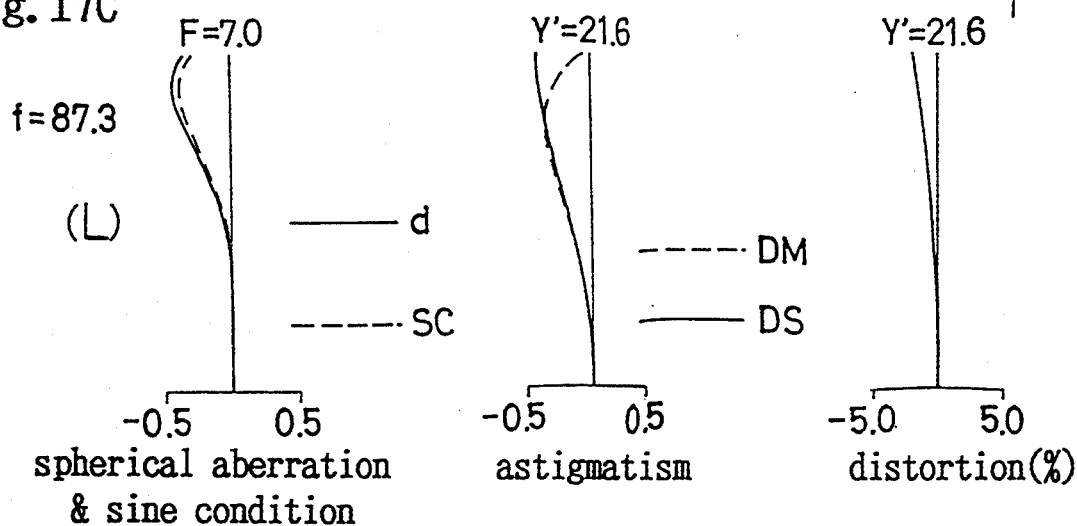
Figure 18A:
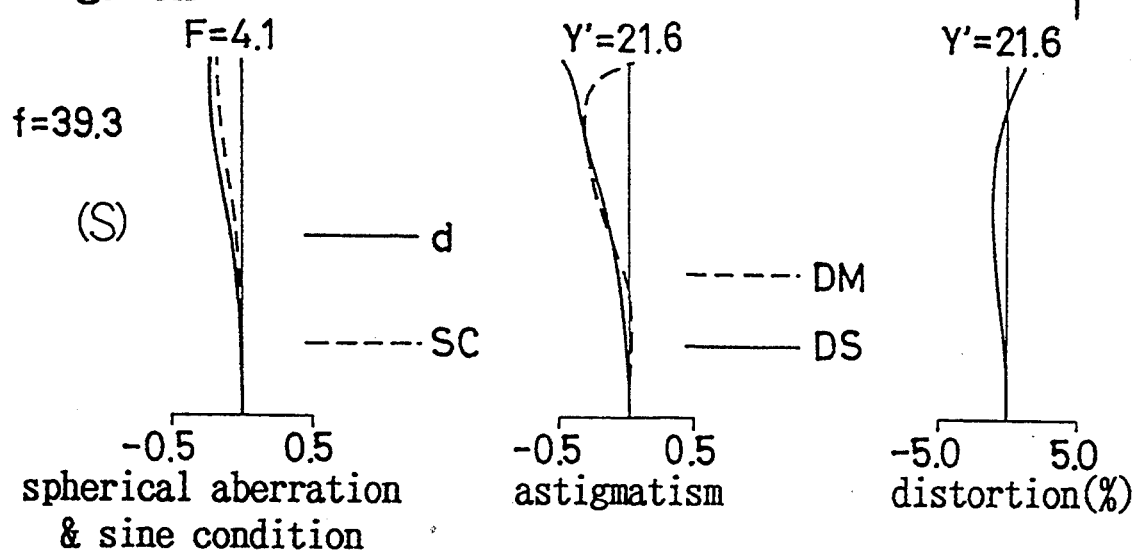
Figure 18B:
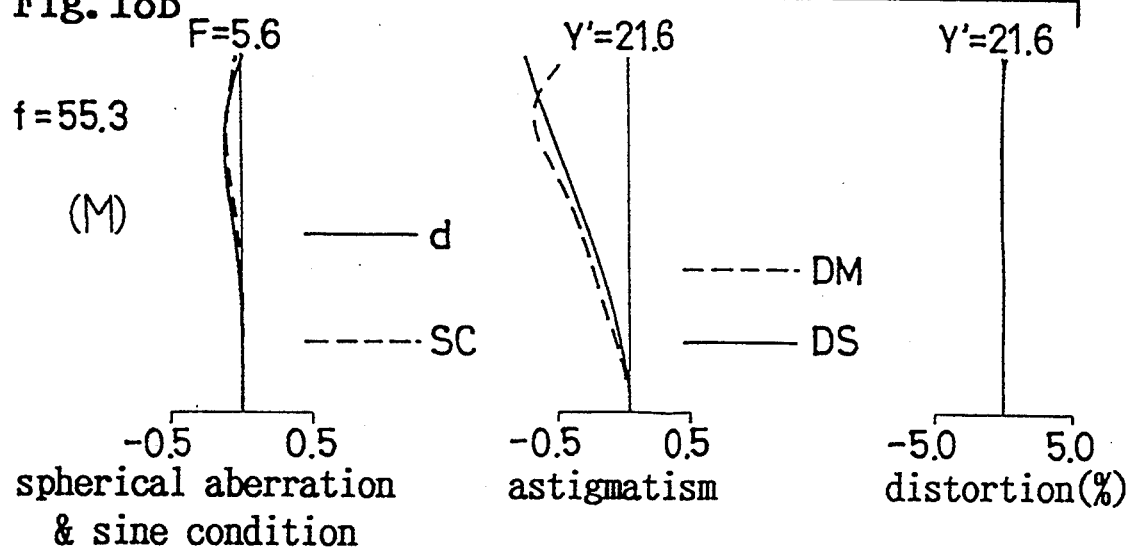
Figure 18C:
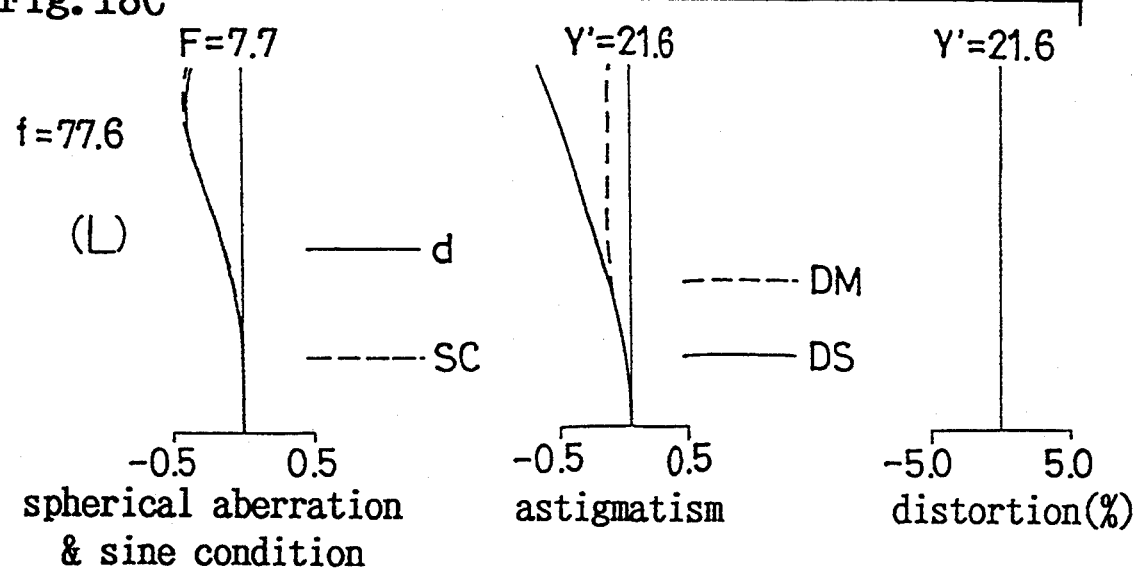
Figure 19A:
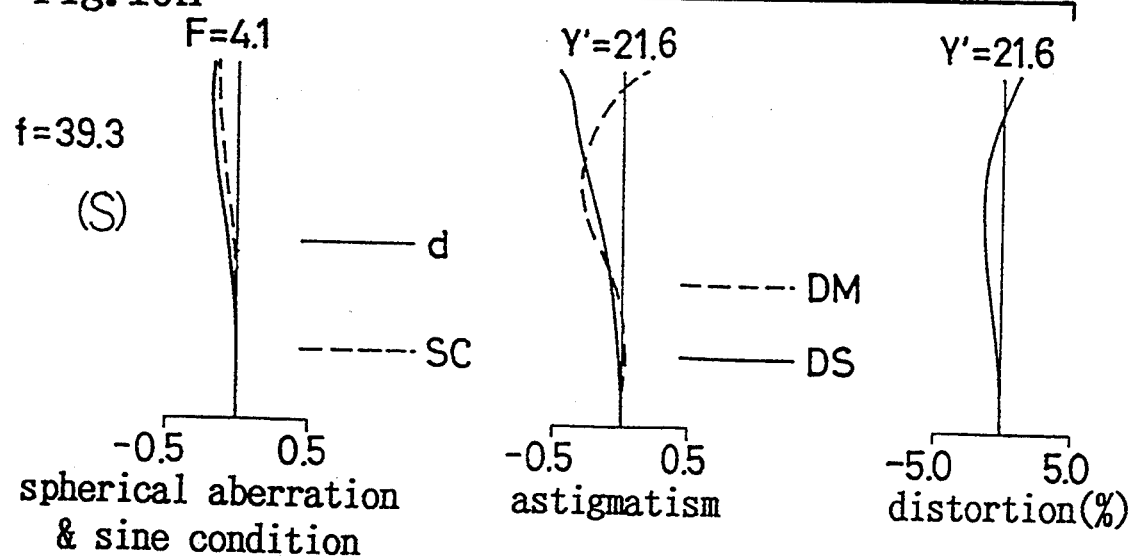
Figure 19B:
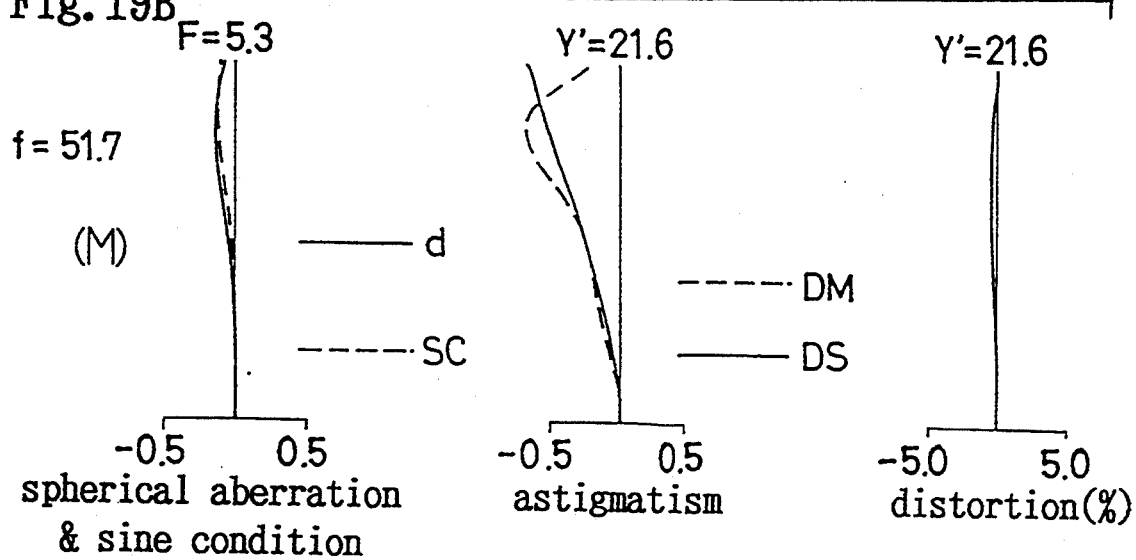
Figure 19C:
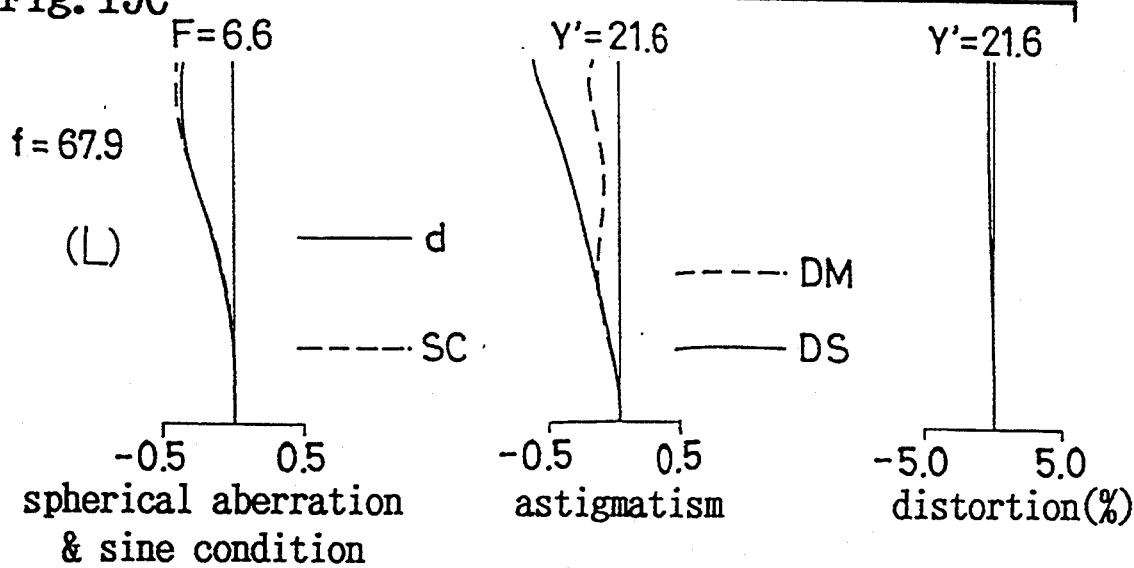
Figure 20A:
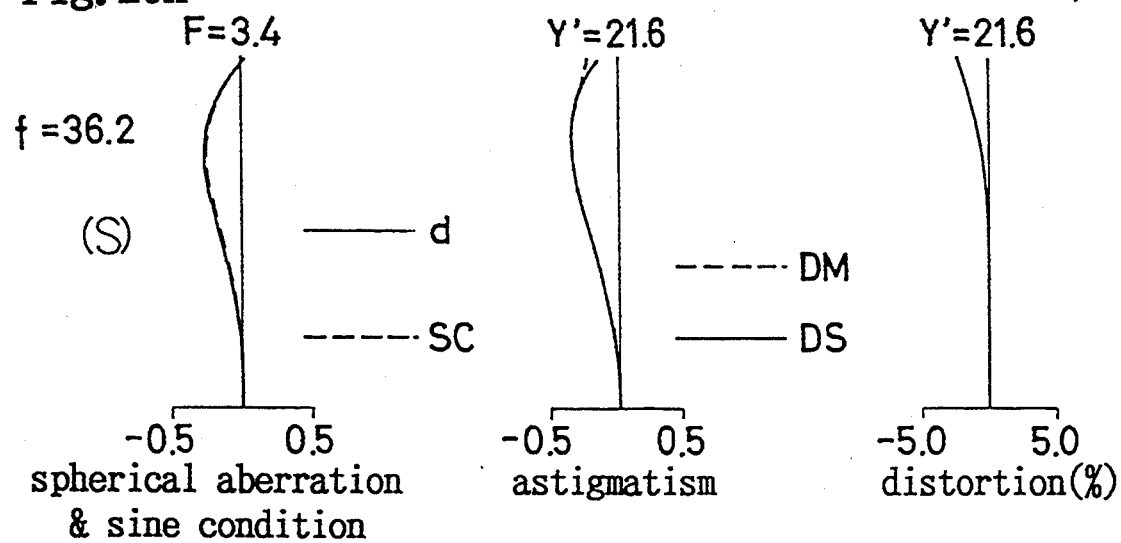
Figure 20B:
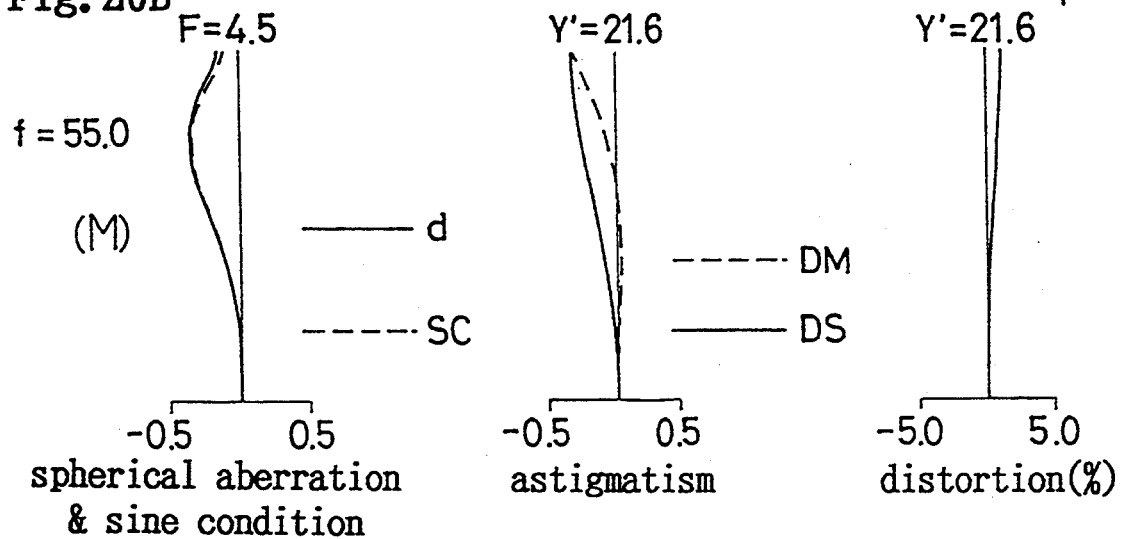
Figure 20C:
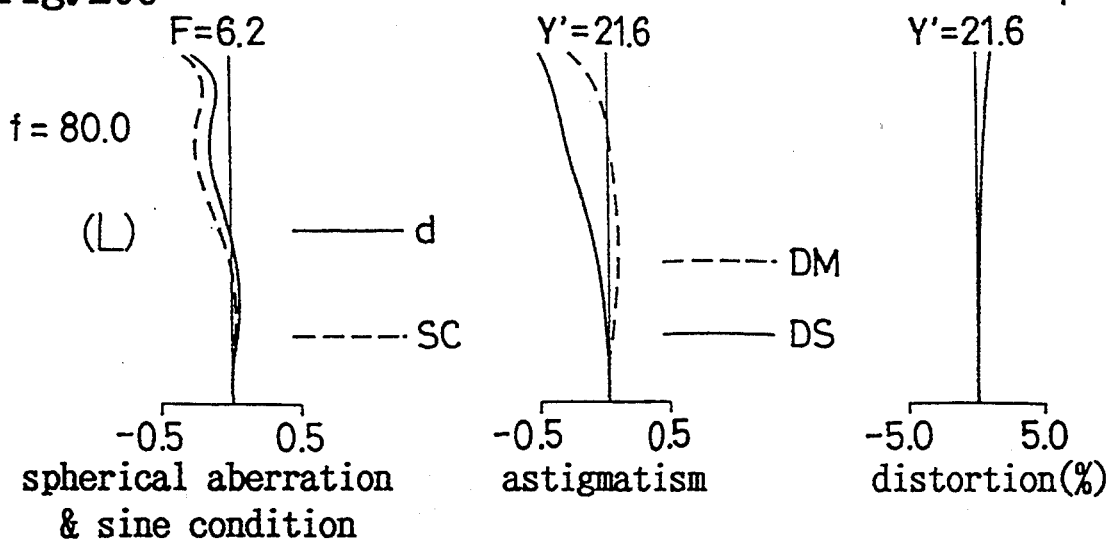
Figure 21A:
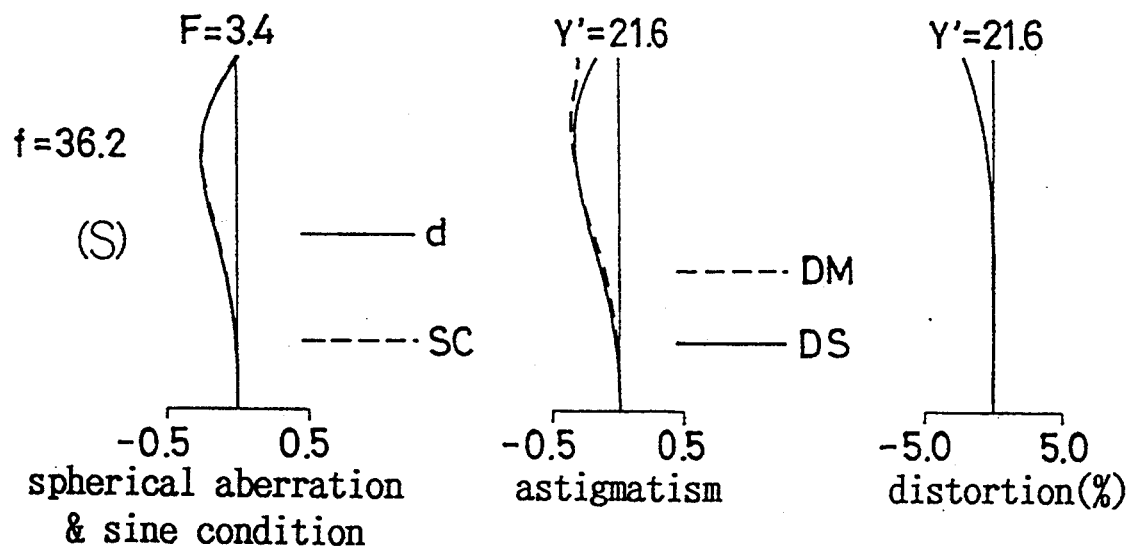
Figure 21B:
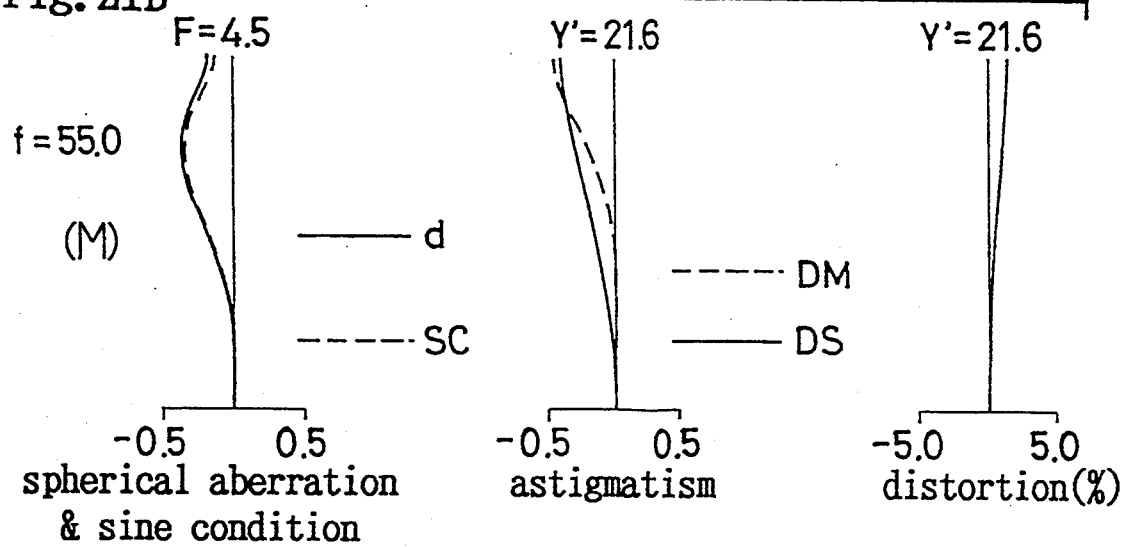
Figure 21C:
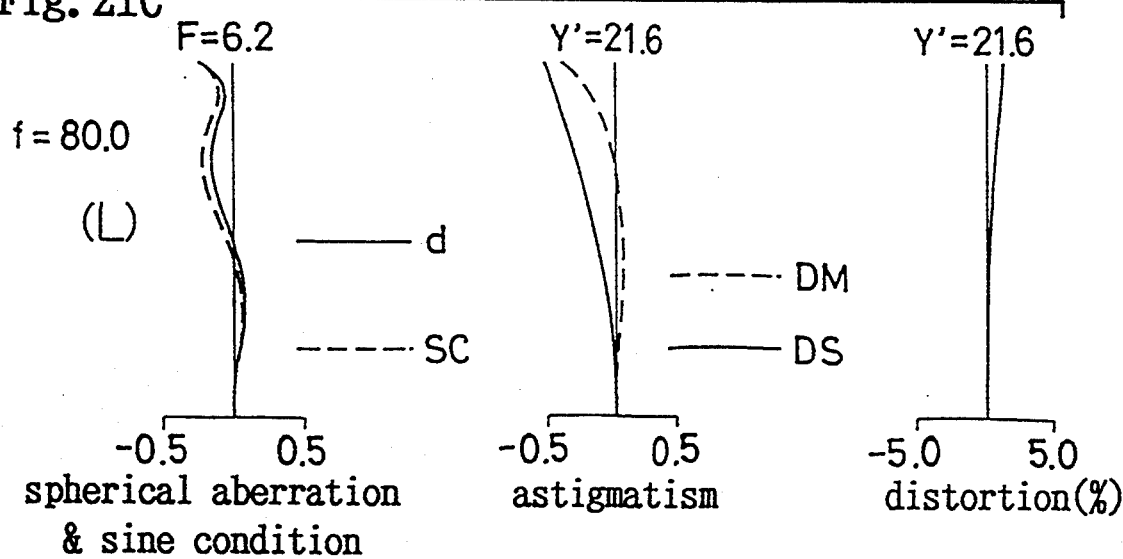
Figure 22A:
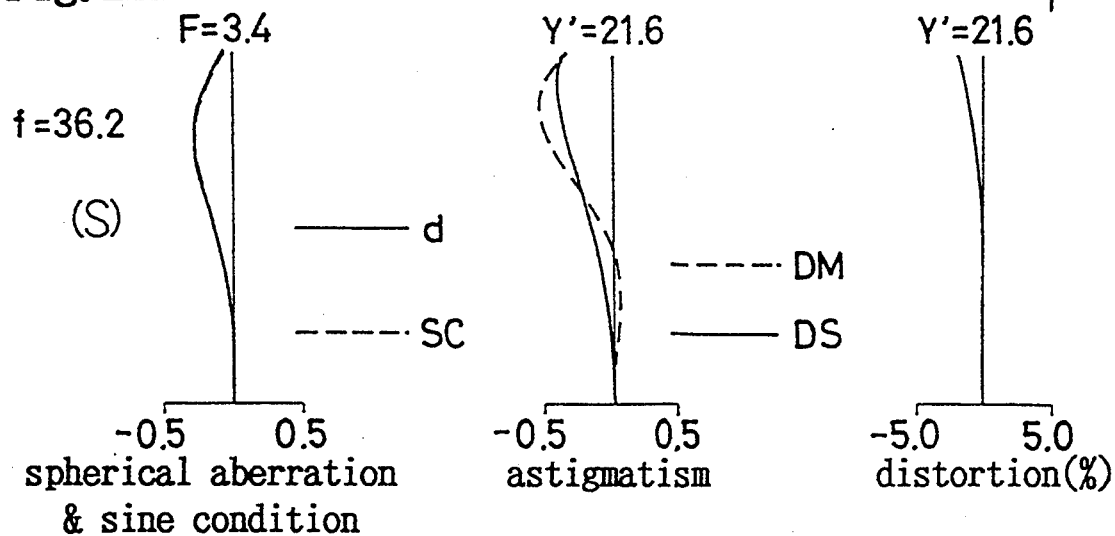
Figure 22B:
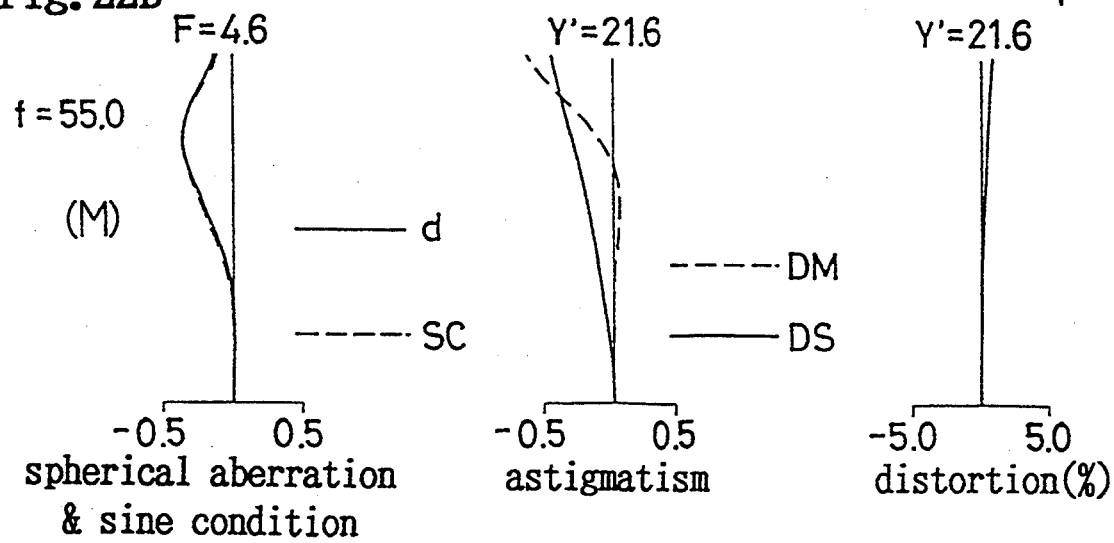
Figure 22C:
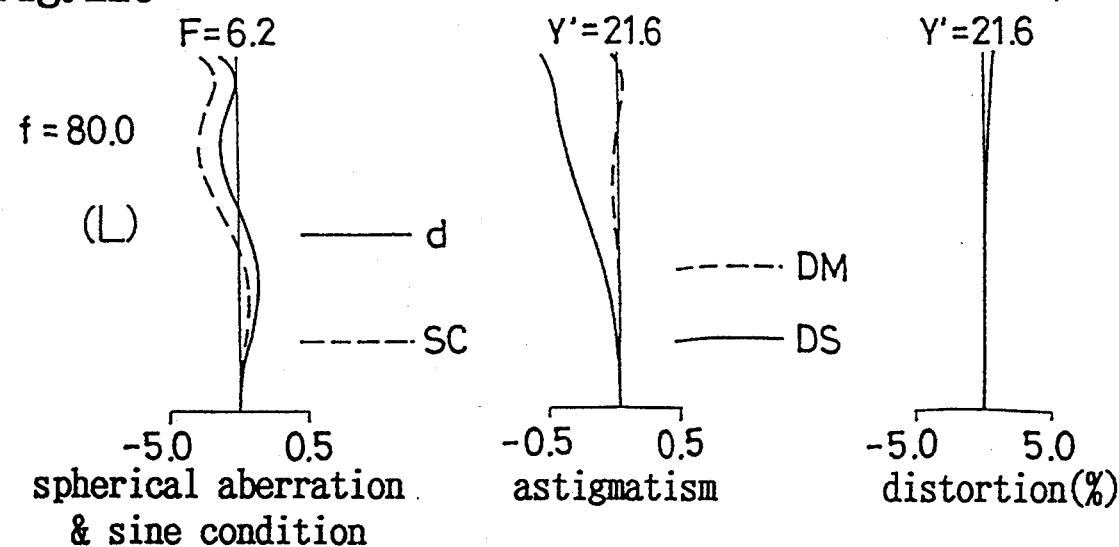
Figure 23A:
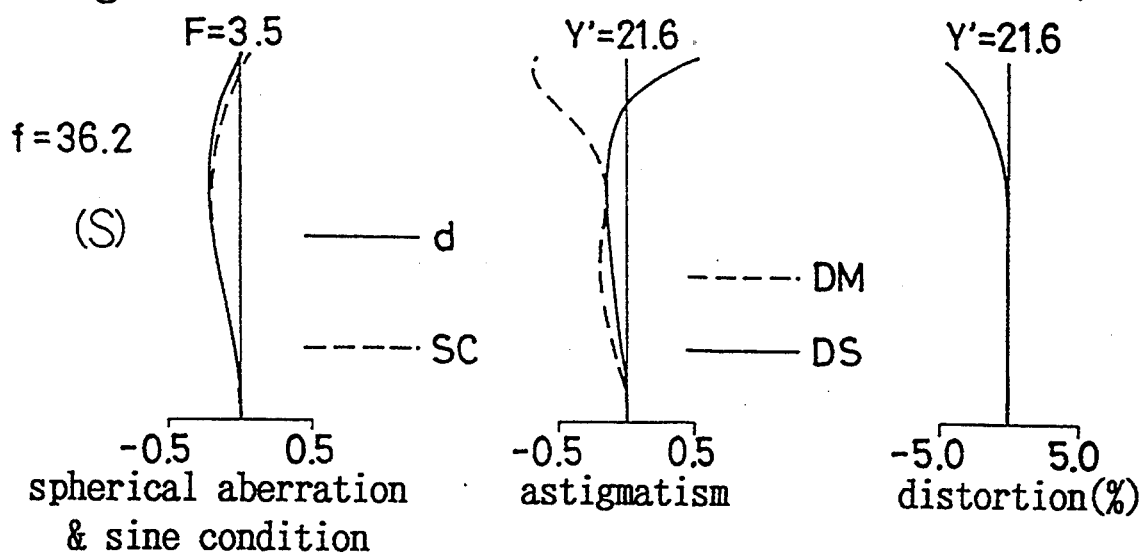
Figure 23B:
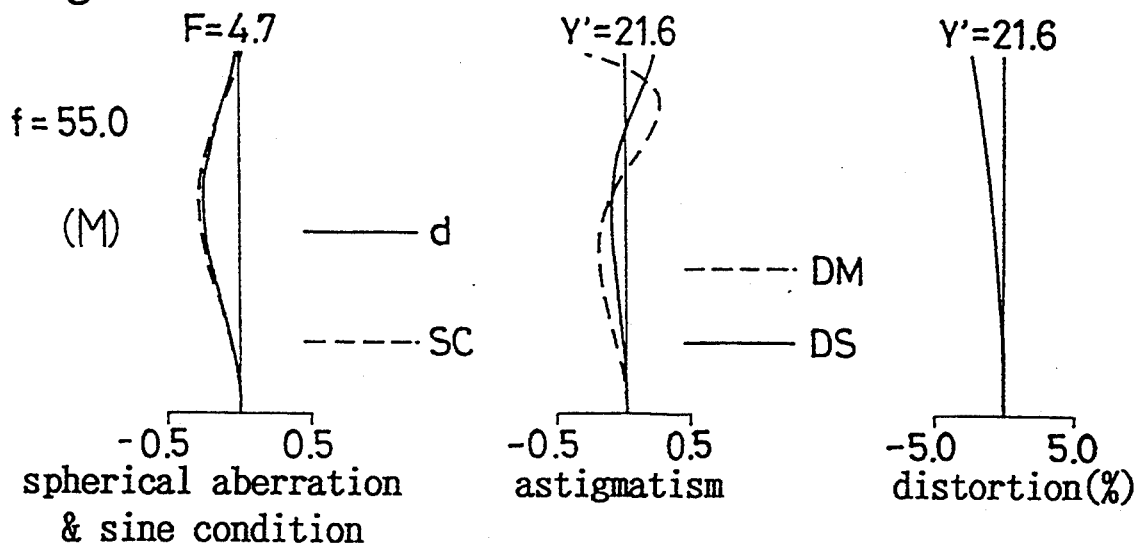
Figure 23C:
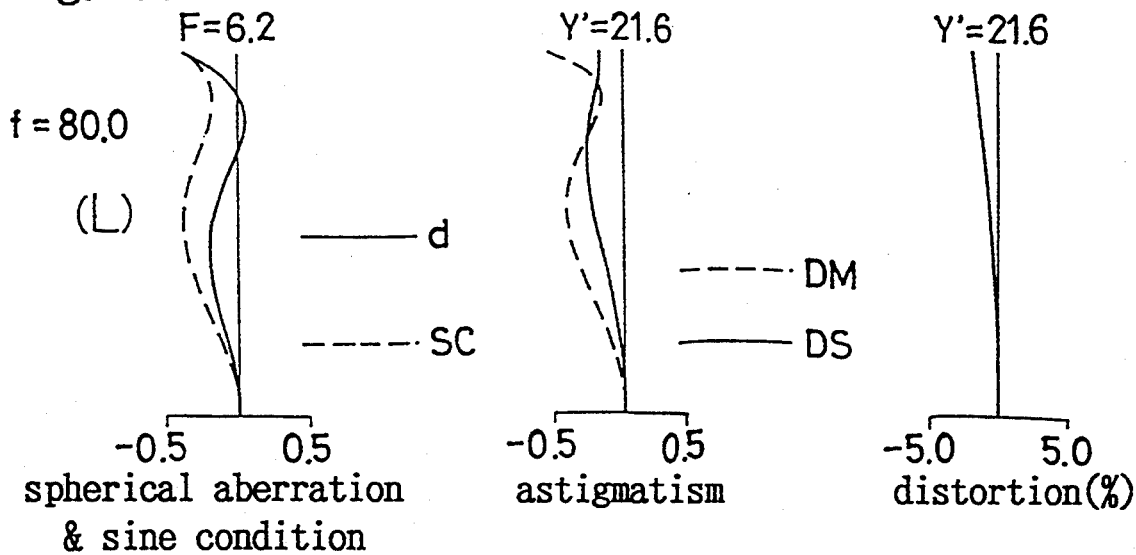
Figure 24A:
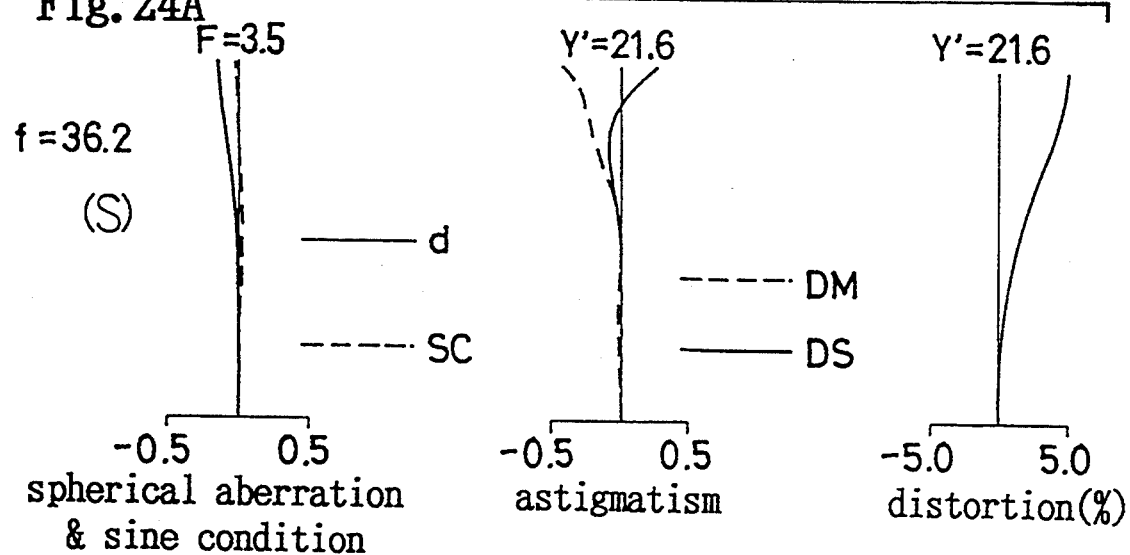
Figure 24B:
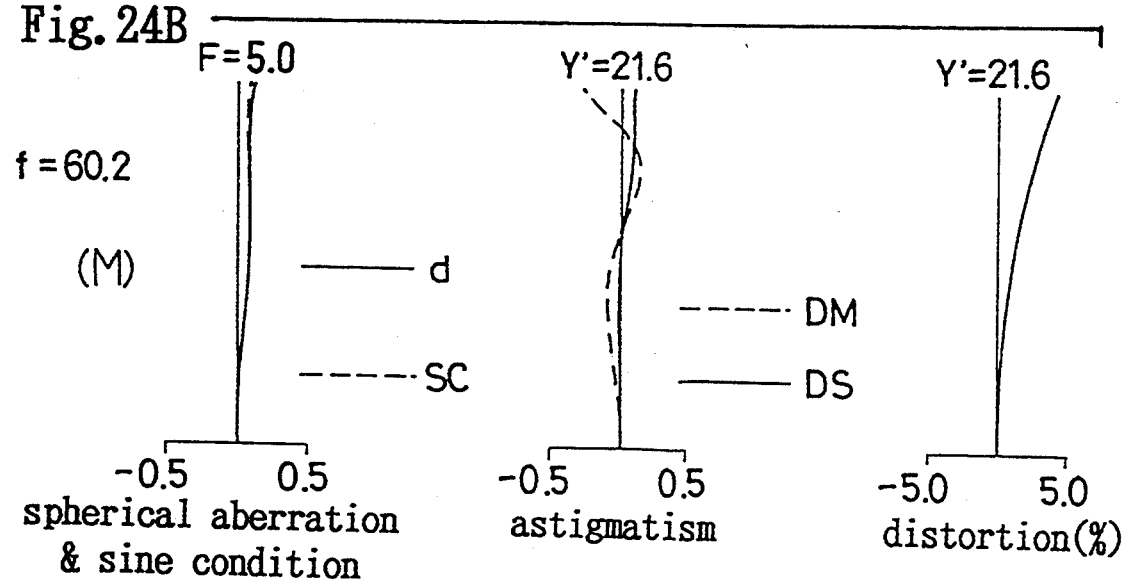
Figure 24C:
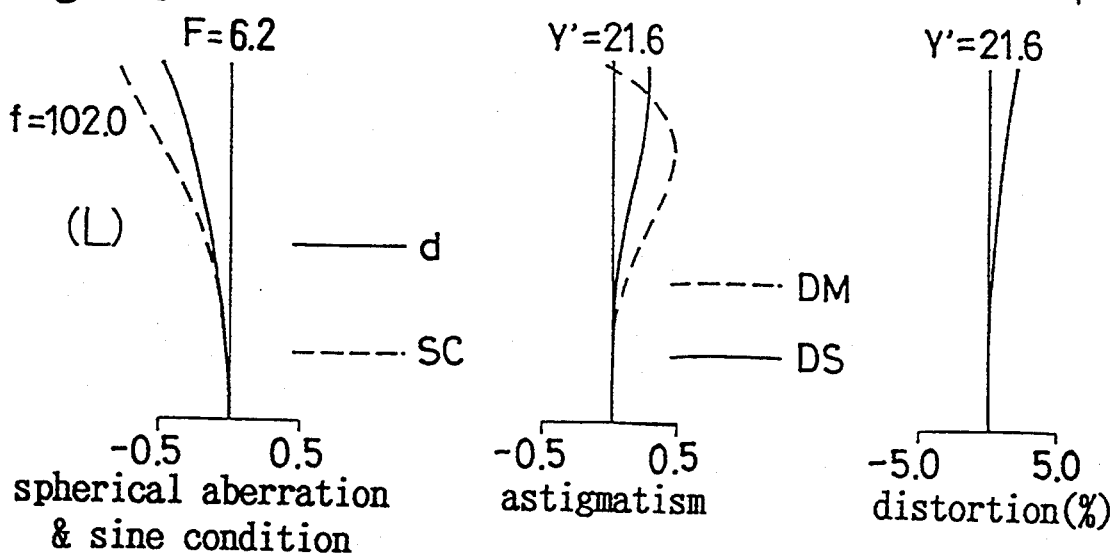
Figure 25A:
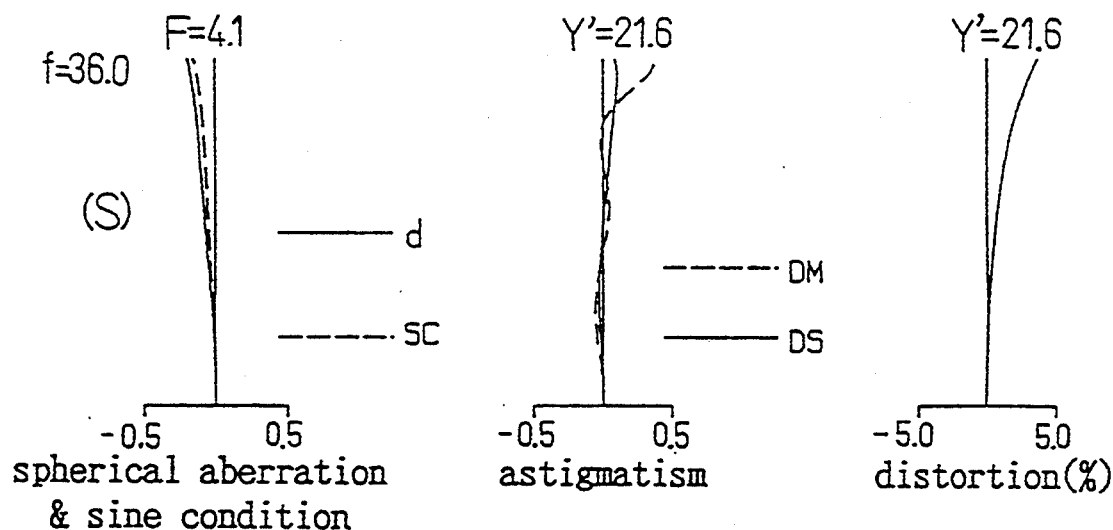
Figure 25B:
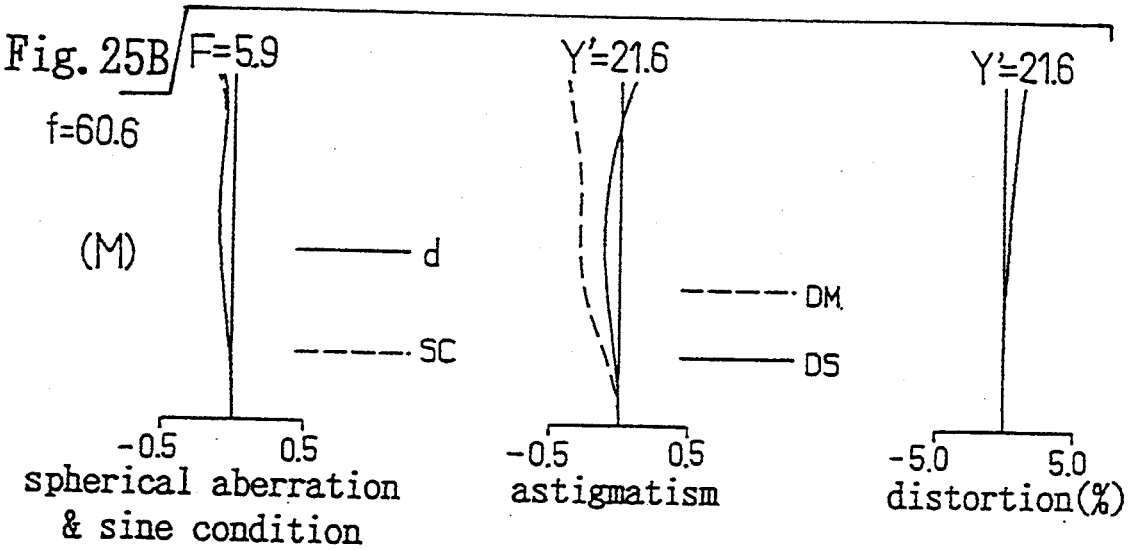
Figure 25C:
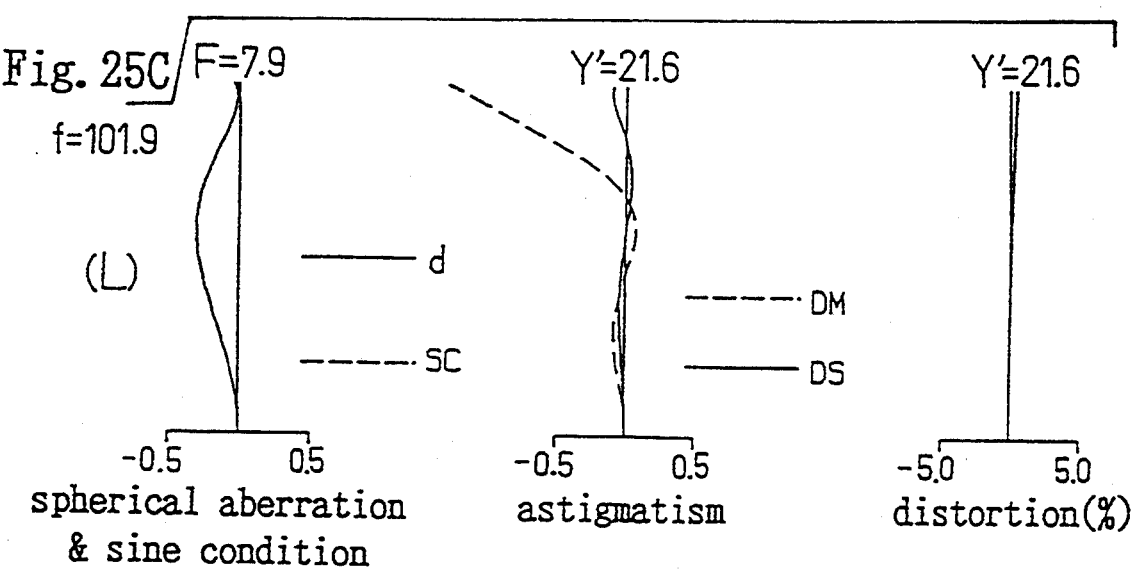
Figure 26A:
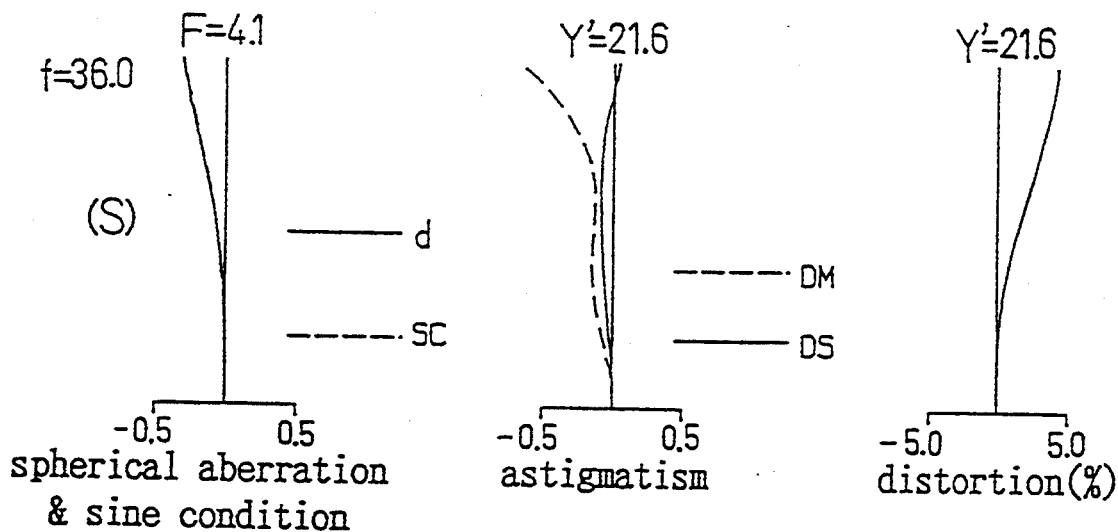
Figure 26B:
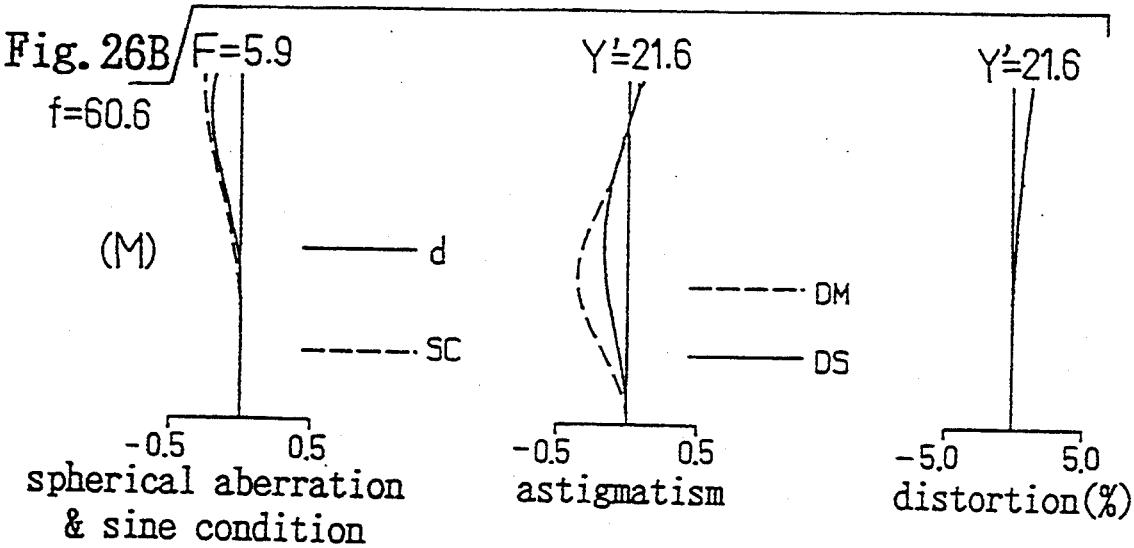
Figure 26C:
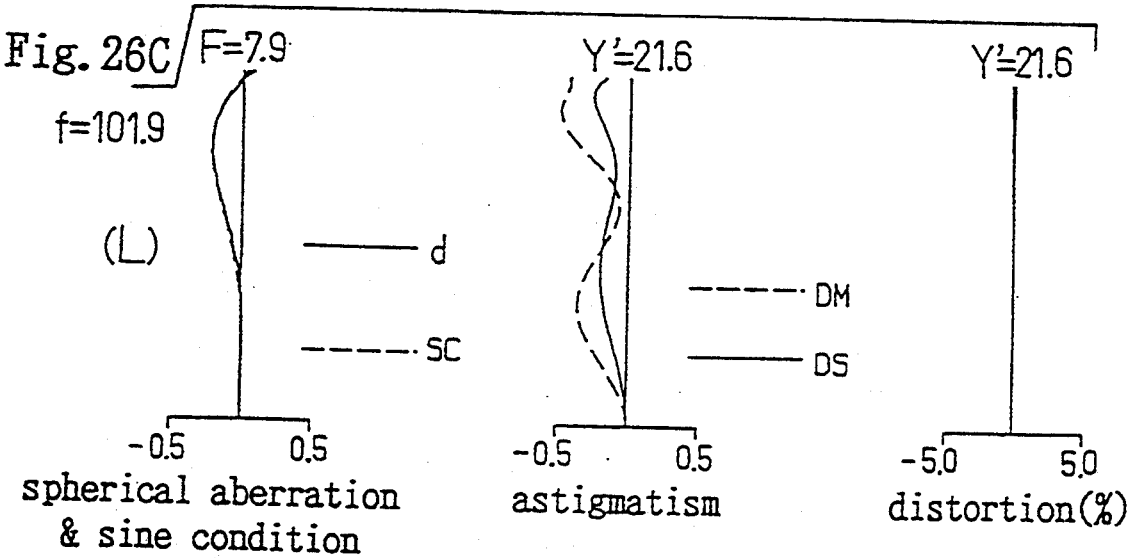

In order to realize a compact zoom lens, it is required to decrease the total length and the movement of the lens elements. As a zoom lens system having a short back focal distance like a zoom lens system for an LS (lens shutter) camera, a zoom lens system having two lens components, that is, a first lens component with a positive refractive power and a second lens component with a negative refractive power is common.

In the present invention, however, a zoom lens system is provided with three lens components, that is, a first lens component with a positive refractive power, a second lens component with a positive refractive power and a third lens component with a negative refractive power, whereby a higher variable power is realized. In a zooming operation from the shortest to the longest focal length conditions, all of the three lens components move toward the object side. At this time, the distance between the first and second lens components increases, and the distance between the second and third lens components decreases.

In order to realize a compactness and to secure a sufficient back focal distance in a three-component zoom lens system having a positive, a positive and a negative lens components like the zoom lens system according to the present invention, the refractive power of each lens component has to be increased, which tends to deteriorate aberration. To prevent such a tendency, aspherical surfaces are employed for the present invention. Therefore, firstly, it will be explained how the aspherical surfaces should be employed for each lens component in order to effectively correct aberrations.

Firstly, the first lens component will be explained. It is required that the first lens component has at least one aspherical surface. In this case, when an aspherical surface is employed for a foremost lens element of the first lens component, the aspherical surface is effective for preventing the generation of coma on the periphery of the image plane and correcting third-order spherical aberration. Moreover, when an aspherical surface is employed for a rearmost lens element of the first lens component, the aspherical surface is effective for correcting spherical aberration (especially higher order-spherical aberration). Further, it is more effective to employ a bi-aspherical lens element for the first lens component, since the aberrations which cannot completely be corrected by the object side aspherical surface can be corrected by the image side aspherical surface. For example, when a bi-aspherical surface is employed for the foremost lens element of the first lens component, the coma, on the periphery of the image plane, which cannot completely be corrected by the object side aspherical surface can be corrected by the image side aspherical surface. At this time, the image side aspherical surface also corrects higher-order spherical aberration. As described above, the aspherical surface employed for the first lens component, which is effective especially for correcting spherical aberration, is also useful to correct coma.

Now, lens arrangements, positions and surface configurations of the aspherical surface will be described which are the most effective in arranging the first lens component so that it is compact and has a high performance. To realize a compactness while maintaining a required performance, it is preferable that the first lens component is composed of two lens elements of a positive and a negative lens elements. If the first lens component is composed of only one lens element, it becomes difficult to correct chromatic aberration to some extent in the first lens component. On the contrary, if the first lens component is composed of three or more lens elements, although it is advantageous in realizing a high performance, a compactness and low cost cannot satisfactorily be realized. Therefore, in order to realize a satisfactory compactness and low cost as well as correct chromatic aberration, it is preferable that the first lens component is composed of two lens elements of a positive and a negative lens elements. Further, it is preferable to arrange the two lens elements as follows: from the object side, a negative meniscus lens element whose object side surface is convex and a positive lens element whose object side surface is convex. When the first lens component is arranged as described above, it is effective to employ an aspherical surface for the image side surface of the negative meniscus lens element or for the object side surface of the positive lens element. Hereupon, it is preferable that the aspherical surface employed for the image side surface of the negative meniscus lens element has a configuration to decrease the refractive power of the first lens component. On the contrary, it is preferable that the aspherical surface employed for the object side surface of the positive lens element has a configuration to increase the refractive power of the first lens component.

Secondly, the second lens component will be explained. It is required that the second lens component has at least one aspherical surface. The aspherical surface employed for the second lens component is used for correcting the aberrations (especially higher-order coma) which cannot completely be corrected by the aspherical surface of the first lens component as well as for correcting spherical aberration. Moreover, when a bi-aspherical surface is employed for the second lens component, spherical aberration is corrected by the object side surface and the aberration over-corrected by the object side aspherical surface can be corrected by the image side aspherical surface.

Now, lens arrangements and positions of the aspherical surface will be described which is effective in arranging the second lens component so that it is compact and has a high performance. To realize a compactness and low cost while maintaining a required performance, it is preferable that the second lens component begins with the order of, from the object side, a negative lens element and a positive lens element. In this case, it is effective that the object side surface of the negative lens element and the image side surface of the positive lens element are aspherical. Moreover, in the three-component lens system having a positive, a positive and a negative lens components like the zoom lens system according to the present invention, it is preferable that an aperture is arranged in the second lens component or on the image side of the second lens component. When the aperture is arranged in the second lens component, it is preferable that the aperture is arranged behind the aforementioned positive lens element. In this case, combination of a positive and negative lens elements is preferable as the lens elements succeeding the aforementioned negative and positive lens elements, since chromatic aberration has to be corrected only by the succeeding lens elements. Although there is no restriction with respect to the arrangement of the positive and negative lens elements, it is more preferable that the lens elements are arranged in the order of, from the object side, the negative lens element and the positive lens element.

Lastly, the third lens component will be explained. It is preferable that the third lens component has at least two aspherical surfaces. In this case, when an aspherical surface is employed for a foremost lens element of the third lens component, the aspherical surface is effective for correcting distortion in a condition in the vicinity of the shortest focal length condition and spherical aberration in a condition in the vicinity of the longest focal length condition. Moreover, when an aspherical surface is employed for a rearmost lens element of the third lens component, the aspherical surface is effective for correcting field of curvature. Further, when a bi-aspherical lens element is employed for the foremost lens element of the third lens component, the coma, on the periphery of the image plane, which cannot completely be corrected by the object side aspherical surface can be corrected by the image side aspherical surface.

Now, lens arrangements, positions and surface configurations of the aspherical surfaces will be described which is effective in arranging the third lens component so that it is compact and has a high performance. To satisfactorily realize a compactness and low cost while maintaining a required performance, it is preferable that the third lens component is composed of two lens elements, that is, a positive and a negative lens elements. The reason for this is the same as the reason why the first lens component is composed of two lens elements. In this case, it is preferable to arrange the two lens elements as follows: from the object side, a positive meniscus lens element whose image side surface is convex and a negative meniscus lens element whose image side surface is convex. When the third lens component is arranged as described above, it is effective that the aspherical surfaces are employed for the object side surface of the positive meniscus lens element and for the object side surface of the negative meniscus lens element. It is preferable that at least one of the above aspherical surfaces has a configuration to decrease the refractive power of the third lens component.

When an aspherical surface is employed for the first lens component, it is possible that only one aspherical surface is employed for the third lens component.

Effective surface configurations of aspherical surfaces employed for the present invention will hereinafter be described.

When aspherical surfaces are employed for the first lens component, as least one of the aspherical surfaces preferably fulfills the following condition (1):

$$0 < |\phi_1 \cdot (N' - N) \cdot d/dy \cdot \{X(y) - X_o(y)\}| < 0.05 \quad (1)$$

wherein:
an arbitrary height Y in a direction perpendicular to the optical axis is defined by $0.7Y_{max} < Y < Y_{max}$ where $Y_{max}$ represents the maximum effective aperture of an aspherical surface;
$\phi_1$ represents the refractive power of the first lens component;
N represents the refractive index of an object side medium of an aspherical surface;
N' represents the refractive index of an image side medium of an aspherical surface;
X(y) represents the surface configuration of an aspherical surface; and
$X_o(y)$ represents the reference surface configuration of an aspherical surface.

The condition (1) is a condition for correcting spherical aberration, coma and flare. When the upper limit of the condition (1) is exceeded, spherical aberration is under-corrected or over-corrected in the entire focal length range, whereby inward coma and flare are produced. It is further preferable that all the aspherical surfaces employed for the first lens component fulfill the following conditions:

① When the positive refractive power of the aspherical surface decreases (the negative refractive power increases) gradually along the height Y:

$$-0.05 < \phi_1 \cdot (N' - N) \cdot d/dy \cdot \{X(y) - X_o(y)\} < 0.01 \quad (2)$$

wherein an arbitrary height Y in a direction perpendicular to the optical axis is defined by $0 < Y < 0.7Y_{max}$ where $Y_{max}$ represents the maximum effective aperture of an aspherical surface.

When the upper limit of the condition (2) is exceeded, zonal spherical aberration takes a high negative value, so that a deviation of a focusing position caused by the closing of the aperture becomes a problem. When the lower limit of the condition (2) is exceeded, the aberration correction effect on spherical aberration to a zonal luminous flux becomes excessive, which makes it difficult to correct spherical aberration and other aberrations in a well-balanced condition. (In this case, spherical aberration tends to have a wavy form.)

②  When the negative refractive power of the aspherical surface decreases (the positive refractive power increases) gradually along the height Y:

$$-0.01 < \phi_1 \cdot (N'-N) \cdot d/dy \cdot \{X(y) - X_o(y)\} < 0.05 \qquad (3)$$

wherein an arbitrary height Y in a direction perpendicular to the optical axis is defined by $0 < Y < 0.7Y\max$ where Ymax represents the maximum effective aperture of an aspherical surface.

When the lower limit of the condition (3) is exceeded, zonal spherical aberration takes a high negative value, so that a deviation of a focusing position caused by the closing of the aperture becomes a problem. When the upper limit of the condition (3) is exceeded, the aberration correction effect on spherical aberration to a zonal luminous flux becomes excessive, which makes it difficult to correct spherical aberration and other aberrations in a well-balanced condition. (In this case, spherical aberration tend to have a wavy form.)

Further, when a bi-aspherical lens element is employed for the first lens component, the front surface of the bi-aspherical lens preferably fulfills the following conditions (4) or (6); and the rear surface, the following conditions (5) or (7):

③ When the positive refractive power of the front aspherical surface decreases (the negative refractive power increases) gradually along the height Y:

$$-0.06 < \phi_1 \cdot (N'-N) \cdot d/dy \cdot \{X(y) - X_o(y)\} < 0 \qquad (4)$$

wherein an arbitrary height Y in a direction perpendicular to the optical axis is defined by $0.7Y\max < Y < Y\max$ where Ymax represents the maximum effective aperture of the front aspherical surface; and $$0 < \phi_1 \cdot (N'-N) \cdot d/dy \cdot \{X(y) - X_o(y)\} < 0.06 \qquad (5)$$

wherein an arbitrary height Y in a direction perpendicular to the optical axis is defined by $0.7Y\max < Y < Y\max$ where Ymax represents the maximum effective aperture of the rear aspherical surface.

In the first lens component, the condition (4) indicates that the positive refractive power of the aspherical surface fulfilling the condition (4) decreases (the negative refractive power increases) gradually along the height Y. When the lower limit of the condition (4) is exceeded, the inclination of spherical aberration toward the under side cannot be corrected into the inclination toward the over side in the third-order aberration area. Moreover, with respect to an axial luminous flux passing far away from the optical axis of the lens, spherical aberration is overcorrected to incline toward the over side. Thereupon, in order to return the inclination toward the over side to that toward the under side, an aspherical surface which fulfills the condition (5), that is, an aspherical surface whose negative refractive power decreases (positive refractive power increases) gradually along the height Y is employed for the rear surface.

Further, these aspherical surfaces prevent the generation of coma. For example, when the lower limit of the condition (4) is exceeded, off-axial lateral aberration to the lower light droops downward, whereby inward coma is produced. Preferably, the deviation amount, from the reference surface, of the aspherical surface fulfilling the condition (4) is larger than that of the aspherical surface fulfilling the condition (5).

④ When the positive refractive power of the front aspherical surface increases (the negative refractive power decreases) gradually along the height Y:

$$0 < \phi_1 \cdot (N'-N) \cdot d/dy \cdot \{X(y) - X_o(y)\} < 0.06 \qquad (6)$$

wherein an arbitrary height Y in a direction perpendicular to the optical axis is defined by $0.7Y\max < Y < Y\max$ where Y represents the maximum effective aperture of the front aspherical surface; and $$-0.06 < \phi_1 \cdot (N'-N) \cdot d/dy \cdot \{X(y) - X_o(y)\} < 0 \qquad (7)$$

wherein an arbitrary height Y in a direction perpendicular to the optical axis is defined by $0.7Y\max < Y < Y\max$ where Ymax represents the maximum effective aperture of the rear aspherical surface.

In the first lens component, the condition (6) indicates that the negative refractive power of an aspherical surface fulfilling the condition (6) decreases (the positive refractive power increases) gradually along the height Y. When the upper limit of the condition (6) is exceeded, the inclination of spherical aberration toward the over side cannot be corrected into the inclination toward the under side in the third-order aberration area. Moreover, with respect to an axial luminous flux passing far away from the optical axis, spherical aberration is over-corrected to incline toward the under side. Thereupon, in order to return the inclination toward the under side to that toward the over side, an aspherical surface which fulfills the condition (7), that is, an aspherical surface whose negative refractive power increases (positive refractive power decreases) gradually along the height Y is employed for the rear surface.

Further, these aspherical surfaces prevent the generation of flare. For example, when the upper limit of condition (6) is exceeded, off-axial lateral aberration to the lower light leaps upward, whereby flare is caused.

Preferably, the deviation amount, from the reference surface, of the aspherical surface fulfilling the condition (7) is larger than that of the aspherical surface fulfilling the condition (6).

Further, when a bi-aspherical lens element is employed for the first lens component, the bi-aspherical lens element preferably fulfills the following condition (8):

$$0.05 < d_{DSASP1}/H_{DSASP1} < 1.5 \qquad (8)$$

wherein:

$d_{DSASP1}$ represents the axial thickness of a bi-aspherical lens element; and $H_{DSASP1}$ represents the effective aperture of a bi-aspherical lens element.

The condition (8) stipulates the axial thickness of a bi-aspherical lens element employed for the first lens component. When the lower limit of the condition (8) is exceeded, the positions (heights), on the front and rear surfaces of the lens, through which a light beam passes almost coincide, so that the aberration correction effect, especially with respect to axial light, of the rear surface is almost gone. (It becomes useless to employ a bi-aspherical lens element.) When the upper limit of the condition (8) is exceeded, the axial thickness of the lens becomes excessive, so that it becomes difficult to manufacture the lens.

When aspherical surfaces are employed for the second lens component, at least one of the aspherical surfaces preferably fulfills the following condition:

$$0 < |\phi_2 \cdot (N' - N) \cdot d/dy \cdot \{X(y) - X_o(y)\}| < 0.04 \qquad (9)$$

wherein:

an arbitrary height Y in a direction perpendicular to the optical axis is defined by $0.7Y_{max} < Y < Y_{max}$ where $Y_{max}$ represents the maximum effective aperture of an aspherical surface; and $\phi_2$ represents the refractive power of the second lens component.

The condition (9) is a condition for correcting spherical aberration. When the upper limit of the condition (9) is exceeded, spherical aberration is under-corrected or over-corrected in the entire focal length range.

It is further preferable that all the aspherical surfaces employed for the second lens component fulfill the following conditions:

(5) When the positive refractive power of the aspherical surfaces decreases (the negative refractive power increases) gradually along the height Y:

$$-0.03 < \phi_2 \cdot (N' - N) \cdot d/dy \cdot \{X(y) - X_o(y)\} < 0.01 \qquad (10)$$

wherein an arbitrary height Y in a direction perpendicular to the optical axis is defined by $0 < Y < 0.7Y_{max}$ where $Y_{max}$ represents the maximum effective aperture of an aspherical surface.

When the upper limit of the condition (10) is exceeded, zonal spherical aberration takes a high negative value, so that a deviation of a focusing position caused by the closing of the aperture becomes a problem. When the lower limit of the condition (10) is exceeded, the aberration correction effect on spherical aberration to a zonal luminous flux becomes excessive, which makes it difficult to correct spherical aberration and other aberrations in a well-balanced condition. (In this case, spherical aberration tend to have a wavy form.)

(6) When the negative refractive power of the aspherical surfaces decreases (the positive refractive power increases) gradually along the height Y:

$$-0.01 < \phi_2 \cdot (N' - N) \cdot d/dy \cdot \{X(y) - X_o(y)\} < 0.03 \qquad (11)$$

wherein an arbitrary height Y in a direction perpendicular to the optical axis is defined by $0 < Y < 0.7Y_{max}$ where $Y_{max}$ represents the maximum effective aperture of an aspherical surface.

When the lower limit of the condition (11) is exceeded, zonal spherical aberration takes a high negative value, so that a deviation of a focusing position caused by the closing of the aperture becomes a problem. When the upper limit of the condition (10) is exceeded, the aberration correction effect on spherical aberration to a zonal luminous flux becomes excessive, which makes it difficult to correct spherical aberration and other aberrations in a well-balanced condition. (In this case, spherical aberration tend to have a wavy form.)

Further, when a bi-aspherical lens element is employed for the second lens component, the front surface of the bi-aspherical lens preferably fulfills the following conditions (12) or (14); the rear surface, the following conditions (13) or (15):

(7) When the positive refractive power of the front aspherical surface decreases (the negative refractive power increases) gradually along the height Y:

$$-0.04 < \phi_2 \cdot (N' - N) \cdot d/dy \cdot \{X(y) - X_o(y)\} < 0 \qquad (12)$$

wherein an arbitrary height Y in a direction perpendicular to the optical axis is defined by $0.7Y_{max} < Y < Y_{max}$ where $Y_{max}$ represents the maximum effective aperture of the front aspherical surface; and $$0 < \phi_2 \cdot (N' - N) \cdot d/dy \cdot \{X(y) - X_o(y)\} < 0.04 \qquad (13)$$

wherein an arbitrary height Y in a direction perpendicular to the optical axis is defined by $0.7Y_{max} < Y < Y_{max}$ where $Y_{max}$ represents the maximum effective aperture of the rear aspherical surface.

In the second lens component, the condition (12) indicates that the positive refractive power of the aspherical surface fulfilling the condition (12) decreases (the negative refractive power increases) gradually along the height Y. When the lower limit of the condition (12) is exceeded, the inclination of spherical aberration toward the under side cannot be corrected into the inclination toward the over side in the third-order aberration area. Moreover, with respect to an axial luminous flux passing far away from the optical axis of the lens, spherical aberration is over-corrected to incline toward the over side. Thereupon, in order to return the inclination toward the over side to that toward the under side, an aspherical surface which fulfills the condition (13), that is, an aspherical surface whose negative refractive power decreases (positive refractive power increases) gradually along the height Y is employed for the rear surface.

Further, these aspherical surfaces prevent the generation of the higher-order coma which cannot completely be prevented by the first lens component. For example, when the lower limit of the condition (12) is exceeded, off-axial peripheral coma and zonal coma become large, whereby lateral aberration tends to wave.

(8) When the positive refractive power of the front aspherical surface increases (the negative refractive power decreases) gradually along the height Y:

$$0 < \phi_2 \cdot (N' - N) \cdot d/dy \cdot \{X(y) - X_o(y)\} < 0.04 \qquad (14)$$

wherein an arbitrary height Y in a direction perpendicular to the optical axis is defined by $0.7Y_{max} < Y < Y_{max}$ where $Y_{max}$ represents the maximum effective aperture of the front aspherical surface; and $$-0.04 < \phi_2 \cdot (N' - N) \cdot d/dy \cdot \{X(y) - X_o(y)\} < 0 \qquad (15)$$

wherein an arbitrary height Y in a direction perpendicular to the optical axis is defined by $0.7Y_{max} < Y < Y_{max}$ where $Y_{max}$ represents the maximum effective aperture of the rear aspherical surface.

In the second lens component, the condition (14) indicates that the positive refractive power of the aspherical surface fulfilling the condition (14) increases (the negative refractive power decreases) gradually along the height Y. When the upper limit of the condition (14) is exceeded, the inclination of spherical aberration toward the over side cannot be corrected into the inclination toward the under side in the third-order aberration area. Moreover, with respect to an axial luminous flux passing far away from the optical axis, spherical aberration is over-corrected to incline toward the under side. Thereupon, in order to return the inclination toward the under side to that toward the over side, an aspherical surface which fulfills the condition (15), that is, an aspherical surface whose negative refractive power increases (the positive refractive power decreases) gradually along the height Y is employed for the rear surface.

Further, these aspherical surfaces prevent the generation of the higher-order coma which cannot completely be prevented by the first lens component. For example, when the lower limit of the condition (12) is exceeded, off-axial peripheral coma and zonal coma becomes large, whereby lateral aberration tends to wave.

Further, when a bi-aspherical lens element is employed for the second lens component, the bi-aspherical lens element preferably fulfills the following condition (16):

$$0.05 < d_{DSASP2}/H_{DSASP2} < 1.8 \quad (16)$$

wherein:

$d_{DSASP2}$ represents the axial thickness of a bi-aspherical lens element; and $H_{DSASP2}$ represents the effective aperture of a bi-aspherical lens element.

The condition (16) stipulates the axial thickness of a bi-aspherical lens element employed for the second lens component. When the lower limit of the condition (16) is exceeded, the positions (heights), on the front and rear surfaces of the lens, through which a light beam passes almost coincide, so that the aberration correction effect, especially with respect to axial light, of the rear surface is almost gone. (It becomes useless to employ a bi-aspherical lens element.) When the upper limit of the condition (16) is exceeded, the axial thickness of the lens becomes excessive, so that it becomes difficult to manufacture the lens.

When aspherical surfaces are employed for the third lens component, at least one of the aspherical surfaces preferably fulfills the following condition:

$$0 < |\phi_3 \cdot (N'-N) \cdot d/dy \cdot (X(y) - X_0(y))| < 0.12 \quad (17)$$

wherein:

an arbitrary height Y in a direction perpendicular to the optical axis is defined by $0.8Y\max < Y < Y\max$ where Ymax represents the maximum effective aperture of an aspherical surface; and $\phi_3$ represents the refractive power of the third lens component.

The condition (17) is a condition for correcting distortion and field curvature in a well-balanced condition. When the upper limit of the condition (17) is exceeded, the distortion at the shortest focal length condition takes a high positive value and the tendency for the image plane to be distorted in a negative direction remarkably increases in the entire focal length range.

It is further preferable that all the aspherical surfaces employed for the third lens component fulfill the following conditions:

⑨ When the negative refractive power of the aspherical surfaces decreases (the positive refractive power increases) gradually along the height Y:

$$-0.12 < \phi_3 \cdot (N'-N) \cdot d/dy \cdot \{X(y) - X_0(y)\} < 0.04 \quad (18)$$

wherein an arbitrary height Y in a direction perpendicular to the optical axis is defined by $0 < Y < 0.8Y\max$ where Ymax represents the maximum effective aperture of an aspherical surface.

When the upper limit of the condition (18) is exceeded, the tendency for positive distortion and field curvature to shift in a positive direction increases in the range between the shortest and middle focal length conditions. When the lower limit of the condition (18) is exceeded, negative distortion increases in the range between the middle and longest focal length conditions, and further, the tendency for field curvature to shift in a negative direction remarkably increases in the entire focal length range.

10 When the positive refractive power of the aspherical surfaces decreases (the negative refractive power increases) gradually along the height Y:

$$-0.04 < \phi_3 \cdot (N'-N) \cdot d/dy \cdot \{X(y) - X_0(y)\} < 0.12 \quad (19)$$

wherein an arbitrary height Y in a direction perpendicular to the optical axis is defined by $0 < Y < 0.8Y\max$ where Ymax represents the maximum effective aperture of an aspherical surface.

When the lower limit of the condition (19) is exceeded, the tendency for positive distortion and field curvature to shift in a positive direction increases in the range between the shortest and middle focal length conditions. When the upper limit of the condition (19) is exceeded, negative distortion increases in the range between the middle and longest focal length conditions, and further, the tendency for field curvature to shift in a negative direction remarkably increases in the entire focal length range.

Further, when a bi-aspherical lens element is employed for the third lens component, the front surface of the bi-aspherical lens preferably fulfills the following conditions (20) or (22); the rear surface, the following conditions (21) or (23):

11 When the negative refractive power of the front aspherical surface decreases (the positive refractive power increases) gradually along the height Y:

$$-0.12 < \phi_3 \cdot (N'-N) \cdot d/dy \cdot \{X(y) - X_0(y)\} < 0 \quad (20)$$

wherein an arbitrary height Y in a direction perpendicular to the optical axis is defined by $0.8Y\max < Y < Y\max$ where Ymax represents the maximum effective aperture of the front aspherical surface; and $$-0.04 < \phi_3 \cdot (N'-N) \cdot d/dy \cdot \{X(y) - X_0(y)\} < 0.12 \quad (21)$$

wherein an arbitrary height Y in a direction perpendicular to the optical axis is defined by $0.8Y\max < Y < Y\max$ where Ymax represents the maximum effective aperture of the rear aspherical surface.

In the third lens component, the condition (20) indicates that the negative refractive power of the aspherical surface fulfilling the condition (20) decreases (the positive refractive power increases) gradually along the height Y. When the lower limit of the condition (20) is exceeded, distortion increases in the vicinity of the shortest focal length condition, and field curvature inclines toward the under side. Moreover, by employing for the rear surface an aspherical surface fulfilling the condition (21), the field curvature which cannot completely be prevented by only the front surface is excellently corrected.

12 When the negative refractive power of the front aspherical increases surface (the positive refractive power decreases) gradually along the height Y:

$$0 < \phi_3 \cdot (N' - N) \cdot d/dy \cdot \{X(y) - X_o(y)\} < 0.12 \quad (22)$$

wherein an arbitrary height Y in a direction perpendicular to the optical axis is defined by $0.8Ymax < Y < Ymax$ where Ymax represents the maximum effective aperture of the front aspherical surface; and $$-0.12 < \phi_3 \cdot (N' - N) \cdot d/dy \cdot \{X(y) - X_o(y)\} < 0 \quad (23)$$

wherein an arbitrary height Y in a direction perpendicular to the optical axis is defined by $0.8Ymax < Y < Ymax$ where Ymax represents the maximum effective aperture of the rear aspherical surface.

In the third lens component, the condition (22) indicates that the negative refractive power of the aspherical surface fulfilling increases the condition (22) (the positive refractive power decreases) gradually along the height Y. When the upper limit of the condition (22) is exceeded, field curvature inclines toward the over side. Moreover, by employing for the rear surface an aspherical surface fulfilling the condition (23), the field curvature which cannot completely be prevented by only the front surface is excellently corrected.

Further, when a bi-aspherical lens element is employed for the third lens component, the bi-aspherical lens element preferably fulfills the following condition (24):

$$0.05 < d_{DSASP3}/H_{DSASP3} < 1.5 \quad (24)$$

wherein:

$d_{DSASP3}$ represents the axial thickness of a bi-aspherical lens element; and $H_{DSASP3}$ represents the effective aperture of a bi-aspherical lens element.

The condition (24) stipulates the axial thickness of a bi-aspherical lens element employed for the third lens component. When the lower limit of the condition (24) is exceeded, the positions (heights), on the front and rear surfaces of the lens, through which a light beam passes almost coincides, so that the aberration correction effect, especially with respect to axial light, of the rear surface is almost gone. (It becomes useless to employ a bi-aspherical lens element.) When the upper limit of the condition (24) is exceeded, the axial thickness of the lens becomes excessive, so that it becomes difficult to manufacture the lens.

The above is the description of the surface configurations of the aspherical surfaces. Further, the first and third lens components are preferably arranged so as to fulfill the following conditions (25) and (26):

$$0.20 < (\phi_W \cdot \phi_T)^{\frac{1}{2}}/(\beta \cdot \phi_1) < 1.25 \quad (25)$$

$$0.08 < (\phi_W \cdot \phi_T)^{\frac{1}{2}}/(\beta \cdot \phi_3) < 0.40 \, (\phi_3 < 0) \quad (26)$$

wherein:

$\phi_W$ represents the refractive power of the whole zoom lens system at the shortest focal length condition;

$\phi_T$ represents the refractive power of the whole zoom lens system at the longest focal length condition; and $\beta$ represents the zoom ratio ($\beta = \phi_T/\phi_W$).

The conditions (25) and (26) are the conditions for maintaining the total length of the zoom lens system, the movement amount a zooming operation, the back focal distance and the correction of aberrations in a well-balanced condition.

When the lower limit of the condition (25) is exceeded, the refractive power of the first lens component becomes too strong, so that it becomes difficult to maintain the back focal distance at the shortest focal length condition at an appropriate value (15% of the focal length at the shortest focal length condition). Thereby, the diameters of the succeeding lens components increase. When the upper limit of the condition (25) is exceeded, the movement amount of each lens component in a zooming operation becomes excessive, which is disadvantageous in constructing a lens barrel.

When the lower limit of the condition (26) is exceeded, the Petzval sum takes a high value, so that the image plane remarkably inclines in a positive direction, and further, field curvature at the shortest focal length condition takes a high positive value. When the upper limit of the condition (26) is exceeded, the change of the distance between the second and third lens components in a zooming operation should be large, so that the distance between the second and third lens components largely increases at the shortest focal length condition. Consequently, the total length of the zoom lens system increases.

Furthermore, it is effective that the following conditions are fulfilled:

$$0.3 < \phi_1/\phi_W < 1.5 \quad (27)$$

$$1.0 < |\phi_3/\phi_W| < 2.5 \, (\phi_3 < 0) \quad (28)$$

The condition (27) stipulates the ratio of the refractive power of the first lens component to that of the whole zoom lens system at the shortest focal length condition. When the upper limit of the condition (27) is exceeded, the refractive power of the first lens component becomes excessive, so that it becomes difficult to correct aberrations, especially spherical aberration, produced in the first lens component, even if aspherical surfaces are employed for the first lens component. When the lower limit of the condition (27) is exceeded, the tendency for inward coma to be produced remarkably increases on the periphery of the image plane.

The condition (28) stipulates the ratio of the refractive power of the third lens component to that of the whole zoom lens system at the shortest focal length condition. When the upper limit of the condition (28) is exceeded, the refractive power of the third lens component becomes excessive, so that it becomes difficult to correct aberrations, especially field curvature and distortion, produced in the third lens component, even if aspherical surfaces are employed for the third lens component. When the lower limit of the condition (28) is exceeded, the tendency for inward coma to be produced remarkably increases on the periphery of the image plane, and further, it becomes difficult to secure a sufficient back focal distance.

The aspherical surface configuration X(y) and the reference surface configuration $X_o(y)$ are defined by the following equations, respectively:

$$X(y) = r/\epsilon \cdot \{1 - (1 - \epsilon \cdot y^2/r^2)^{\frac{1}{2}}\} + \sum_{i \geq 2} A_i y^i$$
$$X_o(y) = *r \cdot \{1 - \epsilon \cdot y^2/*r^2)^{\frac{1}{2}}\}$$

wherein:
r represents the reference radius of curvature of an aspherical surface;
$\epsilon$ represents the conic constant;
$A_i$ represents the aspherical coefficient; and
*r represents paraxial radius of curvature of an aspherical surface ($1/*r = 1/r + 2A_2$).

FIGS. 1 to 13 are cross-sectional views of the optical systems of a first to thirteenth embodiments according to the present invention, respectively. In FIG. 1, the solid lines show the movement of each lens component from the shortest focal length condition (S) to the longest focal length condition (L).

FIGS. 14A, 14B and 14C to 26A, 26B and 26C show aberrations of the first to thirteenth embodiments, respectively. In each figure, (S) shows the aberrations at the shortest focal length condition; (M), the aberrations at the middle focal length condition; and (L), the aberrations at the longest focal length condition. A solid line d shows aberration to the d-line. A dotted line SC shows the sine condition. Dotted lines DM and DS show astigmatism on a meridional and a sagittal image planes, respectively.

The numerical data of the first to thirteenth embodiments according to the present invention are shown in Tables 1 to 13, wherein:
f represents the focal length of the whole zoom lens system;
F represents the minimum F-number;
$r_i$ (i=1,2,3, ...) represents the radius of curvature of the ith lens surface counted from the object side;
$d_i$ (i=1,2,3, ...) represents the ith axial distance counted from the object side;
$N_i$ (i=1,2,3, ...) represents the refractive index, to the d-line, of the ith lens counted from the object side; and
$\nu_i$ represents the Abbe number of the ith lens counted from the object side.

The asterisk in a radius of curvature column indicates that the surface is aspherical.

Tables 14 and 27 show the value, for each condition, of each embodiment.

Table 28 shows the number of aspherical surfaces employed for each embodiment.

TABLE 1

<Embodiment 1>

| f = 36.2~55.0~80.0 | | $F_{NO}$ = 3.4~4.5~6.2 | |
|---|---|---|---|
| Radius of Curvature | Axial Distance | Refractive Index | Abbe Number |
| $r_1^*$  63.093 | | | |
| | $d_1$  1.500 | $N_1$  1.76182 | $\nu_1$  26.55 |
| $r_2^*$  29.959 | | | |
| | $d_2$  1.000 | | |
| $r_3$  16.660 | | | |
| | $d_3$  3.200 | $N_2$  1.51680 | $\nu_2$  64.20 |
| $r_4^*$  −416.604 | | | |
| | $d_4$  2.600~7.289~9.694 | | |
| $r_5^*$  −61.801 | | | |
| | $d_5$  1.093 | $N_3$  1.80100 | $\nu_3$  46.54 |
| $r_6$  18.313 | | | |
| | $d_5$  1.539 | | |
| $r_7$  47.466 | | | |
| | $d_7$  3.492 | $N_4$  1.71736 | $\nu_4$  29.42 |
| $r_8^*$  −19.665 | | | |
| | $d_8$  3.795 | | |
| $r_9$  54.207 | | | |
| | $d_9$  1.695 | $N_5$  1.79850 | $\nu_5$  22.60 |
| $r_{10}^*$  17.721 | | | |
| | $d_{10}$  1.492 | | |
| $r_{11}$  36.824 | | | |
| | $d_{11}$  3.974 | $N_6$  1.51728 | $\nu_6$  69.68 |

TABLE 1-continued

<Embodiment 1>

| $r_{12}$  −13.659 | | | |
|---|---|---|---|
| | $d_{12}$  0.0 | | |
| $r_{13}$  ∞ (light restricting plate) | | | |
| | $d_{13}$  11.939~5.466~1.111 | | |
| $r_{14}^*$  −22.255 | | | |
| | $d_{14}$  2.699 | $N_7$  1.70055 | $\nu_7$  30.11 |
| $r_{15}$  −17.086 | | | |
| | $d_{15}$  3.418 | | |
| $r_{16}^*$  −12.252 | | | |
| | $d_{16}$  1.799 | $N_8$  1.67000 | $\nu_8$  57.07 |
| $r_{17}$  −188.626 | | | |

| Aspherical coefficient | |
|---|---|
| $r_1$: $\epsilon$ = 0.12885 × 10<br>$A_4$ = 0.52838 × $10^{-4}$<br>$A_6$ = −0.16127 × $10^{-6}$<br>$A_8$ = −0.94636 × $10^{-10}$ | $r_2$: $\epsilon$ = −0.50746 × 10<br>$A_4$ = 0.10023 × $10^{-3}$<br>$A_6$ = −0.17348 × $10^{-6}$<br>$A_8$ = 0.97667 × $10^{-9}$ |
| $r_4$: $\epsilon$ = 0.10166 × 10<br>$A_4$ = −0.10500 × $10^{-4}$<br>$A_6$ = −0.10580 × $10^{-6}$<br>$A_8$ = −0.32915 × $10^{-9}$ | $r_5$: $\epsilon$ = 0.38251 × 10<br>$A_4$ = −0.91710 × $10^{-4}$<br>$A_6$ = 0.11568 × $10^{-6}$<br>$A_8$ = 0.38759 × $10^{-8}$ |
| $r_8$: $\epsilon$ = 0.61569 × 10<br>$A_4$ = 0.85074 × $10^{-4}$<br>$A_5$ = 0.37075 × $10^{-6}$<br>$A_8$ = 0.28854 × $10^{-7}$ | $r_{10}$: $\epsilon$ = −0.71455 × 10<br>$A_4$ = 0.10021 × $10^{-5}$<br>$A_6$ = −0.69726 × $10^{-7}$<br>$A_8$ = −0.76029 × $10^{-9}$ |
| $r_{14}$: $\epsilon$ = 0.10000 × 10<br>$A_4$ = 0.18002 × $10^{-4}$<br>$A_6$ = −0.19331 × $10^{-6}$<br>$A_8$ = 0.71173 × $10^{-8}$<br>$A_{10}$ = −0.75435 × $10^{-10}$<br>$A_{12}$ = 0.27973 × $10^{-12}$ | $r_{16}$: $\epsilon$ = 0.56506 × 10<br>$A_4$ = −0.24716 × $10^{-5}$<br>$A_6$ = −0.35930 × $10^{-7}$<br>$A_8$ = 0.30477 × $10^{-9}$ |

TABLE 2

<Embodiment 2>

| f = 39.3~58.6~87.3 | | $F_{NO}$ = 4.2~5.5~7.0 | |
|---|---|---|---|
| Radius of Curvature | Axial Distance | Refractive Index | Abbe Number |
| $r_1$  −109.974 | | | |
| | $d_1$  2.500 | $N_1$  1.84666 | $\nu_1$  23.82 |
| $r_2^*$  −504.727 | | | |
| | $d_2$  1.359 | | |
| $r_3^*$  19.409 | | | |
| | $d_3$  2.900 | $N_2$  1.51680 | $\nu_2$  64.20 |
| $r_4^*$  −115.358 | | | |
| | $d_4$  1.600~5.700~9.400 | | |
| $r_5^*$  28.745 | | | |
| | $d_5$  3.300 | $N_3$  1.80741 | $\nu_3$  31.59 |
| $r_6$  1070.583 | | | |
| | $d_6$  4.800 | | |
| $r_7$  49.940 | | | |
| | $d_7$  2.801 | $N_4$  1.58267 | $\nu_4$  46.43 |
| $r_8^*$  −15.930 | | | |
| | $d_8$  11.017~6.536~2.800 | | |
| $r_9^*$  −34.555 | | | |
| | $d_9$  1.200 | $N_5$  1.64769 | $\nu_5$  31.23 |
| $r_{10}$  −32.721 | | | |
| | $d_{10}$  1.800 | | |
| $r_{11}^*$  −15.070 | | | |
| | $d_{11}$  0.900 | $N_6$  1.77250 | $\nu_6$  49.77 |
| $r_{12}^*$  −48.445 | | | |
| | $d_{12}$  2.000 | | |
| $r_{13}^*$  −17.508 | | | |
| | $d_{13}$  1.000 | $N_7$  1.75450 | $\nu_7$  51.57 |
| $r_{14}^*$  −32.270 | | | |

| Aspherical coefficient | |
|---|---|
| $r_2$: $\epsilon$ = 0.82708 × 10<br>$A_4$ = 0.41724 × $10^{-4}$<br>$A_6$ = −0.41979 × $10^{-6}$<br>$A_8$ = 0.25749 × $10^{-8}$ | $r_3$: $\epsilon$ = 0.18719 × 10<br>$A_4$ = 0.40494 × $10^{-4}$<br>$A_6$ = −0.70784 × $10^{-6}$<br>$A_8$ = −0.24891 × $10^{-8}$ |
| $r_4$: $\epsilon$ = 0.10000 × 10<br>$A_4$ = −0.13628 × $10^{-4}$<br>$A_6$ = −0.12224 × $10^{-6}$<br>$A_8$ = −0.43104 × $10^{-8}$ | $r_5$: $\epsilon$ = 0.30305 × 10<br>$A_4$ = −0.20700 × $10^{-4}$<br>$A_6$ = −0.38983 × $10^{-6}$<br>$A_8$ = 0.61214 × $10^{-8}$<br>$A_{10}$ = 0.21000 × $10^{-16}$ |
| $r_8$: $\epsilon$ = −0.10388 × 10<br>$A_4$ = −0.25155 × $10^{-4}$ | $r_9$: $\epsilon$ = 0.10000 × 10<br>$A_4$ = −0.36461 × $10^{-5}$ |

TABLE 2-continued
<Embodiment 2>

| | | | |
|---|---|---|---|
| $A_6 =$ | $0.20881 \times 10^{-6}$ | $A_6 =$ | $-0.59309 \times 10^{-8}$ |
| $A_8 =$ | $-0.21777 \times 10^{-8}$ | $A_8 =$ | $0.20862 \times 10^{-10}$ |
| $A_{10} =$ | $-0.12116 \times 10^{-10}$ | | |
| $A_{12} =$ | $-0.49386 \times 10^{-12}$ | | |
| $r_{11}$: $\epsilon =$ | $-0.30098 \times 10$ | $r_{12}$: $\epsilon =$ | $0.10000 \times 10$ |
| $A_4 =$ | $0.28333 \times 10^{-4}$ | $A_4 =$ | $-0.16819 \times 10^{-4}$ |
| $A_6 =$ | $0.15343 \times 10^{-6}$ | $A_6 =$ | $0.52979 \times 10^{-7}$ |
| $A_8 =$ | $0.35186 \times 10^{-8}$ | $A_8 =$ | $0.42974 \times 10^{-9}$ |
| $A_{10} =$ | $-0.11493 \times 10^{-9}$ | $A_{10} =$ | $-0.94257 \times 10^{-13}$ |
| $A_{12} =$ | $0.53816 \times 10^{-12}$ | | |
| $r_{13}$: $\epsilon =$ | $0.10000 \times 10$ | $r_{14}$: $\epsilon =$ | $-0.13709 \times 10^2$ |
| $A_4 =$ | $-0.32107 \times 10^{-5}$ | $A_4 =$ | $-0.18504 \times 10^{-4}$ |
| $A_6 =$ | $-0.82841 \times 10^{-8}$ | $A_6 =$ | $0.25615 \times 10^{-6}$ |
| $A_8 =$ | $-0.10059 \times 10^{-9}$ | $A_8 =$ | $-0.12897 \times 10^{-9}$ |
| | | $A_{10} =$ | $-0.18700 \times 10^{-10}$ |
| | | $A_{12} =$ | $0.65682 \times 10^{-13}$ |

TABLE 3
<Embodiment 3>

| $f = 39.3 \sim 58.6 \sim 87.3$ | | $F_{NO} = 3.7 \sim 4.7 \sim 6.9$ | |
|---|---|---|---|
| Radius of Curvature | Axial Distance | Refractive Index | Abbe Number |
| $r_1$ 22.456 | | | |
| | $d_1$ 3.100 | $N_1$ 1.51680 | $\nu_1$ 64.20 |
| $r_2^*$ $-225.805$ | | | |
| | $d_2$ 2.300 | | |
| $r_3^*$ $-18.117$ | | | |
| | $d_3$ 2.200 | $N_2$ 1.75690 | $\nu_2$ 31.79 |
| $r_4^*$ $-20.147$ | | | |
| | $d_4$ $1.800 \sim 6.800 \sim 9.800$ | | |
| $r_5^*$ $-22.272$ | | | |
| | $d_5$ 3.300 | $N_3$ 1.83350 | $\nu_3$ 21.00 |
| $r_6$ $-69.648$ | | | |
| | $d_6$ 5.000 | | |
| $r_7$ 47.020 | | | |
| | $d_7$ 2.801 | $N_4$ 1.56567 | $\nu_4$ 43.02 |
| $r_8^*$ $-15.765$ | | | |
| | $d_8$ $12.455 \sim 7.669 \sim 4.000$ | | |
| $r_9^*$ $-17.815$ | | | |
| | $d_9$ 1.500 | $N_5$ 1.65160 | $\nu_5$ 58.60 |
| $r_{10}^*$ 62.355 | | | |
| | $d_{10}$ 2.100 | | |
| $r_{11}^*$ $-309.052$ | | | |
| | $d_{11}$ 2.000 | $N_6$ 1.74000 | $\nu_6$ 28.26 |
| $r_{12}$ $-819.947$ | | | |

Aspherical coefficient

| | | | |
|---|---|---|---|
| $r_2$: $\epsilon =$ | 0.82708 | $r_3$: $\epsilon =$ | $0.18719 \times 10$ |
| $A_4 =$ | $-0.12518 \times 10^{-4}$ | $A_4 =$ | $-0.37898 \times 10^{-5}$ |
| $A_6 =$ | $-0.88289 \times 10^{-7}$ | $A_6 =$ | $-0.98504 \times 10^{-7}$ |
| $A_8 =$ | $-0.24904 \times 10^{-8}$ | $A_8 =$ | $0.11012 \times 10^{-9}$ |
| $r_4$: $\epsilon =$ | $0.10000 \times 10$ | $r_5$: $\epsilon =$ | $0.30305 \times 10$ |
| $A_4 =$ | $-0.26300 \times 10^{-4}$ | $A_4 =$ | $-0.42440 \times 10^{-5}$ |
| $A_6 =$ | $-0.59444 \times 10^{-7}$ | $A_6 =$ | $0.20298 \times 10^{-6}$ |
| $A_8 =$ | $0.64113 \times 10^{-9}$ | $A_8 =$ | $-0.56370 \times 10^{-8}$ |
| | | $A_{10} =$ | $0.27000 \times 10^{-16}$ |
| $r_8$: $\epsilon =$ | $-0.10297 \times 10$ | $r_9$: $\epsilon =$ | $-0.30098 \times 10^{-1}$ |
| $A_4 =$ | $-0.15153 \times 10^{-4}$ | $A_4 =$ | $-0.18018 \times 10^{-5}$ |
| $A_6 =$ | $0.13949 \times 10^{-6}$ | $A_6 =$ | $0.22010 \times 10^{-6}$ |
| $A_8 =$ | $0.26837 \times 10^{-8}$ | $A_8 =$ | $0.35334 \times 10^{-8}$ |
| $A_{10} =$ | $-0.12116 \times 10^{-10}$ | $A_{10} =$ | $-0.11493 \times 10^{-9}$ |
| $A_{12} =$ | $-0.49386 \times 10^{-12}$ | $A_{12} =$ | $0.53816 \times 10^{-12}$ |
| $r_{10}$: $\epsilon =$ | $-0.13709 \times 10^2$ | $r_{11}$: $\epsilon =$ | 0.12686 |
| $A_4 =$ | $-0.20087 \times 10^{-4}$ | $A_4 =$ | $-0.90389 \times 10^{-5}$ |
| $A_6 =$ | $0.41365 \times 10^{-6}$ | $A_6 =$ | $0.11654 \times 10^{-6}$ |
| $A_8 =$ | $-0.51571 \times 10^{-9}$ | $A_8 =$ | $0.36328 \times 10^{-8}$ |
| $A_{10} =$ | $-0.16393 \times 10^{-10}$ | $A_{10} =$ | $-0.21757 \times 10^{-11}$ |
| $A_{12} =$ | $0.65682 \times 10^{-13}$ | | |

TABLE 4
<Embodiment 4>

| $f = 39.3 \sim 58.6 \sim 87.3$ | | $F_{NO} = 3.9 \sim 5.3 \sim 7.0$ | |
|---|---|---|---|
| Radius of Curvature | Axial Distance | Refractive Index | Abbe Number |

TABLE 4-continued
<Embodiment 4>

| | | | |
|---|---|---|---|
| $r_1$ 14.339 | | | |
| | $d_1$ 2.600 | $N_1$ 1.51680 | $\nu_1$ 64.20 |
| $r_2^*$ 31.075 | | | |
| | $d_2$ 2.400 | | |
| $r_3$ $-52.455$ | | | |
| | $d_3$ 1.700 | $N_2$ 1.84666 | $\nu_2$ 23.82 |
| $r_4$ $-68.541$ | | | |
| | $d_4$ $2.000 \sim 5.500 \sim 10.000$ | | |
| $r_5^*$ $-25.821$ | | | |
| | $d_5$ 3.300 | $N_3$ 1.83350 | $\nu_3$ 21.00 |
| $r_6$ $-38.835$ | | | |
| | $d_6$ 5.000 | | |
| $r_7$ 40.335 | | | |
| | $d_7$ 2.801 | $N_4$ 1.51680 | $\nu_4$ 64.20 |
| $r_8^*$ $-19.989$ | | | |
| | $d_8$ $13.120 \sim 8.172 \sim 4.300$ | | |
| $r_9^*$ $-13.143$ | | | |
| | $d_9$ 1.500 | $N_5$ 1.71300 | $\nu_5$ 53.93 |
| $r_{10}^*$ 355.254 | | | |
| | $d_{10}$ 1.800 | | |
| $r_{11}^*$ $-374.134$ | | | |
| | $d_{11}$ 2.300 | $N_6$ 1.62004 | $\nu_6$ 36.32 |
| $r_{12}$ $-55.723$ | | | |

Aspherical coefficient

| | | | |
|---|---|---|---|
| $r_2$: $\epsilon =$ | 0.99418 | $r_5$: $\epsilon =$ | $0.30305 \times 10$ |
| $A_4 =$ | $-0.83604 \times 10^{-6}$ | $A_4 =$ | $-0.13069 \times 10^{-4}$ |
| $A_6 =$ | $-0.68614 \times 10^{-8}$ | $A_6 =$ | $0.35743 \times 10^{-6}$ |
| $A_8 =$ | $-0.64454 \times 10^{-9}$ | $A_8 =$ | $-0.119422 \times 10^{-7}$ |
| | | $A_{10} =$ | $0.27000 \times 10^{-16}$ |
| $r_8$: $\epsilon =$ | $-0.99951$ | $r_9$: $\epsilon =$ | $-0.68561 \times 10^{-1}$ |
| $A_4 =$ | $-0.89316 \times 10^{-6}$ | $A_4 =$ | $-0.68634 \times 10^{-5}$ |
| $A_6 =$ | $0.28996 \times 10^{-7}$ | $A_6 =$ | $0.38098 \times 10^{-6}$ |
| $A_8 =$ | $0.28778 \times 10^{-8}$ | $A_8 =$ | $0.59081 \times 10^{-8}$ |
| $A_{10} =$ | $-0.12116 \times 10^{-10}$ | $A_{10} =$ | $-0.11493 \times 10^{-9}$ |
| $A_{12} =$ | $-0.49386 \times 10^{-12}$ | $A_{12} =$ | $0.53816 \times 10^{-12}$ |
| $r_{10}$: $\epsilon =$ | $-0.13671 \times 10^2$ | $r_{11}$: $\epsilon =$ | $0.12703 \times 10$ |
| $A_4 =$ | $-0.20164 \times 10^{-4}$ | $A_4 =$ | $-0.37698 \times 10^{-5}$ |
| $A_6 =$ | $0.42152 \times 10^{-6}$ | $A_6 =$ | $0.39939 \times 10^{-7}$ |
| $A_8 =$ | $-0.52507 \times 10^{-9}$ | $A_8 =$ | $0.23294 \times 10^{-9}$ |
| $A_{10} =$ | $-0.16393 \times 10^{-10}$ | $A_{10} =$ | $-0.21757 \times 10^{-11}$ |
| $A_{12} =$ | $0.65682 \times 10^{-13}$ | | |

TABLE 5
<Embodiment 5>

| $f = 39.3 \sim 55.3 \sim 77.6$ | | $F_{NO} = 4.1 \sim 5.6 \sim 7.7$ | |
|---|---|---|---|
| Radius of Curvature | Axial Distance | Refractive Index | Abbe Number |
| $r_1$ 13.756 | | | |
| | $d_1$ 2.426 | $N_1$ 1.51680 | $\nu_1$ 64.20 |
| $r_2$ 18.761 | | | |
| | $d_2$ 1.400 | | |
| $r_3$ $-63.943$ | | | |
| | $d_3$ 1.000 | $N_2$ 1.75520 | $\nu_2$ 27.51 |
| $r_4$ $-57.715$ | | | |
| | $d_4$ $2.000 \sim 3.800 \sim 7.500$ | | |
| $r_5^*$ $-24.364$ | | | |
| | $d_5$ 5.000 | $N_3$ 1.83350 | $\nu_3$ 21.00 |
| $r_6$ $-41.907$ | | | |
| | $d_6$ 5.776 | | |
| $r_7$ 47.566 | | | |
| | $d_7$ 2.801 | $N_4$ 1.51680 | $\nu_4$ 64.20 |
| $r_8^*$ $-19.233$ | | | |
| | $d_8$ $17.308 \sim 11.648 \sim 7.433$ | | |
| $r_9^*$ $-24.253$ | | | |
| | $d_9$ 1.500 | $N_5$ 1.74250 | $\nu_5$ 52.47 |
| $r_{10}^*$ 151.467 | | | |

Aspherical coefficient

| | | | |
|---|---|---|---|
| $r_5$: $\epsilon =$ | $0.43721 \times 10$ | $r_8$: $\epsilon =$ | $-0.62062$ |
| $A_4 =$ | $0.46134 \times 10^{-6}$ | $A_4 =$ | $0.43647 \times 10^{-5}$ |
| $A_6 =$ | $0.28938 \times 10^{-6}$ | $A_6 =$ | $-0.26203 \times 10^{-6}$ |
| $A_8 =$ | $-0.15511 \times 10^{-7}$ | $A_8 =$ | $0.50781 \times 10^{-8}$ |
| $A_{10} =$ | $0.60835 \times 10^{-10}$ | $A_{10} =$ | $-0.16543 \times 10^{-10}$ |
| $A_{12} =$ | $0.70871 \times 10^{-11}$ | $A_{12} =$ | $-0.49386 \times 10^{-12}$ |
| $r_9$: $\epsilon =$ | 0.57091 | $r_{10}$: $\epsilon =$ | $-0.13614 \times 10^2$ |
| $A_4 =$ | $-0.28486 \times 10^{-6}$ | $A_4 =$ | $-0.19270 \times 10^{-4}$ |

TABLE 5-continued

<Embodiment 5>

| | | | |
|---|---|---|---|
| $A_6 =$ 0.11955 × $10^{-6}$ | | $A_6 =$ 0.44761 × $10^{-6}$ | |
| $A_8 =$ 0.86884 × $10^{-8}$ | | $A_8 =$ −0.12581 × $10^{-8}$ | |
| $A_{10} =$ −0.13559 × $10^{-9}$ | | $A_{10} =$ −0.13658 × $10^{-10}$ | |
| $A_{12} =$ 0.53816 × $10^{-12}$ | | $A_{12} =$ 0.65682 × $10^{-13}$ | |

TABLE 6

<Embodiment 6>

$f = 39.3 \sim 51.7 \sim 67.9$  $F_{NO} = 4.1 \sim 5.3 \sim 6.6$

| | Radius of Curvature | Axial Distance | Refractive Index | Abbe Number |
|---|---|---|---|---|
| $r_1$ | 13.265 | | | |
| | | $d_1$ 2.402 | $N_1$ 1.62041 | $\nu_1$ 60.29 |
| $r_2$ | 16.236 | | | |
| | | $d_2$ 4.036~5.736~8.536 | | |
| $r_3^*$ | −30.372 | | | |
| | | $d_3$ 5.253 | $N_2$ 1.83350 | $\nu_2$ 21.00 |
| $r_4$ | −64.733 | | | |
| | | $d_4$ 5.977 | | |
| $r_5$ | 41.812 | | | |
| | | $d_5$ 2.711 | $N_3$ 1.51680 | $\nu_3$ 64.20 |
| $r_6^*$ | −18.546 | | | |
| | | $d_6$ 17.000~12.180~8.434 | | |
| $r_7^*$ | −27.129 | | | |
| | | $d_7$ 1.500 | $N_4$ 1.72900 | $\nu_4$ 53.48 |
| $r_8^*$ | 98.183 | | | |

Aspherical coefficient

| | |
|---|---|
| $r_3$: $\epsilon =$ 0.58841 × 10 | $r_6$: $\epsilon =$ −0.59057 |
| $A_4 =$ −0.14984 × $10^{-4}$ | $A_4 =$ 0.46413 × $10^{-5}$ |
| $A_6 =$ 0.18372 × $10^{-6}$ | $A_6 =$ −0.29499 × $10^{-6}$ |
| $A_8 =$ −0.16149 × $10^{-7}$ | $A_8 =$ 0.51868 × $10^{-8}$ |
| $A_{10} =$ 0.69497 × $10^{-10}$ | $A_{10} =$ −0.18063 × $10^{-10}$ |
| $A_{12} =$ 0.70871 × $10^{-11}$ | $A_{12} =$ −0.49386 × $10^{-12}$ |
| $r_7$: $\epsilon =$ 0.42856 | $r_8$: $\epsilon =$ −0.13569 × $10^2$ |
| $A_4 =$ 0.22297 × $10^{-5}$ | $A_4 =$ −0.17159 × $10^{-4}$ |
| $A_6 =$ 0.53694 × $10^{-8}$ | $A_6 =$ 0.41785 × $10^{-6}$ |
| $A_8 =$ 0.96064 × $10^{-8}$ | $A_8 =$ −0.10944 × $10^{-7}$ |
| $A_{10} =$ −0.13988 × $10^{-9}$ | $A_{10} =$ −0.14183 × $10^{-10}$ |
| $A_{12} =$ 0.53816 × $10^{-12}$ | $A_{12} =$ 0.65682 × $10^{-13}$ |

TABLE 7

<Embodiment 7>

$f = 36.2 \sim 55.0 \sim 80.0$  $F_{NO} = 3.4 \sim 4.5 \sim 6.2$

| | Radius of Curvature | Axial Distance | Refractive Index | Abbe Number |
|---|---|---|---|---|
| $r_1^*$ | 64.927 | | | |
| | | $d_1$ 1.500 | $N_1$ 1.76182 | $\nu_1$ 26.55 |
| $r_2^*$ | 29.945 | | | |
| | | $d_2$ 1.000 | | |
| $r_3$ | 14.478 | | | |
| | | $d_3$ 3.200 | $N_2$ 1.51680 | $\nu_2$ 64.20 |
| $r_4^*$ | 156.720 | | | |
| | | $d_4$ 2.600~7.778~9.994 | | |
| $r_5^*$ | −58.997 | | | |
| | | $d_5$ 1.093 | $N_3$ 1.80100 | $\nu_3$ 46.54 |
| $r_6$ | 18.024 | | | |
| | | $d_6$ 1.539 | | |
| $r_7$ | 49.385 | | | |
| | | $d_7$ 3.492 | $N_4$ 1.71736 | $\nu_4$ 29.42 |
| $r_8^*$ | −19.828 | | | |
| | | $d_8$ 3.795 | | |
| $r_9^*$ | 54.210 | | | |
| | | $d_9$ 1.695 | $N_5$ 1.79850 | $\nu_5$ 22.60 |
| $r_{10}^*$ | 18.871 | | | |
| | | $d_{10}$ 1.492 | | |
| $r_{11}$ | 34.429 | | | |
| | | $d_{11}$ 3.974 | $N_6$ 1.51728 | $\nu_6$ 69.68 |
| $r_{12}$ | −13.173 | | | |
| | | $d_{12}$ 0.0 | | |
| $r_{13}$ | ∞ (light restricting plate) | | | |
| | | $d_{13}$ 10.423~4.869~1.111 | | |
| $r_{14}^*$ | −19.055 | | | |
| | | $d_{14}$ 2.699 | $N_7$ 1.70055 | $\nu_7$ 30.11 |
| $r_{15}$ | −16.375 | | | |

TABLE 7-continued

<Embodiment 7>

| | | | |
|---|---|---|---|
| | $d_{15}$ 3.418 | | |
| $r_{16}^*$ −12.251 | | | |
| | $d_{16}$ 1.799 | $N_8$ 1.67000 | $\nu_8$ 57.07 |
| $r_{17}$ −171.040 | | | |

| | |
|---|---|
| $r_1$: $\epsilon =$ 0.12881 × 10 | $r_2$: $\epsilon =$ −0.50835 × 10 |
| $A_4 =$ 0.69195 × $10^{-4}$ | $A_4 =$ 0.10663 × $10^{-3}$ |
| $A_6 =$ −0.27604 × $10^{-6}$ | $A_6 =$ −0.27495 × $10^{-6}$ |
| $A_8 =$ 0.52827 × $10^{-9}$ | $A_8 =$ 0.17747 × $10^{-9}$ |
| $r_4$: $\epsilon =$ 0.10165 × 10 | $r_5$: $\epsilon =$ 0.38260 × 10 |
| $A_4 =$ 0.15923 × $10^{-4}$ | $A_4 =$ −0.83774 × $10^{-4}$ |
| $A_6 =$ −0.95678 × $10^{-7}$ | $A_6 =$ −0.10593 × $10^{-6}$ |
| $A_8 =$ 0.80081 × $10^{-9}$ | $A_8 =$ 0.69582 × $10^{-8}$ |
| $r_8$: $\epsilon =$ 0.61208 × 10 | $r_9$: $\epsilon =$ 0.99910 |
| $A_4 =$ 0.83620 × $10^{-4}$ | $A_4 =$ 0.10545 × $10^{-4}$ |
| $A_6 =$ 0.38020 × $10^{-6}$ | $A_6 =$ −0.56033 × $10^{-6}$ |
| $A_8 =$ 0.25779 × $10^{-7}$ | $A_8 =$ −0.13826 × $10^{-8}$ |
| $r_{10}$: $\epsilon =$ −0.72352 | $r_{14}$: $\epsilon =$ 0.10209 × 10 |
| $A_4 =$ 0.22675 × $10^{-4}$ | $A_4 =$ 0.27080 × $10^{-4}$ |
| $A_6 =$ −0.56816 × $10^{-6}$ | $A_6 =$ 0.31650 × $10^{-8}$ |
| $A_8 =$ −0.20860 × $10^{-8}$ | $A_8 =$ −0.13524 × $10^{-9}$ |
| $r_{16}$: $\epsilon =$ 0.56927 | |
| $A_4 =$ −0.11263 × $10^{-4}$ | |
| $A_6 =$ 0.10319 × $10^{-8}$ | |
| $A_8 =$ 0.48616 × $10^{-9}$ | |

TABLE 8

<Embodiment 8>

$f = 36.2 \sim 55.0 \sim 80.0$  $F_{NO} = 3.4 \sim 4.5 \sim 6.2$

| | Radius of Curvature | Axial Distance | Refractive Index | Abbe Number |
|---|---|---|---|---|
| $r_1^*$ | 70.023 | | | |
| | | $d_1$ 1.500 | $N_1$ 1.76182 | $\nu_1$ 26.55 |
| $r_2^*$ | 29.931 | | | |
| | | $d_2$ 1.000 | | |
| $r_3$ | 14.704 | | | |
| | | $d_3$ 3.200 | $N_2$ 1.51680 | $\nu_2$ 64.20 |
| $r_4^*$ | 279.547 | | | |
| | | $d_4$ 2.600~7.552~9.657 | | |
| $r_5^*$ | −62.178 | | | |
| | | $d_5$ 1.093 | $N_3$ 1.80100 | $\nu_3$ 46.54 |
| $r_6^*$ | 18.343 | | | |
| | | $d_6$ 1.539 | | |
| $r_7$ | 47.775 | | | |
| | | $d_7$ 3.492 | $N_4$ 1.71736 | $\nu_4$ 29.42 |
| $r_8^*$ | −19.674 | | | |
| | | $d_8$ 3.795 | | |
| $r_9$ | 54.208 | | | |
| | | $d_9$ 1.695 | $N_5$ 1.79850 | $\nu_5$ 22.60 |
| $r_{10}^*$ | 18.677 | | | |
| | | $d_{10}$ 1.492 | | |
| $r_{11}$ | 35.440 | | | |
| | | $d_{11}$ 3.974 | $N_6$ 1.51728 | $\nu_6$ 69.68 |
| $r_{12}$ | −13.567 | | | |
| | | $d_{12}$ 0.0 | | |
| $r_{13}$ | ∞ (light restricting plate) | | | |
| | | $d_{13}$ 10.458~4.860~1.111 | | |
| $r_{14}^*$ | −19.591 | | | |
| | | $d_{14}$ 2.699 | $N_7$ 1.70055 | $\nu_7$ 30.11 |
| $r_{15}$ | −16.804 | | | |
| | | $d_{15}$ 3.418 | | |
| $r_{16}^*$ | −12.269 | | | |
| | | $d_{16}$ 1.799 | $N_8$ 1.67000 | $\nu_8$ 57.07 |
| $r_{17}$ | −180.023 | | | |

Aspherical coefficient

| | |
|---|---|
| $r_{16}$: $\epsilon =$ 0.12886 × 10 | $r_2$: $\epsilon =$ −0.50772 × 10 |
| $A_4 =$ 0.64510 × $10^{-4}$ | $A_4 =$ 0.10444 × $10^{-3}$ |
| $A_6 =$ −0.24030 × $10^{-6}$ | $A_6 =$ −0.18450 × $10^{-6}$ |
| $A_8 =$ 0.17881 × $10^{-9}$ | $A_8 =$ −0.29770 × $10^{-9}$ |
| $r_4$: $\epsilon =$ 0.10166 × 10 | $r_5$: $\epsilon =$ 0.38252 × 10 |
| $A_4 =$ 0.89692 × $10^{-5}$ | $A_4 =$ −0.84426 × $10^{-4}$ |
| $A_6 =$ −0.15999 × $10^{-6}$ | $A_6 =$ −0.10070 × $10^{-6}$ |
| $A_8 =$ 0.10687 × $10^{-8}$ | $A_8 =$ 0.64741 × $10^{-8}$ |
| $r_6$: $\epsilon =$ 0.99685 | $r_8$: $\epsilon =$ 0.61576 × 10 |
| $A_4 =$ 0.74706 × $10^{-5}$ | $A_4 =$ 0.79349 × $10^{-4}$ |
| $A_6 =$ 0.41784 × $10^{-7}$ | $A_6 =$ 0.36240 × $10^{-6}$ |
| $A_8 =$ −0.90999 × $10^{-9}$ | $A_8 =$ 0.29227 × $10^{-7}$ |

TABLE 8-continued

<Embodiment 8>

| | | | | |
|---|---|---|---|---|
| $r_{10}$: | $\epsilon = -0.71563$ | | $r_{14}$: | $\epsilon = 0.10058 \times 10$ |
| | $A_4 = 0.10486 \times 10^{-4}$ | | | $A_4 = 0.27663 \times 10^{-4}$ |
| | $A_6 = -0.72196 \times 10^{-7}$ | | | $A_6 = -0.33503 \times 10^{-7}$ |
| | $A_8 = -0.17747 \times 10^{-8}$ | | | $A_8 = 0.38316 \times 10^{-9}$ |
| $r_{16}$: | $\epsilon = 0.57611$ | | | |
| | $A_4 = -0.13266 \times 10^{-4}$ | | | |
| | $A_6 = 0.11350 \times 10^{-6}$ | | | |
| | $A_8 = -0.16295 \times 10^{-9}$ | | | |

TABLE 9

<Embodiment 9>

$f = 36.2 \sim 55.0 \sim 80.0$     $F_{NO} = 3.4 \sim 4.5 \sim 6.2$

| Radius of Curvature | | Axial Distance | Refractive Index | Abbe Number |
|---|---|---|---|---|
| $r_1^*$ | 63.134 | | | |
| | | $d_1$ 1.500 | $N_1$ 1.76182 | $\nu_1$ 26.55 |
| $r_2^*$ | 29.954 | | | |
| | | $d_2$ 1.000 | | |
| $r_3$ | 16.655 | | | |
| | | $d_3$ 3.200 | $N_2$ 1.51680 | $\nu_2$ 64.20 |
| $r_4^*$ | −415.982 | | | |
| | | $d_4$ 2.600~7.282~9.711 | | |
| $r_5^*$ | −61.836 | | | |
| | | $d_5$ 1.093 | $N_3$ 1.80100 | $\nu_3$ 46.54 |
| $r_6$ | 18.314 | | | |
| | | $d_6$ 1.539 | | |
| $r_7$ | 47.492 | | | |
| | | $d_7$ 3.492 | $N_4$ 1.71736 | $\nu_4$ 29.42 |
| $r_8^*$ | −19.669 | | | |
| | | $d_8$ 3.795 | | |
| $r_9$ | 54.224 | | | |
| | | $d_9$ 1.695 | $N_5$ 1.79850 | $\nu_5$ 22.60 |
| $r_{10}^*$ | 17.656 | | | |
| | | $d_{10}$ 1.492 | | |
| $r_{11}$ | 36.784 | | | |
| | | $d_{11}$ 3.974 | $N_6$ 1.51728 | $\nu_6$ 69.68 |
| $r_{12}$ | −13.659 | | | |
| | | $d_{12}$ 0.0 | | |
| $r_{13}$ | ∞ (light restricting plate) | | | |
| | | $d_{13}$ 12.038~5.508~1.111 | | |
| $r_{14}^*$ | −22.287 | | | |
| | | $d_{14}$ 2.699 | $N_7$ 1.70055 | $\nu_7$ 30.11 |
| $r_{15}$ | −17.077 | | | |
| | | $d_{15}$ 3.418 | | |
| $r_{16}^*$ | −12.256 | | | |
| | | $d_{16}$ 1.799 | $N_8$ 1.67000 | $\nu_8$ 57.07 |
| $r_{17}$ | −181.256 | | | |

Aspherical coefficient

| | | | | |
|---|---|---|---|---|
| $r_1$: | $\epsilon = -0.69863$ | | $r_2$: | $\epsilon = -0.12553 \times 10$ |
| | $A_4 = -0.84652 \times 10^{-5}$ | | | $A_4 = 0.13095 \times 10^{-5}$ |
| | $A_6 = 0.76670 \times 10^{-7}$ | | | $A_6 = 0.53216 \times 10^{-7}$ |
| | $A_8 = -0.19173 \times 10^{-9}$ | | | $A_8 = 0.18505 \times 10^{-9}$ |
| $r_4$: | $\epsilon = 0.99672$ | | $r_5$: | $\epsilon = 0.12553 \times 10$ |
| | $A_4 = 0.16742 \times 10^{-4}$ | | | $A_4 = -0.73465 \times 10^{-4}$ |
| | $A_6 = -0.61345 \times 10^{-7}$ | | | $A_6 = 0.22796 \times 10^{-6}$ |
| | $A_8 = -0.10736 \times 10^{-9}$ | | | $A_8 = 0.35112 \times 10^{-9}$ |
| $r_8$: | $\epsilon = 0.62363 \times 10$ | | $r_{10}$: | $\epsilon = -0.24562 \times 10$ |
| | $A_4 = 0.11247 \times 10^{-3}$ | | | $A_4 = 0.24416 \times 10^{-4}$ |
| | $A_6 = 0.37573 \times 10^{-6}$ | | | $A_6 = -0.89580 \times 10^{-7}$ |
| | $A_8 = 0.28943 \times 10^{-7}$ | | | $A_8 = -0.80088 \times 10^{-9}$ |
| $r_{14}$: | $\epsilon = 0.10000 \times 10$ | | $r_{16}$: | $\epsilon = 0.58736$ |
| | $A_4 = 0.14089 \times 10^{-4}$ | | | $A_4 = 0.66498 \times 10^{-5}$ |
| | $A_6 = -0.21346 \times 10^{-6}$ | | | $A_6 = -0.96584 \times 10^{-8}$ |
| | $A_8 = 0.70425 \times 10^{-8}$ | | | $A_8 = 0.13853 \times 10^{-9}$ |
| | $A_{10} = -0.74575 \times 10^{-10}$ | | | |
| | $A_{12} = 0.27418 \times 10^{-12}$ | | | |

TABLE 10

<Embodiment 10>

$f = 36.2 \sim 55.0 \sim 80.0$     $F_{NO} = 3.5 \sim 4.7 \sim 6.2$

| Radius of Curvature | | Axial Distance | Refractive Index | Abbe Number |
|---|---|---|---|---|
| $r_1^*$ | 39.270 | | | |
| | | $d_1$ 1.500 | $N_1$ 1.70055 | $\nu_1$ 30.11 |
| $r_2^*$ | 26.662 | | | |
| | | $d_2$ 1.000 | | |
| $r_3^*$ | 18.587 | | | |
| | | $d_3$ 3.200 | $N_2$ 1.54072 | $\nu_2$ 47.20 |
| $r_4^*$ | 58.025 | | | |
| | | $d_4$ 3.000~12.664~18.878 | | |
| $r_5^*$ | −19.231 | | | |
| | | $d_5$ 1.500 | $N_3$ 1.59270 | $\nu_3$ 35.45 |
| $r_6^*$ | 79.948 | | | |
| | | $d_6$ 1.000 | | |
| $r_7^*$ | 97.895 | | | |
| | | $d_7$ 3.000 | $N_4$ 1.67000 | $\nu_4$ 57.07 |
| $r_8^*$ | −12.640 | | | |
| | | $d_8$ 0.0 | | |
| $r_9$ | ∞ (light restricting plate) | | | |
| | | $d_9$ 15.139~6.921~1.111 | | |
| $r_{10}^*$ | −38.470 | | | |
| | | $d_{10}$ 2.699 | $N_5$ 1.72342 | $\nu_5$ 37.88 |
| $r_{11}$ | −328.392 | | | |
| | | $d_{11}$ 4.500 | | |
| $r_{12}^*$ | −10.844 | | | |
| | | $d_{12}$ 1.799 | $N_6$ 1.67000 | $\nu_6$ 57.07 |
| $r_{13}$ | −29.947 | | | |

Aspherical coefficient

| | | | | |
|---|---|---|---|---|
| $r_1$: | $\epsilon = 0.99933$ | | $r_2$: | $\epsilon = 0.99742$ |
| | $A_4 = -0.51336 \times 10^{-4}$ | | | $A_4 = 0.22781 \times 10^{-4}$ |
| | $A_6 = 0.30440 \times 10^{-6}$ | | | $A_6 = -0.36360 \times 10^{-6}$ |
| | $A_8 = -0.62567 \times 10^{-9}$ | | | $A_8 = -0.25279 \times 10^{-9}$ |
| $r_3$: | $\epsilon = 0.91027$ | | $r_4$: | $\epsilon = 0.99730$ |
| | $A_4 = 0.17820 \times 10^{-3}$ | | | $A_4 = 0.10355 \times 10^{-3}$ |
| | $A_6 = -0.48382 \times 10^{-6}$ | | | $A_6 = 0.61129 \times 10^{-6}$ |
| | $A_8 = 0.77747 \times 10^{-8}$ | | | $A_8 = 0.58086 \times 10^{-8}$ |
| $r_5$: | $\epsilon = 0.93568$ | | $r_6$: | $\epsilon = 0.99690$ |
| | $A_4 = -0.41401 \times 10^{-3}$ | | | $A_4 = -0.19980 \times 10^{-3}$ |
| | $A_6 = 0.20299 \times 10^{-5}$ | | | $A_6 = 0.77001 \times 10^{-6}$ |
| | $A_8 = 0.70886 \times 10^{-8}$ | | | $A_8 = 0.10354 \times 10^{-7}$ |
| $r_7$: | $\epsilon = 0.99236$ | | $r_8$: | $\epsilon = 0.79714$ |
| | $A_4 = 0.10725 \times 10^{-3}$ | | | $A_4 = 0.28962 \times 10^{-4}$ |
| | $A_6 = -0.12034 \times 10^{-5}$ | | | $A_6 = 0.13373 \times 10^{-5}$ |
| | $A_8 = 0.57116 \times 10^{-8}$ | | | $A_8 = -0.11107 \times 10^{-7}$ |
| $r_{10}$: | $\epsilon = 0.20557 \times 10$ | | $r_{12}$: | $\epsilon = 0.80547$ |
| | $A_4 = 0.41796 \times 10^{-4}$ | | | $A_4 = 0.18239 \times 10^{-4}$ |
| | $A_6 = -0.42340 \times 10^{-8}$ | | | $A_6 = -0.10555 \times 10^{-6}$ |
| | $A_8 = 0.17777 \times 10^{-8}$ | | | $A_8 = 0.39118 \times 10^{-9}$ |

TABLE 11

<Embodiment 11>

$f = 36.2 \sim 60.6 \sim 102$     $F_{NO} = 3.5 \sim 5.0 \sim 6.2$

| Radius of Curvature | | Axial Distance | Refractive Index | Abbe Number |
|---|---|---|---|---|
| $r_1$ | 18.754 | | | |
| | | $d_1$ 1.500 | $N_1$ 1.84666 | $\nu_1$ 23.82 |
| $r_2^*$ | 16.605 | | | |
| | | $d_2$ 1.489 | | |
| $r_3$ | 19.155 | | | |
| | | $d_3$ 3.350 | $N_2$ 1.49300 | $\nu_2$ 58.34 |
| $r_4^*$ | 57.022 | | | |
| | | $d_4$ 4.500~14.486~29.763 | | |
| $r_5^*$ | −15.101 | | | |
| | | $d_5$ 1.532 | $N_3$ 1.77551 | $\nu_3$ 37.90 |
| $r_6^*$ | −32.869 | | | |
| | | $d_6$ 1.025 | | |
| $r_7$ | −206.179 | | | |
| | | $d_7$ 3.700 | $N_4$ 1.56883 | $\nu_4$ 56.04 |
| $r_8^*$ | −10.704 | | | |
| | | $d_8$ 14.382~7.288~1.200 | | |
| $r_9^*$ | −104.934 | | | |
| | | $d_9$ 2.695 | $N_5$ 1.68150 | $\nu_5$ 36.64 |
| $r_{10}$ | −68.743 | | | |
| | | $d_{10}$ 3.850 | | |
| $r_{11}^*$ | −13.563 | | | |
| | | $d_{11}$ 1.799 | $N_6$ 1.72000 | $\nu_6$ 54.71 |
| $r_{12}$ | −129.937 | | | |

Aspherical coefficient

TABLE 11-continued

<Embodiment 11>

| | | | | |
|---|---|---|---|---|
| $r_2$: | $\epsilon = 0.10000 \times 10$ | | $r_4$: | $\epsilon = 0.10000 \times 10$ |
| | $A_4 = 0.23954 \times 10^{-5}$ | | | $A_4 = -0.48116 \times 10^{-5}$ |
| | $A_6 = 0.12366 \times 10^{-7}$ | | | $A_6 = -0.59468 \times 10^{-8}$ |
| | $A_8 = 0.35834 \times 10^{-10}$ | | | $A_8 = -0.13985 \times 10^{-9}$ |
| $r_5$: | $\epsilon = 0.1000 \times 10$ | | $r_6$: | $\epsilon = 0.10000 \times 10$ |
| | $A_4 = -0.31945 \times 10^{-3}$ | | | $A_4 = -0.20535 \times 10^{-3}$ |
| | $A_6 = 0.12201 \times 10^{-5}$ | | | $A_6 = 0.16195 \times 10^{-5}$ |
| | $A_6 = 0.32705 \times 10^{-8}$ | | | $A_8 = 0.12981 \times 10^{-7}$ |
| $r_8$: | $\epsilon = 0.10000 \times 10$ | | $r_9$: | $\epsilon = 0.10000 \times 10$ |
| | $A_4 = 0.60593 \times 10^{-4}$ | | | $A_4 = 0.34683 \times 10^{-4}$ |
| | $A_6 = 0.41365 \times 10^{-6}$ | | | $A_6 = 0.36800 \times 10^{-7}$ |
| | $A_8 = -0.47138 \times 10^{-8}$ | | | $A_8 = 0.74374 \times 10^{-9}$ |
| $r_{11}$: | $\epsilon = 0.10000 \times 10$ | | | |
| | $A_4 = 0.24938 \times 10^{-4}$ | | | |
| | $A_6 = -0.11414 \times 10^{-6}$ | | | |
| | $A_8 = -0.15600 \times 10^{-8}$ | | | |

TABLE 12

<Embodiment 12>

$f = 36.0 \sim 60.6 \sim 101.9$  $F_{NO} = 4.1 \sim 5.9 \sim 7.9$

| Radius of Curvature | Axial Distance | Refractive Index | Abbe Number |
|---|---|---|---|
| $r_1$ 45.249 | | | |
| | $d_1$ 1.400 | $N_1$ 1.84666 | $\nu_1$ 23.82 |
| $r_2^*$ 34.554 | | | |
| | $d_2$ 0.600 | | |
| $r_3$ 19.472 | | | |
| | $d_3$ 4.800 | $N_2$ 1.49310 | $\nu_2$ 83.58 |
| $r_4$ 111.288 | | | |
| | $d_4$ 2.500~9.281~17.762 | | |
| $r_5^*$ 159.975 | | | |
| | $d_5$ 1.563 | $N_3$ 1.72000 | $\nu_3$ 54.71 |
| $r_6$ 9.346 | | | |
| | $d_6$ 1.875 | $N_4$ 1.67339 | $\nu_4$ 29.25 |
| $r_7^*$ 14.707 | | | |
| | $d_7$ 3.188 | | |
| $r_8$ 23.350 | | | |
| | $d_8$ 1.438 | $N_5$ 1.83350 | $\nu_5$ 21.00 |
| $r_9$ 16.949 | | | |
| | $d_9$ 4.800 | $N_6$ 1.51728 | $\nu_6$ 69.43 |
| $r_{10}^*$ −10.609 | | | |
| | $d_{10}$ 13.726~7.281~2.188 | | |
| $r_{11}^*$ −45.439 | | | |
| | $d_{11}$ 3.800 | $N_7$ 1.84666 | $\nu_7$ 23.82 |
| $r_{12}$ −29.178 | | | |
| | $d_{12}$ 3.450 | | |
| $r_{13}^*$ −11.467 | | | |
| | $d_{13}$ 1.400 | $N_8$ 1.69680 | $\nu_8$ 56.47 |
| $r_{14}$ −602.199 | | | |

Aspherical coefficient

| | | | | |
|---|---|---|---|---|
| $r_2$: | $\epsilon = 0.10000 \times 10$ | | $r_5$: | $\epsilon = 0.10000 \times 10$ |
| | $A_4 = 0.23302 \times 10^{-5}$ | | | $A_4 = -0.10669 \times 10^{-3}$ |
| | $A_6 = 0.12235 \times 10^{-7}$ | | | $A_6 = 0.65794 \times 10^{-7}$ |
| | $A_8 = -0.11540 \times 10^{-9}$ | | | $A_8 = -0.30297 \times 10^{-8}$ |
| | $A_{10} = 0.61206 \times 10^{-12}$ | | | $A_{10} = 0.15488 \times 10^{-10}$ |
| | $A_{12} = -0.86584 \times 10^{-15}$ | | | $A_{12} = -0.68127 \times 10^{-14}$ |
| $r_7$: | $\epsilon = 0.10000 \times 10$ | | $r_{10}$: | $\epsilon = 0.10000 \times 10$ |
| | $A_4 = 0.19502 \times 10^{-4}$ | | | $A_4 = 0.15471 \times 10^{-4}$ |
| | $A_6 = 0.19680 \times 10^{-5}$ | | | $A_6 = -0.22086 \times 10^{-6}$ |
| | $A_8 = 0.17264 \times 10^{-7}$ | | | $A_8 = -0.85577 \times 10^{-8}$ |
| | $A_{10} = 0.44428 \times 10^{-10}$ | | | $A_{10} = 0.12778 \times 10^{-10}$ |
| | $A_{12} = 0.15766 \times 10^{-12}$ | | | $A_{12} = 0.12024 \times 10^{-12}$ |
| $r_{11}$: | $\epsilon = 0.10000 \times 10$ | | $r_{13}$: | $\epsilon = 0.10000 \times 10$ |
| | $A_4 = 0.32553 \times 10^{-4}$ | | | $A_4 = 0.51933 \times 10^{-4}$ |
| | $A_6 = -0.45500 \times 10^{-6}$ | | | $A_6 = 0.13297 \times 10^{-6}$ |
| | $A_8 = 0.98117 \times 10^{-8}$ | | | $A_8 = 0.30177 \times 10^{-8}$ |
| | $A_{10} = -0.96691 \times 10^{-10}$ | | | $A_{10} = -0.18782 \times 10^{-10}$ |
| | $A_{12} = 0.45863 \times 10^{-12}$ | | | $A_{12} = 0.13524 \times 10^{-12}$ |

TABLE 13

<Embodiment 13>

$f = 36.0 \sim 60.6 \sim 101.8$  $F_{NO} = 4.1 \sim 5.9 \sim 7.9$

| Radius of Curvature | Axial Distance | Refractive Index | Abbe Number |
|---|---|---|---|
| $r_1$ 44.870 | | | |
| | $d_1$ 1.400 | $N_1$ 1.84666 | $\nu_1$ 23.82 |
| $r_2^*$ 34.737 | | | |
| | $d_2$ 0.600 | | |
| $r_3$ 19.028 | | | |
| | $d_3$ 4.800 | $N_2$ 1.49310 | $\nu_2$ 83.58 |
| $r_4$ 91.606 | | | |
| | $d_4$ 2.500~9.459~18.050 | | |
| $r_5$ 103.630 | | | |
| | $d_5$ 1.550 | $N_3$ 1.72000 | $\nu_3$ 54.71 |
| $r_6^*$ 9.129 | | | |
| | $d_6$ 0.500 | | |
| $r_7$ 9.393 | | | |
| | $d_7$ 1.850 | $N_4$ 1.67339 | $\nu_4$ 29.25 |
| $r_8$ 14.341 | | | |
| | $d_8$ 2.650 | | |
| $r_9$ 23.905 | | | |
| | $d_9$ 1.400 | $N_5$ 1.83350 | $\nu_5$ 21.00 |
| $r_{10}$ 16.949 | | | |
| | $d_{10}$ 4.800 | $N_6$ 1.51728 | $\nu_6$ 69.43 |
| $r_{11}$ −10.563 | | | |
| | $d_{11}$ 13.959~7.398~2.200 | | |
| $r_{12}^*$ −44.349 | | | |
| | $d_{12}$ 3.800 | $N_7$ 1.84666 | $\nu_7$ 23.82 |
| $r_{13}$ −29.212 | | | |
| | $d_{13}$ 3.450 | | |
| $r_{14}^*$ −11.195 | | | |
| | $d_{14}$ 1.400 | $N_8$ 1.69680 | $\nu_8$ 56.47 |
| $r_{15}$ −174.890 | | | |

Aspherical coefficient

| | | | | |
|---|---|---|---|---|
| $r_2$: | $\epsilon = 0.10000 \times 10$ | | $r_5$: | $\epsilon = 0.10000 \times 10$ |
| | $A_4 = 0.22665 \times 10^{-5}$ | | | $A_4 = -0.87677 \times 10^{-5}$ |
| | $A_6 = 0.25102 \times 10^{-7}$ | | | $A_6 = -0.13098 \times 10^{-6}$ |
| | $A_8 = -0.26805 \times 10^{-9}$ | | | $A_8 = -0.16100 \times 10^{-7}$ |
| | $A_{10} = 0.16445 \times 10^{-11}$ | | | $A_{10} = 0.32927 \times 10^{-9}$ |
| | $A_{12} = -0.35303 \times 10^{-14}$ | | | $A_{12} = 0.21321 \times 10^{-11}$ |
| $r_6$: | $\epsilon = 0.10000 \times 10$ | | $r_{12}$: | $\epsilon = 0.10000 \times 10$ |
| | $A_4 = 0.15423 \times 10^{-3}$ | | | $A_4 = 0.28330 \times 10^{-4}$ |
| | $A_6 = 0.10231 \times 10^{-5}$ | | | $A_6 = -0.11118 \times 10^{-6}$ |
| | $A_8 = 0.41976 \times 10^{-7}$ | | | $A_8 = 0.55252 \times 10^{-8}$ |
| | $A_{10} = 0.13860 \times 10^{-9}$ | | | $A_{10} = -0.107774 \times 10^{-9}$ |
| | $A_{12} = 0.37871 \times 10^{-12}$ | | | $A_{12} = 0.63446 \times 10^{-12}$ |
| $r_{14}$: | $\epsilon = 0.10000 \times 10$ | | | |
| | $A_4 = 0.56916 \times 10^{-4}$ | | | |
| | $A_6 = -0.37470 \times 10^{-6}$ | | | |
| | $A_8 = 0.67325 \times 10^{-8}$ | | | |
| | $A_{10} = -0.31371 \times 10^{-10}$ | | | |
| | $A_{12} = 0.42714 \times 10^{-12}$ | | | |

TABLE 14

Values of Conditions (25) to (28) of Each Embodiment

| | $\dfrac{(\phi_w \cdot \phi_T)^{\frac{1}{2}}}{\beta \cdot \phi_1}$ | $\dfrac{(\phi_w \cdot \phi_T)^{\frac{1}{2}}}{|\beta \cdot \phi_3|}$ | $\phi_1/\phi_w$ | $|\phi_3/\phi_w|$ |
|---|---|---|---|---|
| Embodiment 1 | 0.438 | 0.211 | 0.70 | 1.45 |
| Embodiment 2 | 0.302 | 0.141 | 1.00 | 2.15 |
| Embodiment 3 | 0.350 | 0.157 | 0.87 | 1.93 |
| Embodiment 4 | 0.452 | 0.173 | 0.67 | 1.75 |
| Embodiment 5 | 0.714 | 0.257 | 0.51 | 1.40 |
| Embodiment 6 | 1.000 | 0.325 | 0.44 | 1.36 |
| Embodiment 7 | 0.438 | 0.192 | 0.70 | 1.58 |
| Embodiment 8 | 0.438 | 0.192 | 0.70 | 1.59 |
| Embodiment 9 | 0.438 | 0.212 | 0.70 | 1.44 |
| Embodiment 10 | 0.701 | 0.275 | 0.43 | 1.11 |
| Embodiment 11 | 0.449 | 0.134 | 0.47 | 1.58 |
| Embodiment 12 | 0.377 | 0.122 | 0.56 | 1.73 |
| Embodiment 13 | 0.379 | 0.124 | 0.56 | 1.70 |

TABLE 15

<Embodiment 1>

TABLE 15-continued

Values of $\phi_i \cdot (N' - N) \cdot \dfrac{d}{dy} \cdot \{X(y) - X_o(y)\}$ (where i = 1, 2, 3)

| Y | 1st surface | 2nd surface | 4th surface | 5th surface |
|---|---|---|---|---|
| 0.1Ymax | $3.09 \times 10^{-6}$ | $-3.60 \times 10^{-6}$ | $2.08 \times 10^{-7}$ | $-1.49 \times 10^{-6}$ |
| 02.Ymax | $2.44 \times 10^{-5}$ | $-2.87 \times 10^{-5}$ | $1.71 \times 10^{-6}$ | $-1.19 \times 10^{-5}$ |
| 0.3Ymax | $8.03 \times 10^{-5}$ | $-9.59 \times 10^{-5}$ | $6.04 \times 10^{-6}$ | $-4.00 \times 10^{-5}$ |
| 0.4Ymax | $1.84 \times 10^{-4}$ | $-2.25 \times 10^{-4}$ | $1.52 \times 10^{-5}$ | $-9.43 \times 10^{-5}$ |
| 0.5Ymax | $3.43 \times 10^{-4}$ | $-4.33 \times 10^{-4}$ | $3.21 \times 10^{-5}$ | $-1.83 \times 10^{-4}$ |
| 0.6Ymax | $5.57 \times 10^{-4}$ | $-7.40 \times 10^{-4}$ | $6.09 \times 10^{-5}$ | $-3.12 \times 10^{-4}$ |
| 0.7Ymax | $8.17 \times 10^{-4}$ | $-1.17 \times 10^{-3}$ | $1.07 \times 10^{-4}$ | $-4.88 \times 10^{-4}$ |
| 0.8Ymax | $1.10 \times 10^{-3}$ | $-1.74 \times 10^{-3}$ | $1.79 \times 10^{-4}$ | $-7.14 \times 10^{-4}$ |
| 0.9Ymax | $1.37 \times 10^{-3}$ | $-2.51 \times 10^{-3}$ | $2.88 \times 10^{-4}$ | $-9.87 \times 10^{-4}$ |
| Ymax | $1.58 \times 10^{-6}$ | $-3.53 \times 10^{-3}$ | $4.50 \times 10^{-4}$ | $-1.30 \times 10^{-3}$ |

| Y | 8th surface | 10th surface | 13th surface | 15th surface |
|---|---|---|---|---|
| 0.1Ymax | $+0$ | $9.33 \times 10^{-7}$ | $-2.29 \times 10^{-6}$ | $-3.58 \times 10^{-6}$ |
| 02.Ymax | $9.06 \times 10^{-8}$ | $7.49 \times 10^{-6}$ | $-1.76 \times 10^{-5}$ | $-2.93 \times 10^{-5}$ |
| 0.3Ymax | $8.39 \times 10^{-7}$ | $2.55 \times 10^{-5}$ | $-5.72 \times 10^{-5}$ | $-1.03 \times 10^{-4}$ |
| 0.4Ymax | $2.86 \times 10^{-6}$ | $6.11 \times 10^{-5}$ | $-1.36 \times 10^{-4}$ | $-2.61 \times 10^{-4}$ |
| 0.5Ymax | $5.60 \times 10^{-6}$ | $1.21 \times 10^{-4}$ | $-2.81 \times 10^{-4}$ | $-5.60 \times 10^{-4}$ |
| 0.6Ymax | $4.42 \times 10^{-6}$ | $2.13 \times 10^{-4}$ | $-5.37 \times 10^{-4}$ | $-1.10 \times 10^{-3}$ |
| 0.7Ymax | $-1.23 \times 10^{-5}$ | $3.47 \times 10^{-4}$ | $-9.46 \times 10^{-4}$ | $-2.09 \times 10^{-3}$ |
| 0.8Ymax | $-6.28 \times 10^{-5}$ | $5.33 \times 10^{-4}$ | $-1.52 \times 10^{-3}$ | $-3.95 \times 10^{-3}$ |
| 0.9Ymax | $-1.53 \times 10^{-4}$ | $7.87 \times 10^{-4}$ | $-2.33 \times 10^{-3}$ | $-7.73 \times 10^{-3}$ |
| Ymax | $-1.93 \times 10^{-4}$ | $1.13 \times 10^{-3}$ | $-3.93 \times 10^{-3}$ | $-1.69 \times 10^{-2}$ |

TABLE 16

<Embodiment 2>

| Y | 2nd surface | 3rd surface | 4th surface | 5th surface | 8th surface |
|---|---|---|---|---|---|
| 0.1 Ymax | $-1.08 \times 10^{-6}$ | $7.78 \times 10^{-7}$ | $1.84 \times 10^{-7}$ | $-3.09 \times 10^{-7}$ | $-2.92 \times 10^{-7}$ |
| 0.2 Ymax | $-8.44 \times 10^{-6}$ | $6.09 \times 10^{-6}$ | $1.49 \times 10^{-6}$ | $-2.57 \times 10^{-6}$ | $-2.30 \times 10^{-6}$ |
| 0.3 Ymax | $-2.75 \times 10^{-5}$ | $1.98 \times 10^{-5}$ | $5.18 \times 10^{-6}$ | $-8.81 \times 10^{-6}$ | $-7.85 \times 10^{-6}$ |
| 0.4 Ymax | $-6.23 \times 10^{-5}$ | $4.41 \times 10^{-5}$ | $1.92 \times 10^{-5}$ | $-2.15 \times 10^{-5}$ | $-1.88 \times 10^{-5}$ |
| 0.5 Ymax | $-1.15 \times 10^{-4}$ | $7.92 \times 10^{-5}$ | $2.72 \times 10^{-5}$ | $-4.32 \times 10^{-5}$ | $-3.73 \times 10^{-5}$ |
| 0.6 Ymax | $-1.85 \times 10^{-4}$ | $1.22 \times 10^{-4}$ | $5.20 \times 10^{-5}$ | $-7.71 \times 10^{-5}$ | $-6.55 \times 10^{-5}$ |
| 0.7 Ymax | $-2.71 \times 10^{-4}$ | $1.63 \times 10^{-4}$ | $9.39 \times 10^{-5}$ | $-1.26 \times 10^{-4}$ | $-1.06 \times 10^{-4}$ |
| 0.8 Ymax | $-3.71 \times 10^{-4}$ | $1.90 \times 10^{-4}$ | $1.64 \times 10^{-4}$ | $-1.94 \times 10^{-4}$ | $-1.60 \times 10^{-4}$ |
| 0.9 Ymax | $-4.85 \times 10^{-4}$ | $1.79 \times 10^{-4}$ | $2.78 \times 10^{-4}$ | $-2.82 \times 10^{-4}$ | $-2.30 \times 10^{-4}$ |
| Ymax | $-6.19 \times 10^{-4}$ | $9.95 \times 10^{-5}$ | $4.63 \times 10^{-4}$ | $-3.94 \times 10^{-4}$ | $-3.19 \times 10^{-4}$ |

| Y | 9th surface | 11th surface | 12th surface | 13th surface | 14th surface |
|---|---|---|---|---|---|
| 0.1 Ymax | $2.48 \times 10^{-7}$ | $-8.99 \times 10^{-6}$ | $-2.07 \times 10^{-6}$ | $4.24 \times 10^{-7}$ | $8.61 \times 10^{-6}$ |
| 0.2 Ymax | $1.98 \times 10^{-6}$ | $-7.31 \times 10^{-5}$ | $-1.63 \times 10^{-5}$ | $3.43 \times 10^{-6}$ | $6.81 \times 10^{-5}$ |
| 0.3 Ymax | $6.69 \times 10^{-6}$ | $-2.53 \times 10^{-4}$ | $-5.39 \times 10^{-5}$ | $1.18 \times 10^{-5}$ | $2.28 \times 10^{-4}$ |
| 0.4 Ymax | $1.60 \times 10^{-5}$ | $-6.22 \times 10^{-4}$ | $-1.23 \times 10^{-4}$ | $2.89 \times 10^{-5}$ | $5.37 \times 10^{-4}$ |
| 0.5 Ymax | $3.17 \times 10^{-5}$ | $-1.27 \times 10^{-3}$ | $-2.29 \times 10^{-4}$ | $5.89 \times 10^{-5}$ | $1.04 \times 10^{-3}$ |
| 0.6 Ymax | $5.55 \times 10^{-5}$ | $-2.26 \times 10^{-3}$ | $-3.67 \times 10^{-4}$ | $1.08 \times 10^{-4}$ | $1.77 \times 10^{-3}$ |
| 0.7 Ymax | $8.93 \times 10^{-5}$ | $-3.62 \times 10^{-3}$ | $-5.21 \times 10^{-4}$ | $1.84 \times 10^{-4}$ | $2.64 \times 10^{-3}$ |
| 0.8 Ymax | $1.35 \times 10^{-4}$ | $-5.22 \times 10^{-3}$ | $-6.57 \times 10^{-4}$ | $3.03 \times 10^{-4}$ | $3.40 \times 10^{-3}$ |
| 0.9 Ymax | $1.95 \times 10^{-4}$ | $-6.75 \times 10^{-3}$ | $-7.16 \times 10^{-4}$ | $4.82 \times 10^{-4}$ | $3.51 \times 10^{-3}$ |
| Ymax | $2.71 \times 10^{-4}$ | $-7.93 \times 10^{-3}$ | $-6.00 \times 10^{-4}$ | $7.53 \times 10^{-4}$ | $2.40 \times 10^{-3}$ |

TABLE 17

<Embodiment 3>

| Y | 2nd surface | 3rd surface | 4th surface | 5th surface | 8th surface |
|---|---|---|---|---|---|
| 0.1 Ymax | $2.27 \times 10^{-7}$ | $-3.33 \times 10^{-7}$ | $3.83 \times 10^{-7}$ | $-3.30 \times 10^{-7}$ | $-5.41 \times 10^{-7}$ |
| 0.2 Ymax | $1.89 \times 10^{-6}$ | $-2.73 \times 10^{-6}$ | $3.05 \times 10^{-6}$ | $-2.64 \times 10^{-6}$ | $-4.40 \times 10^{-6}$ |
| 0.3 Ymax | $6.62 \times 10^{-6}$ | $-9.39 \times 10^{-6}$ | $1.04 \times 10^{-5}$ | $-8.85 \times 10^{-6}$ | $-1.49 \times 10^{-5}$ |
| 0.4 Ymax | $1.66 \times 10^{-5}$ | $-2.30 \times 10^{-5}$ | $2.48 \times 10^{-5}$ | $-2.09 \times 10^{-5}$ | $-3.57 \times 10^{-5}$ |
| 0.5 Ymax | $3.52 \times 10^{-5}$ | $-4.66 \times 10^{-5}$ | $4.88 \times 10^{-5}$ | $-4.06 \times 10^{-5}$ | $-7.07 \times 10^{-5}$ |
| 0.6 Ymax | $6.79 \times 10^{-5}$ | $-8.42 \times 10^{-5}$ | $8.50 \times 10^{-5}$ | $-7.02 \times 10^{-5}$ | $-1.24 \times 10^{-4}$ |
| 0.7 Ymax | $1.24 \times 10^{-4}$ | $-1.41 \times 10^{-4}$ | $1.36 \times 10^{-4}$ | $-1.12 \times 10^{-4}$ | $-2.02 \times 10^{-4}$ |
| 0.8 Ymax | $2.20 \times 10^{-4}$ | $-2.23 \times 10^{-4}$ | $2.05 \times 10^{-4}$ | $-1.71 \times 10^{-4}$ | $-3.10 \times 10^{-4}$ |
| 0.9 Ymax | $3.79 \times 10^{-4}$ | $-3.39 \times 10^{-4}$ | $2.93 \times 10^{-4}$ | $-2.52 \times 10^{-4}$ | $-4.55 \times 10^{-4}$ |
| Ymax | $6.40 \times 10^{-4}$ | $-4.98 \times 10^{-4}$ | $4.02 \times 10^{-4}$ | $-3.64 \times 10^{-4}$ | $-6.45 \times 10^{-4}$ |

| Y | 9th surface | 10th surface | 11th surface |
|---|---|---|---|
| 0.1 Ymax | $-2.20 \times 10^{-6}$ | $-4.82 \times 10^{-6}$ | $2.47 \times 10^{-6}$ |
| 0.2 Ymax | $-1.84 \times 10^{-5}$ | $-3.52 \times 10^{-5}$ | $1.80 \times 10^{-5}$ |
| 0.3 Ymax | $-6.73 \times 10^{-5}$ | $-1.00 \times 10^{-4}$ | $4.94 \times 10^{-5}$ |
| 0.4 Ymax | $-1.77 \times 10^{-4}$ | $-1.79 \times 10^{-4}$ | $7.80 \times 10^{-5}$ |
| 0.5 Ymax | $-3.86 \times 10^{-4}$ | $-2.19 \times 10^{-4}$ | $5.06 \times 10^{-5}$ |
| 0.6 Ymax | $-7.26 \times 10^{-4}$ | $-1.54 \times 10^{-4}$ | $-1.30 \times 10^{-4}$ |

TABLE 17-continued

<Embodiment 3>

| | | | |
|---|---|---|---|
| 0.7 Ymax | $-1.18 \times 10^{-3}$ | $5.13 \times 10^{-5}$ | $-5.99 \times 10^{-4}$ |
| 0.8 Ymax | $-1.62 \times 10^{-3}$ | $3.38 \times 10^{-4}$ | $-1.49 \times 10^{-3}$ |
| 0.9 Ymax | $-1.75 \times 10^{-3}$ | $5.49 \times 10^{-4}$ | $-2.83 \times 10^{-3}$ |
| Ymax | $-1.31 \times 10^{-3}$ | $6.34 \times 10^{-4}$ | $-4.32 \times 10^{-3}$ |

TABLE 18

<Embodiment 4>

| Y | 2nd surface | 5th surface | 8th surface | 9th surface | 10th surface | 11th surface |
|---|---|---|---|---|---|---|
| 0.1 Ymax | $8.79 \times 10^{-9}$ | $-2.75 \times 10^{-7}$ | $-4.43 \times 10^{-7}$ | $-7.78 \times 10^{-6}$ | $-4.99 \times 10^{-6}$ | $9.12 \times 10^{-7}$ |
| 0.2 Ymax | $6.15 \times 10^{-8}$ | $-2.25 \times 10^{-6}$ | $-3.60 \times 10^{-6}$ | $-6.56 \times 10^{-5}$ | $-3.37 \times 10^{-5}$ | $6.63 \times 10^{-6}$ |
| 0.3 Ymax | $2.02 \times 10^{-7}$ | $-7.48 \times 10^{-6}$ | $-1.22 \times 10^{-5}$ | $-2.42 \times 10^{-4}$ | $-7.99 \times 10^{-5}$ | $1.85 \times 10^{-5}$ |
| 0.4 Ymax | $5.18 \times 10^{-7}$ | $-1.74 \times 10^{-5}$ | $-2.91 \times 10^{-5}$ | $-6.48 \times 10^{-4}$ | $-8.67 \times 10^{-5}$ | $3.00 \times 10^{-5}$ |
| 0.5 Ymax | $1.12 \times 10^{-6}$ | $-3.34 \times 10^{-5}$ | $-5.75 \times 10^{-5}$ | $-1.46 \times 10^{-3}$ | $4.61 \times 10^{-5}$ | $2.40 \times 10^{-5}$ |
| 0.6 Ymax | $2.26 \times 10^{-6}$ | $-5.69 \times 10^{-5}$ | $-1.01 \times 10^{-4}$ | $-2.89 \times 10^{-3}$ | $4.04 \times 10^{-4}$ | $-2.29 \times 10^{-5}$ |
| 0.7 Ymax | $4.34 \times 10^{-6}$ | $-8.99 \times 10^{-5}$ | $-1.65 \times 10^{-4}$ | $-5.21 \times 10^{-3}$ | $9.52 \times 10^{-4}$ | $-1.13 \times 10^{-4}$ |
| 0.8 Ymax | $8.12 \times 10^{-6}$ | $-1.36 \times 10^{-4}$ | $-2.54 \times 10^{-4}$ | $-8.73 \times 10^{-3}$ | $1.49 \times 10^{-3}$ | $-1.56 \times 10^{-4}$ |
| 0.9 Ymax | $1.48 \times 10^{-5}$ | $-2.00 \times 10^{-4}$ | $-3.74 \times 10^{-4}$ | $-1.43 \times 10^{-3}$ | $1.99 \times 10^{-3}$ | $1.90 \times 10^{-4}$ |
| Ymax | $2.65 \times 10^{-5}$ | $-2.91 \times 10^{-4}$ | $-5.25 \times 10^{-4}$ | $-2.52 \times 10^{-3}$ | $4.13 \times 10^{-3}$ | $1.80 \times 10^{-3}$ |

TABLE 19

<Embodiment 5>

| Y | 5th surface | 8th surface | 9th surface | 10th surface |
|---|---|---|---|---|
| 0.1 Ymax | $-2.63 \times 10^{-7}$ | $-4.56 \times 10^{-7}$ | $-4.50 \times 10^{-7}$ | $-4.05 \times 10^{-6}$ |
| 0.2 Ymax | $-2.02 \times 10^{-6}$ | $-3.63 \times 10^{-6}$ | $-4.53 \times 10^{-6}$ | $-2.70 \times 10^{-5}$ |
| 0.3 Ymax | $-6.77 \times 10^{-6}$ | $-1.20 \times 10^{-5}$ | $-2.23 \times 10^{-5}$ | $-6.25 \times 10^{-5}$ |
| 0.4 Ymax | $-1.60 \times 10^{-5}$ | $-2.79 \times 10^{-5}$ | $-8.22 \times 10^{-5}$ | $-6.44 \times 10^{-5}$ |
| 0.5 Ymax | $-3.12 \times 10^{-5}$ | $-5.32 \times 10^{-5}$ | $-2.40 \times 10^{-4}$ | $4.00 \times 10^{-5}$ |
| 0.6 Ymax | $-5.44 \times 10^{-5}$ | $-9.00 \times 10^{-5}$ | $-5.59 \times 10^{-4}$ | $2.94 \times 10^{-4}$ |
| 0.7 Ymax | $-8.81 \times 10^{-5}$ | $-1.40 \times 10^{-4}$ | $-1.04 \times 10^{-3}$ | $6.25 \times 10^{-4}$ |
| 0.8 Ymax | $-1.35 \times 10^{-4}$ | $-2.07 \times 10^{-4}$ | $-1.52 \times 10^{-3}$ | $8.37 \times 10^{-4}$ |
| 0.9 Ymax | $-2.00 \times 10^{-4}$ | $-2.94 \times 10^{-4}$ | $-1.80 \times 10^{-3}$ | $9.90 \times 10^{-4}$ |
| Ymax | $-2.84 \times 10^{-4}$ | $-3.99 \times 10^{-4}$ | $-2.42 \times 10^{-3}$ | $2.85 \times 10^{-3}$ |

TABLE 20

<Embodiment 6>

| Y | 3rd surface | 6th surface | 7th surface | 8th surface |
|---|---|---|---|---|
| 0.1 Ymax | $-3.58 \times 10^{-7}$ | $-4.95 \times 10^{-7}$ | $-8.29 \times 10^{-7}$ | $-3.72 \times 10^{-6}$ |
| 0.2 Ymax | $-2.95 \times 10^{-6}$ | $-3.86 \times 10^{-6}$ | $-7.14 \times 10^{-6}$ | $-2.49 \times 10^{-5}$ |
| 0.3 Ymax | $-9.89 \times 10^{-6}$ | $-1.28 \times 10^{-5}$ | $-3.02 \times 10^{-5}$ | $-5.85 \times 10^{-5}$ |
| 0.4 Ymax | $-2.35 \times 10^{-5}$ | $-2.96 \times 10^{-5}$ | $-1.02 \times 10^{-4}$ | $-6.38 \times 10^{-5}$ |
| 0.5 Ymax | $-4.61 \times 10^{-5}$ | $-5.64 \times 10^{-5}$ | $-2.81 \times 10^{-4}$ | $2.32 \times 10^{-5}$ |
| 0.6 Ymax | $-8.06 \times 10^{-5}$ | $-9.51 \times 10^{-5}$ | $-6.13 \times 10^{-4}$ | $2.37 \times 10^{-4}$ |
| 0.7 Ymax | $-1.31 \times 10^{-4}$ | $-1.48 \times 10^{-4}$ | $-1.02 \times 10^{-3}$ | $5.01 \times 10^{-4}$ |
| 0.8 Ymax | $-2.02 \times 10^{-4}$ | $-2.17 \times 10^{-4}$ | $-1.22 \times 10^{-3}$ | $6.16 \times 10^{-4}$ |
| 0.9 Ymax | $-2.98 \times 10^{-4}$ | $-3.05 \times 10^{-4}$ | $-1.12 \times 10^{-3}$ | $6.00 \times 10^{-4}$ |
| Ymax | $-4.23 \times 10^{-4}$ | $-1.42 \times 10^{-4}$ | $-2.74 \times 10^{-3}$ | $2.04 \times 10^{-3}$ |

TABLE 21

<Embodiment 7>

| Y | 1st surface | 2nd surface | 4th surface | 5th surface | 8th surface |
|---|---|---|---|---|---|
| 0.1 Ymax | $3.80 \times 10^{-6}$ | $-3.69 \times 10^{-6}$ | $-3.08 \times 10^{-7}$ | $-1.55 \times 10^{-6}$ | $-2.56 \times 10^{-8}$ |
| 0.2 Ymax | $2.98 \times 10^{-5}$ | $-2.92 \times 10^{-5}$ | $-2.44 \times 10^{-6}$ | $-1.24 \times 10^{-5}$ | $-1.54 \times 10^{-7}$ |
| 0.3 Ymax | $9.77 \times 10^{-5}$ | $-9.66 \times 10^{-5}$ | $-8.02 \times 10^{-6}$ | $-4.19 \times 10^{-5}$ | $-2.56 \times 10^{-7}$ |
| 0.4 Ymax | $2.22 \times 10^{-4}$ | $-2.23 \times 10^{-4}$ | $-1.84 \times 10^{-5}$ | $-9.81 \times 10^{-5}$ | $8.46 \times 10^{-7}$ |
| 0.5 Ymax | $4.10 \times 10^{-4}$ | $-4.20 \times 10^{-4}$ | $-3.45 \times 10^{-5}$ | $-1.94 \times 10^{-4}$ | $1.67 \times 10^{-6}$ |
| 0.6 Ymax | $6.64 \times 10^{-4}$ | $-6.94 \times 10^{-4}$ | $-5.71 \times 10^{-5}$ | $-3.34 \times 10^{-4}$ | $-2.33 \times 10^{-6}$ |
| 0.7 Ymax | $9.75 \times 10^{-4}$ | $-1.04 \times 10^{-3}$ | $-8.75 \times 10^{-5}$ | $-5.26 \times 10^{-4}$ | $-2.28 \times 10^{-5}$ |
| 0.8 Ymax | $1.33 \times 10^{-3}$ | $-1.45 \times 10^{-3}$ | $-1.28 \times 10^{-4}$ | $-7.74 \times 10^{-4}$ | $-7.78 \times 10^{-5}$ |
| 0.9 Ymax | $1.72 \times 10^{-3}$ | $-1.90 \times 10^{-3}$ | $-1.82 \times 10^{-4}$ | $-1.07 \times 10^{-3}$ | $-1.74 \times 10^{-4}$ |
| Ymax | $2.12 \times 10^{-3}$ | $-2.36 \times 10^{-3}$ | $-2.59 \times 10^{-4}$ | $-1.41 \times 10^{-3}$ | $-2.25 \times 10^{-4}$ |

| Y | 9th surface | 10th surface | 14th surface | 16th surface |
|---|---|---|---|---|
| 0.1 Ymax | $2.85 \times 10^{-7}$ | $2.85 \times 10^{-7}$ | $-3.78 \times 10^{-6}$ | $-2.63 \times 10^{-6}$ |
| 0.2 Ymax | $2.05 \times 10^{-6}$ | $2.42 \times 10^{-6}$ | $-3.02 \times 10^{-5}$ | $-2.19 \times 10^{-5}$ |
| 0.3 Ymax | $5.71 \times 10^{-6}$ | $9.50 \times 10^{-6}$ | $-1.02 \times 10^{-4}$ | $-7.98 \times 10^{-5}$ |
| 0.4 Ymax | $9.24 \times 10^{-6}$ | $2.70 \times 10^{-5}$ | $-2.41 \times 10^{-4}$ | $-2.12 \times 10^{-4}$ |
| 0.5 Ymax | $7.16 \times 10^{-6}$ | $6.45 \times 10^{-5}$ | $-4.69 \times 10^{-4}$ | $-4.82 \times 10^{-4}$ |
| 0.6 Ymax | $-1.13 \times 10^{-5}$ | $1.37 \times 10^{-4}$ | $-8.05 \times 10^{-4}$ | $-1.01 \times 10^{-3}$ |
| 0.7 Ymax | $-6.36 \times 10^{-5}$ | $2.68 \times 10^{-4}$ | $-1.26 \times 10^{-3}$ | $-2.04 \times 10^{-3}$ |
| 0.8 Ymax | $-1.76 \times 10^{-5}$ | $4.89 \times 10^{-4}$ | $-1.85 \times 10^{-3}$ | $-4.07 \times 10^{-3}$ |

TABLE 21-continued

<Embodiment 7>

| | | | | | |
|---|---|---|---|---|---|
| 0.9 Ymax | $-3.86 \times 10^{-4}$ | $8.50 \times 10^{-4}$ | $-2.55 \times 10^{-3}$ | $-8.33 \times 10^{-3}$ |
| Ymax | $-7.46 \times 10^{-4}$ | $1.41 \times 10^{-3}$ | $-3.34 \times 10^{-3}$ | $-1.87 \times 10^{-2}$ |

TABLE 22

<Embodiment 8>

| Y | 1st surface | 2nd surface | 4th surface | 5th surface | 6th surface |
|---|---|---|---|---|---|
| 0.1 Ymax | $3.76 \times 10^{-6}$ | $-3.81 \times 10^{-6}$ | $-1.69 \times 10^{-7}$ | $-1.50 \times 10^{-6}$ | $-1.39 \times 10^{-7}$ |
| 0.2 Ymax | $2.96 \times 10^{-5}$ | $-3.03 \times 10^{-5}$ | $-1.31 \times 10^{-6}$ | $-1.21 \times 10^{-5}$ | $-1.11 \times 10^{-6}$ |
| 0.3 Ymax | $9.70 \times 10^{-5}$ | $-1.01 \times 10^{-4}$ | $-4.06 \times 10^{-6}$ | $-4.08 \times 10^{-5}$ | $-3.78 \times 10^{-6}$ |
| 0.4 Ymax | $2.21 \times 10^{-4}$ | $-2.35 \times 10^{-4}$ | $-8.51 \times 10^{-6}$ | $-9.69 \times 10^{-5}$ | $-9.06 \times 10^{-6}$ |
| 0.5 Ymax | $4.09 \times 10^{-4}$ | $-4.49 \times 10^{-4}$ | $-1.41 \times 10^{-5}$ | $-1.89 \times 10^{-4}$ | $-1.79 \times 10^{-5}$ |
| 0.6 Ymax | $6.59 \times 10^{-4}$ | $-7.50 \times 10^{-4}$ | $-1.97 \times 10^{-5}$ | $-3.26 \times 10^{-4}$ | $-3.14 \times 10^{-5}$ |
| 0.7 Ymax | $9.60 \times 10^{-4}$ | $-1.14 \times 10^{-3}$ | $-2.44 \times 10^{-5}$ | $-5.14 \times 10^{-4}$ | $-5.03 \times 10^{-5}$ |
| 0.8 Ymax | $1.29 \times 10^{-3}$ | $-1.61 \times 10^{-3}$ | $-2.80 \times 10^{-5}$ | $-7.56 \times 10^{-4}$ | $-7.50 \times 10^{-5}$ |
| 0.9 Ymax | $1.61 \times 10^{-3}$ | $-2.12 \times 10^{-3}$ | $-3.28 \times 10^{-5}$ | $-1.05 \times 10^{-3}$ | $-1.06 \times 10^{-4}$ |
| Ymax | $1.88 \times 10^{-3}$ | $-2.62 \times 10^{-3}$ | $-4.54 \times 10^{-5}$ | $-1.39 \times 10^{-3}$ | $-1.41 \times 10^{-4}$ |

| Y | 8th surface | 10th surface | 14th surface | 16th surface |
|---|---|---|---|---|
| 0.1 Ymax | $1.24 \times 10^{-7}$ | $6.09 \times 10^{-7}$ | $-3.90 \times 10^{-6}$ | $-2.29 \times 10^{-6}$ |
| 0.2 Ymax | $1.22 \times 10^{-6}$ | $4.69 \times 10^{-6}$ | $-3.11 \times 10^{-5}$ | $-1.99 \times 10^{-5}$ |
| 0.3 Ymax | $4.63 \times 10^{-6}$ | $1.69 \times 10^{-5}$ | $-1.04 \times 10^{-4}$ | $-7.63 \times 10^{-5}$ |
| 0.4 Ymax | $1.20 \times 10^{-5}$ | $4.08 \times 10^{-5}$ | $-2.45 \times 10^{-4}$ | $-2.13 \times 10^{-4}$ |
| 0.5 Ymax | $2.34 \times 10^{-5}$ | $8.21 \times 10^{-5}$ | $-4.76 \times 10^{-4}$ | $-5.04 \times 10^{-4}$ |
| 0.6 Ymax | $3.44 \times 10^{-5}$ | $1.47 \times 10^{-4}$ | $-8.22 \times 10^{-4}$ | $-1.08 \times 10^{-3}$ |
| 0.7 Ymax | $3.24 \times 10^{-5}$ | $2.46 \times 10^{-4}$ | $-1.32 \times 10^{-3}$ | $-2.17 \times 10^{-3}$ |
| 0.8 Ymax | $-2.69 \times 10^{-6}$ | $3.91 \times 10^{-4}$ | $-2.02 \times 10^{-3}$ | $-4.26 \times 10^{-3}$ |
| 0.9 Ymax | $-7.97 \times 10^{-5}$ | $6.02 \times 10^{-4}$ | $-2.01 \times 10^{-3}$ | $-8.47 \times 10^{-3}$ |
| Ymax | $-1.02 \times 10^{-4}$ | $9.06 \times 10^{-4}$ | $-4.45 \times 10^{-3}$ | $-1.85 \times 10^{-2}$ |

TABLE 23

<Embodiment 9>

| Y | 1st surface | 2nd surface | 4th surface | 5th surface | 8th surface |
|---|---|---|---|---|---|
| 0.1 Ymax | $-5.42 \times 10^{-7}$ | $4.54 \times 10^{-7}$ | $-3.28 \times 10^{-7}$ | $-1.16 \times 10^{-6}$ | $-5.86 \times 10^{-7}$ |
| 0.2 Ymax | $-4.14 \times 10^{-6}$ | $3.57 \times 10^{-6}$ | $-2.58 \times 10^{-6}$ | $-9.32 \times 10^{-6}$ | $-4.53 \times 10^{-6}$ |
| 0.3 Ymax | $-1.31 \times 10^{-5}$ | $1.15 \times 10^{-5}$ | $-8.58 \times 10^{-6}$ | $-3.12 \times 10^{-5}$ | $-1.48 \times 10^{-5}$ |
| 0.4 Ymax | $-2.83 \times 10^{-5}$ | $2.54 \times 10^{-5}$ | $-1.98 \times 10^{-5}$ | $-7.32 \times 10^{-5}$ | $-4.41 \times 10^{-5}$ |
| 0.5 Ymax | $-4.88 \times 10^{-5}$ | $4.48 \times 10^{-5}$ | $-3.73 \times 10^{-5}$ | $-1.14 \times 10^{-4}$ | $-6.62 \times 10^{-5}$ |
| 0.6 Ymax | $-7.17 \times 10^{-5}$ | $6.65 \times 10^{-5}$ | $-6.16 \times 10^{-5}$ | $-2.40 \times 10^{-4}$ | $-1.19 \times 10^{-4}$ |
| 0.7 Ymax | $-9.23 \times 10^{-5}$ | $8.35 \times 10^{-5}$ | $-9.22 \times 10^{-5}$ | $-3.74 \times 10^{-4}$ | $-2.06 \times 10^{-4}$ |
| 0.8 Ymax | $-1.06 \times 10^{-4}$ | $8.33 \times 10^{-5}$ | $-1.28 \times 10^{-4}$ | $-5.45 \times 10^{-4}$ | $-3.46 \times 10^{-4}$ |
| 0.9 Ymax | $-1.07 \times 10^{-5}$ | $4.61 \times 10^{-5}$ | $-1.65 \times 10^{-4}$ | $-7.55 \times 10^{-4}$ | $-5.44 \times 10^{-4}$ |
| Ymax | $-9.65 \times 10^{-5}$ | $-5.80 \times 10^{-5}$ | $-1.99 \times 10^{-4}$ | $-1.00 \times 10^{-3}$ | $-6.89 \times 10^{-4}$ |

| Y | 10th surface | 14th surface | 16th surface |
|---|---|---|---|
| 0.1 Ymax | $1.33 \times 10^{-6}$ | $-1.78 \times 10^{-6}$ | $-4.55 \times 10^{-6}$ |
| 0.2 Ymax | $1.07 \times 10^{-5}$ | $-1.33 \times 10^{-5}$ | $-3.72 \times 10^{-5}$ |
| 0.3 Ymax | $3.58 \times 10^{-5}$ | $-3.97 \times 10^{-5}$ | $-1.30 \times 10^{-4}$ |
| 0.4 Ymax | $8.45 \times 10^{-5}$ | $-9.35 \times 10^{-5}$ | $-3.26 \times 10^{-4}$ |
| 0.5 Ymax | $1.64 \times 10^{-4}$ | $-1.82 \times 10^{-4}$ | $-6.89 \times 10^{-4}$ |
| 0.6 Ymax | $2.82 \times 10^{-4}$ | $-3.13 \times 10^{-4}$ | $-1.33 \times 10^{-3}$ |
| 0.7 Ymax | $4.47 \times 10^{-4}$ | $-4.95 \times 10^{-4}$ | $-2.44 \times 10^{-3}$ |
| 0.8 Ymax | $6.69 \times 10^{-4}$ | $-7.41 \times 10^{-4}$ | $-4.43 \times 10^{-3}$ |
| 0.9 Ymax | $9.59 \times 10^{-4}$ | $-1.06 \times 10^{-3}$ | $-8.33 \times 10^{-3}$ |
| Ymax | $1.33 \times 10^{-3}$ | $-1.48 \times 10^{-3}$ | $-1.75 \times 10^{-2}$ |

TABLE 24

<Embodiment 10>

| Y | 1st surface | 2nd surface | 3rd surface | 4th surface | 5th surface |
|---|---|---|---|---|---|
| 0.1 Ymax | $-1.71 \times 10^{-6}$ | $-6.39 \times 10^{-7}$ | $2.25 \times 10^{-6}$ | $-1.33 \times 10^{-6}$ | $-5.34 \times 10^{-6}$ |
| 0.2 Ymax | $-1.33 \times 10^{-5}$ | $-4.79 \times 10^{-6}$ | $1.79 \times 10^{-5}$ | $-1.08 \times 10^{-5}$ | $-4.24 \times 10^{-5}$ |
| 0.3 Ymax | $-4.30 \times 10^{-5}$ | $-1.42 \times 10^{-5}$ | $5.97 \times 10^{-5}$ | $-3.77 \times 10^{-5}$ | $-1.41 \times 10^{-4}$ |
| 0.4 Ymax | $-9.54 \times 10^{-5}$ | $-2.73 \times 10^{-5}$ | $1.40 \times 10^{-4}$ | $-9.33 \times 10^{-5}$ | $-3.29 \times 10^{-4}$ |
| 0.5 Ymax | $-1.71 \times 10^{-4}$ | $-3.68 \times 10^{-5}$ | $2.70 \times 10^{-4}$ | $-1.93 \times 10^{-4}$ | $-6.26 \times 10^{-4}$ |
| 0.6 Ymax | $-2.65 \times 10^{-4}$ | $-2.81 \times 10^{-5}$ | $4.64 \times 10^{-4}$ | $-3.59 \times 10^{-4}$ | $-1.05 \times 10^{-3}$ |
| 0.7 Ymax | $-3.69 \times 10^{-4}$ | $2.32 \times 10^{-5}$ | $7.40 \times 10^{-4}$ | $-6.25 \times 10^{-4}$ | $-1.60 \times 10^{-3}$ |
| 0.8 Ymax | $-4.69 \times 10^{-4}$ | $1.54 \times 10^{-4}$ | $1.13 \times 10^{-3}$ | $-1.04 \times 10^{-3}$ | $-2.26 \times 10^{-3}$ |
| 0.9 Ymax | $-5.53 \times 10^{-4}$ | $4.16 \times 10^{-5}$ | $1.67 \times 10^{-3}$ | $-1.68 \times 10^{-3}$ | $-3.02 \times 10^{-3}$ |
| Ymax | $-6.12 \times 10^{-4}$ | $8.82 \times 10^{-4}$ | $2.45 \times 10^{-3}$ | $-2.64 \times 10^{-3}$ | $-3.83 \times 10^{-3}$ |

| Y | 6th surface | 7th surface | 12th surface | 13th surface | 14th surface |
|---|---|---|---|---|---|
| 0.1 Ymax | $3.30 \times 10^{-6}$ | $2.00 \times 10^{-6}$ | $-8.56 \times 10^{-7}$ | $-3.29 \times 10^{-6}$ | $-3.25 \times 10^{-6}$ |
| 0.2 Ymax | $2.62 \times 10^{-5}$ | $1.56 \times 10^{-5}$ | $-7.31 \times 10^{-6}$ | $-2.63 \times 10^{-5}$ | $-2.61 \times 10^{-5}$ |

TABLE 24-continued

<Embodiment 10>

| Y | | | | | |
|---|---|---|---|---|---|
| 0.3 Ymax | $8.74 \times 10^{-5}$ | $5.10 \times 10^{-5}$ | $-2.70 \times 10^{-5}$ | $-8.90 \times 10^{-5}$ | $-8.94 \times 10^{-5}$ |
| 0.4 Ymax | $2.03 \times 10^{-4}$ | $1.15 \times 10^{-4}$ | $-7.11 \times 10^{-5}$ | $-2.14 \times 10^{-4}$ | $-2.18 \times 10^{-4}$ |
| 0.5 Ymax | $3.86 \times 10^{-4}$ | $2.12 \times 10^{-4}$ | $-1.55 \times 10^{-4}$ | $-4.29 \times 10^{-4}$ | $-4.48 \times 10^{-4}$ |
| 0.6 Ymax | $6.42 \times 10^{-4}$ | $3.39 \times 10^{-4}$ | $-3.00 \times 10^{-4}$ | $-7.79 \times 10^{-4}$ | $-8.47 \times 10^{-4}$ |
| 0.7 Ymax | $9.65 \times 10^{-4}$ | $4.92 \times 10^{-4}$ | $-5.28 \times 10^{-4}$ | $-1.34 \times 10^{-3}$ | $-1.56 \times 10^{-3}$ |
| 0.8 Ymax | $1.34 \times 10^{-3}$ | $6.62 \times 10^{-4}$ | $-8.60 \times 10^{-4}$ | $-2.23 \times 10^{-3}$ | $-3.00 \times 10^{-3}$ |
| 0.9 Ymax | $1.72 \times 10^{-3}$ | $8.37 \times 10^{-4}$ | $-1.31 \times 10^{-3}$ | $-3.65 \times 10^{-3}$ | $-6.56 \times 10^{-3}$ |
| Ymax | $2.03 \times 10^{-3}$ | $1.01 \times 10^{-3}$ | $-1.89 \times 10^{-3}$ | $-5.93 \times 10^{-3}$ | $-2.17 \times 10^{-2}$ |

TABLE 25

<Embodiment 11>

| Y | 2nd surface | 4th surface | 5th surface | 6th surface | 8th surface | 9th surface | 11th surface |
|---|---|---|---|---|---|---|---|
| 0.1 Ymax | $-7.70 \times 10^{-8}$ | $7.05 \times 10^{-8}$ | $-4.30 \times 10^{-6}$ | $4.04 \times 10^{-6}$ | $-1.48 \times 10^{-6}$ | $-4.15 \times 10^{-6}$ | $3.43 \times 10^{-6}$ |
| 0.2 Ymax | $-6.05 \times 10^{-7}$ | $5.77 \times 10^{-7}$ | $-3.43 \times 10^{-5}$ | $3.19 \times 10^{-5}$ | $-1.20 \times 10^{-5}$ | $-3.34 \times 10^{-5}$ | $2.67 \times 10^{-5}$ |
| 0.3 Ymax | $-2.12 \times 10^{-6}$ | $1.97 \times 10^{-6}$ | $-1.15 \times 10^{-4}$ | $1.05 \times 10^{-4}$ | $-4.12 \times 10^{-5}$ | $-1.14 \times 10^{-4}$ | $8.66 \times 10^{-5}$ |
| 0.4 Ymax | $-5.25 \times 10^{-6}$ | $4.74 \times 10^{-6}$ | $-2.69 \times 10^{-4}$ | $2.41 \times 10^{-4}$ | $-1.00 \times 10^{-4}$ | $-2.75 \times 10^{-4}$ | $1.93 \times 10^{-4}$ |
| 0.5 Ymax | $-1.08 \times 10^{-5}$ | $9.46 \times 10^{-6}$ | $-5.19 \times 10^{-4}$ | $4.50 \times 10^{-4}$ | $-2.02 \times 10^{-4}$ | $-5.52 \times 10^{-4}$ | $3.45 \times 10^{-4}$ |
| 0.6 Ymax | $-2.00 \times 10^{-5}$ | $1.69 \times 10^{-5}$ | $-8.79 \times 10^{-4}$ | $7.29 \times 10^{-4}$ | $-3.59 \times 10^{-4}$ | $-9.95 \times 10^{-4}$ | $5.27 \times 10^{-4}$ |
| 0.7 Ymax | $-3.43 \times 10^{-5}$ | $2.78 \times 10^{-5}$ | $-1.36 \times 10^{-3}$ | $1.06 \times 10^{-3}$ | $-5.81 \times 10^{-4}$ | $-1.68 \times 10^{-3}$ | $7.00 \times 10^{-4}$ |
| 0.8 Ymax | $-5.59 \times 10^{-5}$ | $4.43 \times 10^{-5}$ | $-1.98 \times 10^{-3}$ | $1.40 \times 10^{-3}$ | $-8.77 \times 10^{-4}$ | $-2.71 \times 10^{-3}$ | $8.00 \times 10^{-4}$ |
| 0.9 Ymax | $-8.78 \times 10^{-5}$ | $6.78 \times 10^{-5}$ | $-2.72 \times 10^{-3}$ | $1.67 \times 10^{-3}$ | $-1.00 \times 10^{-3}$ | $-4.26 \times 10^{-3}$ | $7.21 \times 10^{-4}$ |
| Ymax | $-1.34 \times 10^{-4}$ | $1.02 \times 10^{-4}$ | $-3.59 \times 10^{-3}$ | $1.76 \times 10^{-3}$ | $-1.65 \times 10^{-3}$ | $-6.57 \times 10^{-3}$ | $3.14 \times 10^{-4}$ |

TABLE 26

<Embodiment 12>

| Y | 2nd surface | 5th surface | 7th surface | 10th surface | 11th surface | 13th surface |
|---|---|---|---|---|---|---|
| 0.1 Ymax | $-1.97 \times 10^{-7}$ | $-1.27 \times 10^{-6}$ | $-1.12 \times 10^{-7}$ | $-1.04 \times 10^{-7}$ | $-4.47 \times 10^{-6}$ | $-7.62 \times 10^{-6}$ |
| 0.2 Ymax | $-1.68 \times 10^{-6}$ | $-1.01 \times 10^{-5}$ | $-1.01 \times 10^{-6}$ | $-7.77 \times 10^{-7}$ | $-3.38 \times 10^{-5}$ | $-6.18 \times 10^{-5}$ |
| 0.3 Ymax | $-5.88 \times 10^{-6}$ | $-3.41 \times 10^{-5}$ | $-3.78 \times 10^{-6}$ | $-2.54 \times 10^{-6}$ | $-1.06 \times 10^{-4}$ | $-2.14 \times 10^{-4}$ |
| 0.4 Ymax | $-1.46 \times 10^{-5}$ | $-8.07 \times 10^{-5}$ | $-1.03 \times 10^{-5}$ | $-5.77 \times 10^{-6}$ | $-2.33 \times 10^{-4}$ | $-5.32 \times 10^{-4}$ |
| 0.5 Ymax | $-2.96 \times 10^{-5}$ | $-1.57 \times 10^{-4}$ | $-2.34 \times 10^{-5}$ | $-1.06 \times 10^{-5}$ | $-4.31 \times 10^{-4}$ | $-1.11 \times 10^{-3}$ |
| 0.6 Ymax | $-5.30 \times 10^{-5}$ | $-2.72 \times 10^{-4}$ | $-4.80 \times 10^{-5}$ | $-1.66 \times 10^{-5}$ | $-7.32 \times 10^{-4}$ | $-2.10 \times 10^{-3}$ |
| 0.7 Ymax | $-8.69 \times 10^{-5}$ | $-4.32 \times 10^{-4}$ | $-9.07 \times 10^{-5}$ | $-2.28 \times 10^{-5}$ | $-1.20 \times 10^{-3}$ | $-3.76 \times 10^{-3}$ |
| 0.8 Ymax | $-1.35 \times 10^{-4}$ | $-6.46 \times 10^{-4}$ | $-1.62 \times 10^{-4}$ | $-2.70 \times 10^{-5}$ | $-1.95 \times 10^{-3}$ | $-6.53 \times 10^{-3}$ |
| 0.9 Ymax | $-2.04 \times 10^{-4}$ | $-9.23 \times 10^{-4}$ | $-2.75 \times 10^{-4}$ | $-2.56 \times 10^{-5}$ | $-3.29 \times 10^{-3}$ | $-1.13 \times 10^{-2}$ |
| Ymax | $-3.08 \times 10^{-4}$ | $-1.27 \times 10^{-3}$ | $-4.50 \times 10^{-4}$ | $-1.26 \times 10^{-5}$ | $-6.18 \times 10^{-3}$ | $-1.99 \times 10^{-2}$ |

TABLE 27

<Embodiment 13>

| Y | 2nd surface | 5th surface | 6th surface | 12th surface | 14th surface |
|---|---|---|---|---|---|
| 0.1 Ymax | $-1.97 \times 10^{-7}$ | $-1.20 \times 10^{-7}$ | $-1.01 \times 10^{-6}$ | $-3.87 \times 10^{-6}$ | $-8.08 \times 10^{-6}$ |
| 0.2 Ymax | $-1.69 \times 10^{-6}$ | $-1.01 \times 10^{-6}$ | $-8.07 \times 10^{-6}$ | $-3.05 \times 10^{-5}$ | $-6.29 \times 10^{-5}$ |
| 0.3 Ymax | $-6.19 \times 10^{-6}$ | $-4.25 \times 10^{-6}$ | $-2.71 \times 10^{-5}$ | $-1.02 \times 10^{-4}$ | $-2.04 \times 10^{-4}$ |
| 0.4 Ymax | $-1.59 \times 10^{-5}$ | $-1.29 \times 10^{-5}$ | $-6.36 \times 10^{-5}$ | $-2.41 \times 10^{-4}$ | $-4.68 \times 10^{-4}$ |
| 0.5 Ymax | $-3.33 \times 10^{-5}$ | $-3.25 \times 10^{-5}$ | $-1.23 \times 10^{-4}$ | $-4.72 \times 10^{-4}$ | $-9.09 \times 10^{-4}$ |
| 0.6 Ymax | $-6.07 \times 10^{-5}$ | $-7.22 \times 10^{-5}$ | $-2.11 \times 10^{-4}$ | $-8.12 \times 10^{-4}$ | $-1.66 \times 10^{-3}$ |
| 0.7 Ymax | $-1.01 \times 10^{-4}$ | $-1.45 \times 10^{-4}$ | $-3.33 \times 10^{-4}$ | $-1.25 \times 10^{-3}$ | $-3.07 \times 10^{-3}$ |
| 0.8 Ymax | $-1.59 \times 10^{-4}$ | $-2.69 \times 10^{-4}$ | $-4.99 \times 10^{-4}$ | $-1.74 \times 10^{-3}$ | $-6.14 \times 10^{-3}$ |
| 0.9 Ymax | $-2.44 \times 10^{-4}$ | $-4.62 \times 10^{-4}$ | $-7.20 \times 10^{-4}$ | $-2.43 \times 10^{-3}$ | $-1.34 \times 10^{-2}$ |
| Ymax | $-3.65 \times 10^{-4}$ | $-7.38 \times 10^{-4}$ | $-1.01 \times 10^{-3}$ | $-4.32 \times 10^{-3}$ | $-3.12 \times 10^{-2}$ |

TABLE 28

| | 1st lens unit | 2nd lens unit | 3rd lens unit |
|---|---|---|---|
| Embodiment 1 | 3 (1) | 3 | 2 |
| Embodiment 2 | 3 (1) | 2 | 5 (2) |
| Embodiment 3 | 3 (1) | 2 | 3 (1) |
| Embodiment 4 | 1 | 2 | 3 (1) |
| Embodiment 5 | | 2 | 2 (1) |
| Embodiment 6 | | 2 | 2 (1) |
| Embodiment 7 | 3 (1) | 4 (1) | 2 |
| Embodiment 8 | 3 (1) | 4 (1) | 2 |
| Embodiment 9 | 3 (1) | 3 | 2 |
| Embodiment 10 | 4 (2) | 4 (2) | 2 |
| Embodiment 11 | 2 | 3 (1) | 2 |
| Embodiment 12 | 1 | 3 | 2 |
| Embodiment 13 | 1 | 2 (1) | 2 |

Obviously, many modifications and variations of the present invention are possible in light of the above teachings. It is therefore to be understood that within the scope of the appended claims, the invention may be practiced other than as specifically described.

What is claimed is:

1. A compact zoom lens system comprising, from the object side to the image side:

a first lens unit of a positive refractive power;

a second lens unit of a positive refractive power with a variable air space between the first and the second lens units, said second lens unit comprising a first negative lens element, which is located at the most object side of the second lens unit, whose object side surface is aspherical, and a second positive lens element, which is located at the image side of the negative lens element, whose image side surface is aspherical; and a third lens unit of a negative refractive power with a variable air space between the second and the third lens units.

2. A compact zoom lens system claimed in claim 1, wherein the second lens unit further comprising a positive and a negative lens elements at the image side of the second positive lens element.

3. A compact zoom lens system claimed in claim 1, wherein the second lens unit consists of the first negative and second positive lens elements.

4. The compact zoom lens system of claim 1, wherein both side surfaces of at least one lens element in the second lens unit are aspherical.

5. A compact zoom lens system comprising from the object side to the image side:
- a first lens unit of a positive refractive power;
- a second lens unit of a positive refractive power with a variable air space between the first and the second lens units; and
- a third lens unit of a negative refractive power with a variable air space between the second and the third lens units, said third lens unit including a positive and a negative lens element and having at least two aspherical surfaces.

6. A compact zoom lens system as claimed in claim 5, wherein the positive and the negative lens elements have an aspherical surface, respectively.

7. A compact zoom lens system claimed in claim 5, wherein the third lens unit consists of, from the object side to the image side, a positive meniscus and a negative meniscus lens elements both of whose image side surfaces are convex to the object side.

8. A compact zoom lens system claimed in claim 7, wherein the object side surface of the positive meniscus lens element and the object side surface of the negative meniscus lens element are aspherical.

9. A compact zoom lens system claimed in claim 5, wherein at least one aspherical surface weaken the refractive power of the third unit as compared with a base spherical surface.

10. The compact zoom lens system of claim 5, wherein both side surfaces of at least one lens element in the third lens unit are aspherical.

11. A compact zoom lens system comprising, from the object side to the image side:
- a first lens unit of a positive refractive power, said first lens unit having at least one aspherical surface;
- a second lens unit of a positive refractive power with a variable air space between the first and the second units, said second lens unit having at least one aspherical surface; and
- a third lens unit of a negative refractive power with a variable air space between the second and the third lens units.

12. A compact zoom lens system comprising, from the object side to the image side:
- a first lens unit of a positive refractive power, said first lens unit having at least one aspherical surface;
- a second lens unit of a positive refractive power with a variable air space between the first and the second lens units; and
- a third lens unit of a negative refractive power with a variable air space between the second and the third lens units, said third lens unit having at least one aspherical surface.

13. A compact zoom lens system comprising, from the object side to the image side:
- a first lens unit of a positive refractive power, said first lens unit consisting of two lens elements;
- a second lens unit of a positive refractive power with a variable air space between the first and the second lens units, said second lens unit consisting of two lens elements; and
- a third lens unit of a negative refractive power with a variable air space between the second and the third lens units, said third lens component consisting of two lens units.

14. The compact zoom lens system of claim 13, wherein the zoom lens system has at least one aspherical surface.

15. The compact zoom lens system of claim 14, wherein each of the first, second, and third lens units have at least one aspherical surface, respectively.

16. A compact zoom lens system comprising, from the object side to the image side:
- a first lens unit of a positive refractive power, said first lens unit consisting of, from the object side to the image side, a positive and a negative lens element, and having at least one aspherical surface;
- a second lens unit of a positive refractive power with a variable air space between the first and the second lens units; and
- a third lens unit of a negative refractive power with a variable air space between the second and the third lens units.

17. A compact zoom lens system comprising, from the object side to the image side:
- a first lens unit of a positive refractive power, said first lens unit consisting of, from the object side to the image side, a negative meniscus lens element whose object side surface is convex to the object side and whose image side surface is aspherical, and a positive lens element whose object side surface is convex to the object side;
- a second lens unit of a positive refractive power with a variable air space between the first and the second lens units; and
- a third lens unit of a negative refractive power with a variable air space between the second and the third lens units.

18. The compact zoom lens system of claim 17, wherein both side surfaces of at least one lens element in the first lens unit are aspherical.

19. A compact zoom lens system comprising, from the object side to the image side:
- a first lens unit of a positive refractive power, said first lens unit consisting of, from the object side to the image side, a negative meniscus lens element whose object side surface is convex to the object side, and a positive lens element whose object side surface is convex to the object side and aspherical;
- a second lens unit of a positive refractive power with a variable air space between the first and the second lens units; and
- a third lens unit of a negative refractive power with a variable air space between the second and the third lens units.

20. The compact zoom lens system of claim 19, wherein both side surfaces of at least one lens element in the first lens unit are aspherical.

* * * * *